US010084990B2

(12) United States Patent
Smits

(10) Patent No.: US 10,084,990 B2
(45) Date of Patent: *Sep. 25, 2018

(54) HOLOGRAPHIC VIDEO CAPTURE AND TELEPRESENCE SYSTEM

(71) Applicant: Gerard Dirk Smits, Los Gatos, CA (US)

(72) Inventor: Gerard Dirk Smits, Los Gatos, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/804,909

(22) Filed: Nov. 6, 2017

(65) Prior Publication Data
US 2018/0063484 A1    Mar. 1, 2018

Related U.S. Application Data

(63) Continuation of application No. 15/411,959, filed on Jan. 20, 2017, now Pat. No. 9,813,673.
(Continued)

(51) Int. Cl.
*H04N 7/14* (2006.01)
*H04N 7/15* (2006.01)
(Continued)

(52) U.S. Cl.
CPC ............ *H04N 7/157* (2013.01); *G01S 3/00* (2013.01); *G02B 27/2292* (2013.01);
(Continued)

(58) Field of Classification Search
CPC ......... G03H 1/0005; G03H 2001/0088; H04N 7/147; H04N 7/157; H04N 13/0239;
(Continued)

(56) References Cited

U.S. PATENT DOCUMENTS 4,019,262 A    4/1977 Breglia et al.
4,340,274 A    7/1982 Spooner
(Continued)

FOREIGN PATENT DOCUMENTS

EP    0722109 A1    7/1996
JP    11119184 A    4/1999
(Continued)

OTHER PUBLICATIONS

Savage, P., "GGDC 2013: Valv's Michael Abrash on the challenges of VR—'a new world is emerging'," PCGamer, Apr. 2, 2013, 6 pages.
(Continued)

*Primary Examiner* — Hemant Patel
(74) *Attorney, Agent, or Firm* — John W. Branch; Lowe Graham Jones PLLC

(57) ABSTRACT

The invention is directed to recording, transmitting, and displaying a three-dimensional image of a face of a user in a video stream. Reflected light from a curved or geometrically shaped screen is employed to provide multiple perspective views of the user's face that are transformed into the image, which is communicated to remotely located other users. A head mounted projection display system is employed to capture the reflective light. The system includes a frame, that when worn by a user, wraps around and grips the user's head. Also, at least two separate image capture modules are included on the frame and generally positioned relatively adjacent to the left and right eyes of a user when the system is worn. Each module includes one or more sensor components, such as cameras, that are arranged to detect at least reflected non-visible light from a screen positioned in front of the user.

20 Claims, 53 Drawing Sheets

Related U.S. Application Data

(60) Provisional application No. 62/389,372, filed on Feb. 23, 2016, provisional application No. 62/388,334, filed on Jan. 20, 2016.

(51) Int. Cl.

| | | |
|---|---|---|
| *H04N 13/275* | (2018.01) | |
| *H04N 13/324* | (2018.01) | |
| *H04N 13/344* | (2018.01) | |
| *G03H 1/00* | (2006.01) | |
| *G01S 3/00* | (2006.01) | |
| *G02B 27/22* | (2018.01) | |
| *H04N 13/243* | (2018.01) | |
| *H04N 13/257* | (2018.01) | |
| *H04N 13/366* | (2018.01) | |
| *H04N 13/383* | (2018.01) | |

(52) U.S. Cl.
CPC ............ *G03H 1/0005* (2013.01); *H04N 7/147* (2013.01); *H04N 13/243* (2018.05); *H04N 13/257* (2018.05); *H04N 13/275* (2018.05); *H04N 13/324* (2018.05); *H04N 13/344* (2018.05); *H04N 13/366* (2018.05); *H04N 13/383* (2018.05); *G03H 2001/0088* (2013.01); *H04N 2213/001* (2013.01)

(58) Field of Classification Search
CPC ............ H04N 13/0275; H04N 13/0422; H04N 13/044; H04N 13/0459; H04N 2213/001
USPC ............................................. 348/14.01–14.16
See application file for complete search history.

(56) References Cited

U.S. PATENT DOCUMENTS

| | | |
|---|---|---|
| 4,820,041 A | 4/1989 | Davidson et al. |
| 5,052,820 A | 10/1991 | McGinniss et al. |
| 5,107,122 A | 4/1992 | Barkan et al. |
| 5,115,230 A | 5/1992 | Smoot |
| 5,521,722 A | 5/1996 | Colvill et al. |
| 5,559,322 A | 9/1996 | Jacoby et al. |
| 5,572,251 A | 11/1996 | Ogawa |
| 5,580,140 A | 12/1996 | Katz et al. |
| 5,661,506 A | 8/1997 | Lazzouni et al. |
| 5,812,664 A | 9/1998 | Bernobich et al. |
| 5,914,783 A | 6/1999 | Barrus |
| 5,930,378 A | 7/1999 | Kubota et al. |
| 6,115,022 A | 9/2000 | Mayer, III et al. |
| 6,195,446 B1 | 2/2001 | Skoog |
| 6,307,526 B1 | 10/2001 | Mann |
| 6,404,416 B1 | 6/2002 | Kahn et al. |
| 6,545,670 B1 | 4/2003 | Pryor |
| 6,670,603 B2 | 12/2003 | Shimada et al. |
| 6,704,000 B2 | 3/2004 | Carpenter |
| 6,710,767 B1 | 3/2004 | Hasegawa et al. |
| 6,766,066 B2 | 7/2004 | Kitazawa |
| 6,982,683 B2 | 1/2006 | Stanton |
| 7,119,965 B1 | 10/2006 | Rolland et al. |
| 7,144,117 B2 | 12/2006 | Kojima |
| 7,182,465 B2 | 2/2007 | Fuchs et al. |
| 7,232,229 B2 | 6/2007 | Peeters et al. |
| 7,262,765 B2 | 8/2007 | Brown et al. |
| 7,289,110 B2 | 10/2007 | Hansson |
| 7,303,289 B2 | 12/2007 | Fujiwara |
| 7,511,847 B2 | 3/2009 | Silverbrook et al. |
| 7,787,134 B2 | 8/2010 | Kohnen et al. |
| 7,911,444 B2 | 3/2011 | Yee |
| 3,170,329 A1 | 5/2012 | Seko et al. |
| 8,282,222 B2 | 10/2012 | Smits |
| 8,297,758 B2 | 10/2012 | Choi et al. |
| 8,430,512 B2 | 4/2013 | Smits |
| 8,493,573 B2 | 7/2013 | Chinn et al. |
| 8,573,783 B2 | 11/2013 | Smits |
| 8,696,141 B2 | 4/2014 | Smits |
| 8,711,370 B1 | 4/2014 | Smits |
| 8,773,512 B1 | 7/2014 | Rafii |
| 8,957,847 B1 | 2/2015 | Karakotsios et al. |
| 8,994,780 B2 * | 3/2015 | Moore ............... H04N 13/0014 348/14.07 |
| 9,151,607 B2 | 10/2015 | Davies et al. |
| 9,813,673 B2 * | 11/2017 | Smits ..................... H04N 7/157 |
| 2001/0043165 A1 | 11/2001 | Stanton |
| 2002/0036765 A1 | 3/2002 | McCaffrey et al. |
| 2002/0039138 A1 | 4/2002 | Edelson et al. |
| 2002/0067466 A1 | 6/2002 | Covannon et al. |
| 2002/0145588 A1 | 10/2002 | McCanon et al. |
| 2003/0010888 A1 | 1/2003 | Shimada et al. |
| 2003/0045034 A1 | 3/2003 | Davis et al. |
| 2003/0156260 A1 | 8/2003 | Putilin et al. |
| 2003/0202234 A1 | 10/2003 | Taylor et al. |
| 2003/0202679 A1 | 10/2003 | Rodriguez |
| 2003/0214710 A1 | 11/2003 | Takahashi et al. |
| 2003/0222849 A1 | 12/2003 | Starkweather |
| 2004/0006424 A1 | 1/2004 | Joyce et al. |
| 2004/0054359 A1 | 3/2004 | Ruiz et al. |
| 2004/0114834 A1 | 6/2004 | Fisher |
| 2004/0218155 A1 | 11/2004 | Schenk et al. |
| 2005/0035943 A1 | 2/2005 | Kojima |
| 2005/0052635 A1 | 3/2005 | Xie et al. |
| 2005/0083248 A1 | 4/2005 | Biocca et al. |
| 2005/0099664 A1 | 5/2005 | Yamaoka |
| 2005/0159893 A1 | 7/2005 | Isaji et al. |
| 2005/0195387 A1 | 9/2005 | Zhang et al. |
| 2005/0219530 A1 | 10/2005 | Horibe et al. |
| 2005/0273830 A1 | 12/2005 | Silver et al. |
| 2006/0028374 A1 | 2/2006 | Fullerton |
| 2006/0028622 A1 | 2/2006 | Nojima et al. |
| 2006/0132447 A1 | 6/2006 | Conrad |
| 2006/0132472 A1 | 6/2006 | Peeters et al. |
| 2006/0132729 A1 | 6/2006 | Engle |
| 2006/0197936 A1 | 9/2006 | Liebman et al. |
| 2006/0256133 A1 | 11/2006 | Rosenberg |
| 2007/0046625 A1 | 3/2007 | Yee |
| 2007/0053679 A1 | 3/2007 | Beniyama et al. |
| 2007/0064242 A1 | 3/2007 | Childers |
| 2007/0138371 A1 | 6/2007 | Marshall |
| 2007/0182949 A1 | 8/2007 | Niciass |
| 2007/0273610 A1 | 11/2007 | Baillot |
| 2008/0018591 A1 | 1/2008 | Pittel et al. |
| 2008/0266169 A1 | 10/2008 | Akita |
| 2008/0291213 A1 | 11/2008 | Bhogal |
| 2008/0316026 A1 | 12/2008 | Yenisch et al. |
| 2008/0317077 A1 | 12/2008 | Hoving et al. |
| 2009/0096994 A1 | 4/2009 | Smits |
| 2009/0147239 A1 | 6/2009 | Zhu et al. |
| 2009/0285590 A1 | 11/2009 | Orsley |
| 2010/0002154 A1 | 1/2010 | Hua |
| 2010/0008588 A1 | 1/2010 | Feldkhun et al. |
| 2010/0142856 A1 | 6/2010 | Takeuchi et al. |
| 2010/0149518 A1 | 6/2010 | Nordenfelt et al. |
| 2011/0001793 A1 * | 1/2011 | Moriyama ............... G01B 11/24 348/46 |
| 2011/0211243 A1 | 9/2011 | Smits |
| 2011/0249157 A1 | 10/2011 | Fredernbacn et al. |
| 2011/0304842 A1 | 12/2011 | Kao et al. |
| 2012/0017147 A1 | 1/2012 | Mark |
| 2012/0132713 A1 | 5/2012 | Chaum |
| 2012/0134537 A1 | 5/2012 | Yoon et al. |
| 2012/0140231 A1 | 6/2012 | Knox et al. |
| 2012/0187296 A1 | 7/2012 | Hollander et al. |
| 2012/0250152 A1 | 10/2012 | Larson et al. |
| 2012/0320013 A1 * | 12/2012 | Perez ..................... H04N 5/91 345/207 |
| 2013/0003081 A1 | 1/2013 | Smits |
| 2013/0021271 A1 | 1/2013 | Guo |
| 2013/0079983 A1 | 3/2013 | Ehilgen et al. |
| 2013/0038465 A2 | 4/2013 | Geller et al. |
| 2013/0176561 A1 | 7/2013 | Hidaka |
| 2013/0229669 A1 | 9/2013 | Smits |
| 2013/0239057 A1 | 9/2013 | Ubillos et al. |
| 2013/0300637 A1 | 11/2013 | Smits et al. |
| 2013/0300670 A1 | 11/2013 | Besperstov et al. |

(56) References Cited

U.S. PATENT DOCUMENTS

| | | | |
|---|---|---|---|
| 2013/0342813 | A1 | 12/2013 | Wang |
| 2014/0098179 | A1 | 4/2014 | Moore |
| 2014/0146243 | A1* | 5/2014 | Liu ............... G02B 27/017 348/838 |
| 2014/0176954 | A1 | 6/2014 | Scott et al. |
| 2014/0215841 | A1 | 8/2014 | Danbury et al. |
| 2014/0267620 | A1 | 9/2014 | Bridges |
| 2014/0273752 | A1 | 9/2014 | Bajaj et al. |
| 2014/0285818 | A1 | 9/2014 | Holz |
| 2014/0307248 | A1 | 10/2014 | Giger et al. |
| 2015/0066196 | A1 | 3/2015 | Wooldridge et al. |
| 2015/0091815 | A1 | 4/2015 | Michaelis |
| 2015/0279114 | A1 | 10/2015 | Yonekubo |
| 2015/0286293 | A1 | 10/2015 | Gruhlke et al. |
| 2016/0011312 | A1 | 1/2016 | Leyva |
| 2016/0014403 | A1 | 1/2016 | Stroetmann |
| 2016/0041266 | A1 | 2/2016 | Smits |
| 2016/0050345 | A1* | 2/2016 | Longbotham ....... G02B 27/017 348/47 |
| 2016/0335778 | A1 | 11/2016 | Smits |
| 2017/0131090 | A1 | 5/2017 | Bronstein et al. |

FOREIGN PATENT DOCUMENTS

| | | | |
|---|---|---|---|
| JP | 2001045381 A | | 2/2001 |
| JP | 2003029201 A | | 1/2003 |
| JP | 2004132914 A | | 4/2004 |
| JP | 2011197674 A | | 10/2011 |
| KR | 10-2011-0115752 A | | 10/2011 |
| WO | 1992/18971 A1 | | 10/1992 |
| WO | 2000/034818 A1 | | 6/2000 |
| WO | 2006/063577 A1 | | 6/2006 |
| WO | 2009/049272 A2 | | 4/2009 |
| WO | 2011/109402 A2 | | 9/2011 |
| WO | 2012/054231 A2 | | 4/2012 |
| WO | 2014141115 A2 | | 9/2014 |

OTHER PUBLICATIONS

European Search Report for European Patent Application No. 08837063.0 dated Nov. 19, 2010, 8 pages.
Communication Pursuant to Article 94(3) EPC in European Patent Application No. 08837063.0 dated Dec. 27, 2011, 5 pages.
Communication Pursuant to Article 94(3) EPC in European Patent Application No. 08837063.0 dated Oct. 22, 2012; 6 pages.
International Search Report and Written Opinion in International Patent Application No. PCT/US2008/079663 dated Apr. 30, 2009, 5 pages.
International Search Report and Written Opinion in International Patent Application No. PCT/US2011/026691 dated Oct. 24, 2011, 7 pages.
International Search Report in International Patent Application No. PCT/US2011/054751 dated Jan. 30, 2012, 1 page.
International Preliminary Report on Patentability in International Patent Application No. PCT/US2008/079663 dated Jan. 25, 2010, 11 pages.
International Preliminary Report on Patentability issued in PCT/US2011/026691 dated Sep. 4, 2012, 7 pages.
International Preliminary Report on Patentability issued in PCT/US2011/054751 dated Apr. 9, 2013, 7 pages.
Official Communication for U.S. Appl. No. 12/249,899 dated Sep. 14, 2011, 11 pages.
Official Communication for U.S. Appl. No. 12/249,899 dated Mar. 13, 2012, 12 pages.
Official Communication for U.S. Appl. No. 12/249,899 dated Jun. 6, 2012, 12 pages.
Official Communication for U.S. Appl. No. 13/037,949 dated Nov. 2, 2012, 12 pages.
Official Communication for U.S. Appl. No. 13/037,949 dated Aug. 26, 2013, 9 pages.
Official Communication for U.S. Appl. No. 13/605,948 dated Dec. 31, 2012, 10 pages.
Official Communication for U.S. Appl. No. 13/858,762 dated Sep. 13, 2013, 16 pages.
Official Communication for U.S. Appl. No. 13/877,652 dated Mar. 12, 2015, 20 pages.
Official Communication for U.S. Appl. No. 14/046,374 dated Feb. 20, 2014, 10 pages.
European Supplementary Search Report for European Patent Application No. 11834848.1 dated Feb. 21, 2014, 7 pages.
Official Communication for U.S. Appl. No. 13/358,762 dated Jan. 31, 2014, 15 pages.
Official Communication for U.S. Appl. No. 14/048,954 dated Feb. 26, 2014, 24 pages.
Official Communication for U.S. Appl. No. 14/048,954 dated Oct. 22, 2014, 8 pages.
International Search Report and Written Opinion for application PCT/US2015/023184 dated Jun. 29, 2015, 13 pages.
Official Communication for U.S. Appl. No. 13/877,652 dated Aug. 18, 2015, 21 pages.
Official Commnunication for U.S. Appl. No. 14,636,062 dated Sep. 25, 2015, 8 pages.
Official Communication for U.S. Appl. No. 14/671,904 dated Sep. 22, 2015, 15 pages.
Official Communication for U.S. Appl. No. 14/636,062 dated Jun. 2, 2015, 7 pages.
International Search Report and Written Opinion for PCT/US2015/044691 dated Nov. 18, 2015, 12 pages.
Official Communication for U.S. Appl. No. 14/823,668 dated Oct. 30, 2015, 12 pages.
Official Communication for U.S. Appl. No. 14/636,062 dated Dec. 14, 2015, 3 pages.
Official Communication for U.S. Appl. No. 14/823,668 dated Feb. 24, 2016, 15 pages.
Official Communication for U.S. Appl. No. 14/671,904 dated Feb. 22, 2016, 13 pages.
Official Communication for U.S. Appl. No. 13/877,652 dated Feb. 10, 2016, 22 pages.
Official Communication for U.S. Appl. No. 14/636,062 dated Feb. 1, 2016, 9 pages.
O'Toole, M., et al., Homogeneous Codes for Energy-Efficient Illumination and Imaging. ACM Transactions on Graphics, 34(4), 35:1-35:13.
Official Communication for U.S. Appl. No. 14/823,663 dated May 18, 2016, 10 pages.
Official Communication for U.S. Appl. No. 14/218,643 dated Jun. 23, 2016, 11 pages.
Official Communication for U.S. Appl. No. 13/877,652 dated Aug. 12, 2016, (22 pages).
Official Communication for U.S. Appl. No. 15/194,502 dated Aug. 19, 2016, (12 pages).
Official Communication for U.S. Appl. No. 14/636,062 dated Aug. 24, 2016, (9 pages).
International Search Report and Written Opinion for Application PCT/US2016/027386 dated Aug. 26, 2016, 10 pages.
Official Communication for U.S. Appl. No. 14/671,904 dated Sep. 28, 2016, 14 pages.
Official Communication for U.S. Appl. No. 14/218,643 dated Nov. 1, 2016, 10 pages.
Kanzawa, Y., et al., "Human Skin Detection by Visible and Near-Infrared imaging," IAPR Conference on Machine Vision Applications, Jun. 13-15, 2011; Nara Japan, 5 pages.
Office Communication for U.S. Appl. No. 13/877,652 dated May 31 2017, 23 pages.
Office Communication for U.S. Appl. No. 15/194,502 dated Mar. 9, 2017, 7 pages.
International Search Report and Written Opinion for International Application No. PCT/US2016/067626 dated Mar. 16, 2017, 12 pages.
Office Communication for U.S. Appl. No. 14/671,904 dated May 5, 2017, 11 pages.
Office Communication for U.S. Appl. No. 15/411,959 dated May 11, 2017, 9 pages.

(56) References Cited

OTHER PUBLICATIONS

International Search Report and Written Opinion for International Application No. PCT/US2017/014616 dated May 1, 2017, 11 pages.
Official Communication for U.S. Appl. No. 15/384,227 dated Feb. 7, 2017, 8 pages.
Official Communication for U.S. Appl. No. 15/384,227 dated Jul. 19, 2017, 5 pages.
Official Communication for U.S. Appl. No. 14/671,904 dated Aug. 18, 2017, 7 pages.
Official Communication for U.S. Appl. No. 15/194,502 dated Aug. 15, 2017, 7 pages.
Official Communication for U.S. Appl. No. 15/411,959 dated Aug. 29, 2017, 5 pages.
Official Communication for U.S. Appl. No. 13/877,652 dated Dec. 6, 2017, 8 pages.
Official Communication for U.S. Appl. No. 15/799,149 dated Jan. 10, 2018, 7 pages.
Official Communication for U.S. Appl. No. 15/444,182 dated Feb. 14, 2018, 8 pages.
Official Communication for U.S. Appl. 15/194,502 dated Feb. 12, 2018, 9 pages.
Official Communication for U.S. Appl. No. 15/804,392 dated Feb. 9, 2018, 10 pages.
Official Communication for U.S. Appl. No. 15/098,285 dated Apr. 19, 2018, 69 pages.
International Search Report and Written Opinion for International Patent Application No. PCT/US2017/068377 dated Apr. 17, 2018, 12 pages.

\* cited by examiner

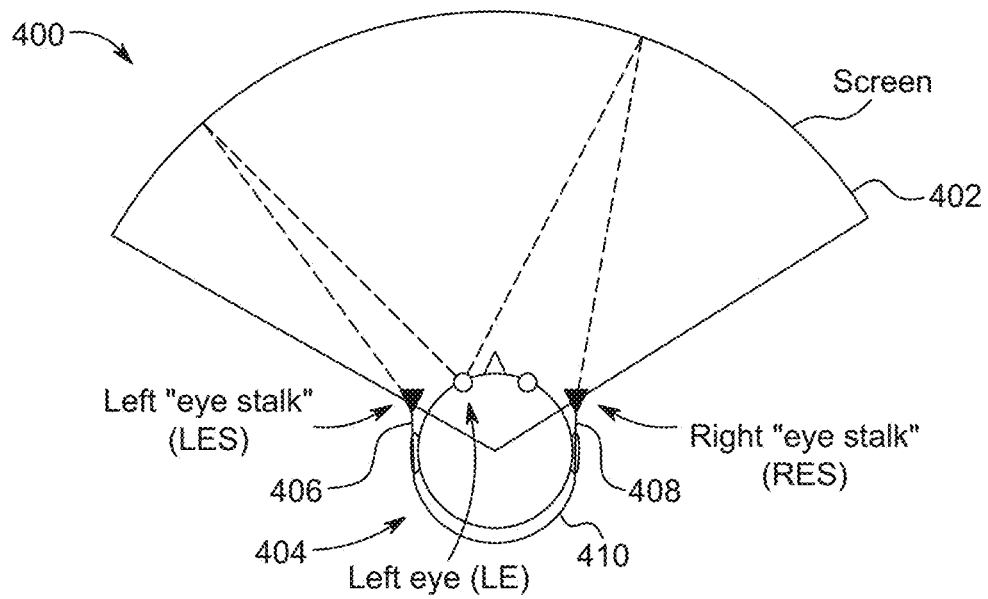
FIG. 4A
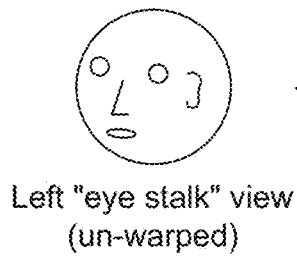
Left "eye stalk" view
(un-warped)
FIG. 4B
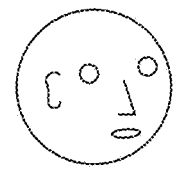
Right "eye stalk" view
(un-warped)
FIG. 4C
Reference 3D (model)
FIG. 4F
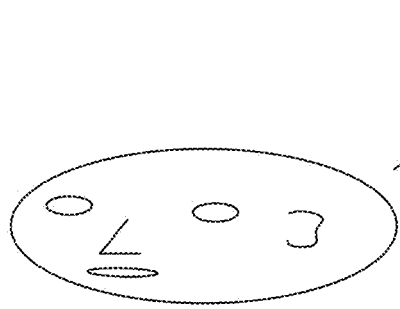
(Warped)
FIG. 4D
(Warped)
FIG. 4E (Hologram of A)
(Seen as projected by B's Headset)

(Side chat)

Formula:

$$\frac{x^2}{a^2} + \frac{y^2}{b^2} = \frac{z^2}{c}$$

C > 0 (opens upward)

a ~ curvature in xz plane
b ~ curvature in yz plane

Perspective view    Cross-sectional view

Diagonal cross-section view

Voxel
(x, y, z position vector)

Pixel
(Light reflecting on a surface element)

3. Calculate the distances $z_{13}$, $z_{14}$, $z_{15}$

4. Observe angles α 314 & α 415

5. The two triangles are fully characterized
Δ 314 & Δ 415

6. Then $C_1$, $C_3$, $C_4$, $C_5$ are fully localized (wrt $C_1$)

7. Repeat for $C_2$, $C_3$, $C_4$, $C_5$, & $C_6$

⟹ All positions fully discovered
(3 times, each)

FIG. 28A
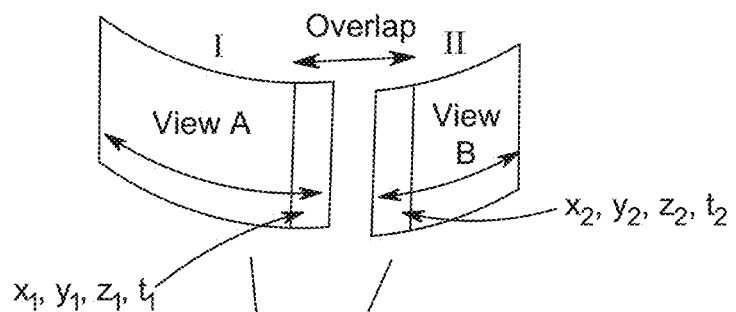
FIG. 28B
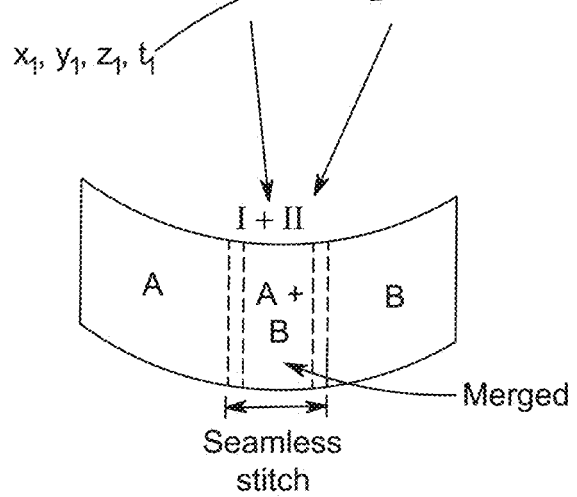
FIG. 28C
$$\begin{bmatrix} x_1 \\ y_1 \\ z_1 \\ t_1 \end{bmatrix} = \begin{bmatrix} x_2 \\ y_2 \\ z_2 \\ t_2 \end{bmatrix}$$

HOLOGRAPHIC VIDEO CAPTURE AND TELEPRESENCE SYSTEM

CROSS-REFERENCE TO RELATED APPLICATIONS

This Utility Patent Application is a Continuation of U.S. patent application Ser. No. 15/411,959 filed on Jan. 20, 2017, now U.S. Pat. No. 9,813,673 issued on Nov. 7, 2017, which is based on a previously filed U.S. Provisional Patent Application U.S. Ser. No. 62/388,334 filed on Jan. 20, 2016, and U.S. Provisional Patent Application U.S. Ser. No. 62/389,372 filed on Feb. 23, 2016, the benefit of the filing dates of which are claimed under 35 U.S.C. § 120 and § 119(e), and the contents of which are each further incorporated in entirety by reference.

TECHNICAL FIELD

The present invention relates generally to video conferencing systems and, more particularly, but not exclusively, to providing a three-dimensional tracking systems sequential pixel beam scans in highly compact laser-based projection systems.

BACKGROUND

A telepresence system typically provides a video conference to remotely located participants. Video conferences are often employed to communicate with remotely located family relatives, business employees, coworkers, online gamers, or the like each other. Telepresence systems typically provide real-time, near-real-time, or pre-recorded video to each remotely located participant of the video conference. Usually, a telepresence system employs at least one camera at each remoted location to capture video of a scene that includes a participant. Also, each captured video is concurrently displayed to each remote participant that opts into viewing a video corresponding to one or more other selected participants.

Until now, it has been difficult for telepresence systems to capture videos of each scene of remotely located video conference participant that can be used to easily and efficiently display three-dimensional videos of each participant to each other. In particular, the difficulty in capturing multiple viewable perspectives of each remotely located participant has created issues in providing reliable and economically feasible three-dimensional videos.

BRIEF DESCRIPTION OF THE DRAWINGS

FIG. 4A illustrates an embodiment of a two-dimensional overhead view of an exemplary telepresence system that includes a concave mirrored surface and a head-mounted projection display system having a left eye stalk and a right eye stalk;

FIG. 4B shows an embodiment of an exemplary un-warped view from a perspective of a left eye stalk of a head-mounted projection display system, such as that illustrated in FIG. 4A, derived from a warped view from a concave mirrored surface as captured by the left eye stalk, such as that of FIG. 4A;

FIG. 4C illustrates an embodiment of an exemplary un-warped view from a perspective of a right eye stalk of a head-mounted projection display system, such as that illustrated in FIG. 4A, derived from a warped view from a concave mirrored surface as captured by the right eye stalk, such as that of FIG. 4A;

FIG. 4D shows an embodiment of an exemplary warped view from a concave mirrored surface, such as that of FIG. 4A, as captured by a left eye stalk of a head-mounted projection display system, such as that illustrated in FIG. 4A;

FIG. 4E illustrates an embodiment of an exemplary warped view from a concave mirrored surface, such as that of FIG. 4A, as captured by a right eye stalk of a head-mounted projection display system, such as that illustrated in FIG. 4A;

FIG. 4F shows an embodiment of an exemplary three-dimensional model view from a perspective of a head-mounted projection display system, such as that illustrated in FIG. 4A, derived from warped views from a concave mirrored surface as captured by left and right eye stalks of the head-mounted projection display system, such as that of FIG. 4A;

FIG. 28A shows an embodiment of a three-dimensional perspective view of exemplary images that each include portions associated with matching coordinate values;

FIG. 28B illustrates an embodiment of a three-dimensional perspective view of exemplary images, such as those of FIG. 28A, stitched together based on portions in each of the images that are associated with matching coordinate values;

FIG. 28C shows an embodiment of an exemplary formula that indicates that two matrices are equal to each other because both matrices represent the same voxel surface point and the same time value;

DETAILED DESCRIPTION OF THE EMBODIMENTS

Figure 1A:
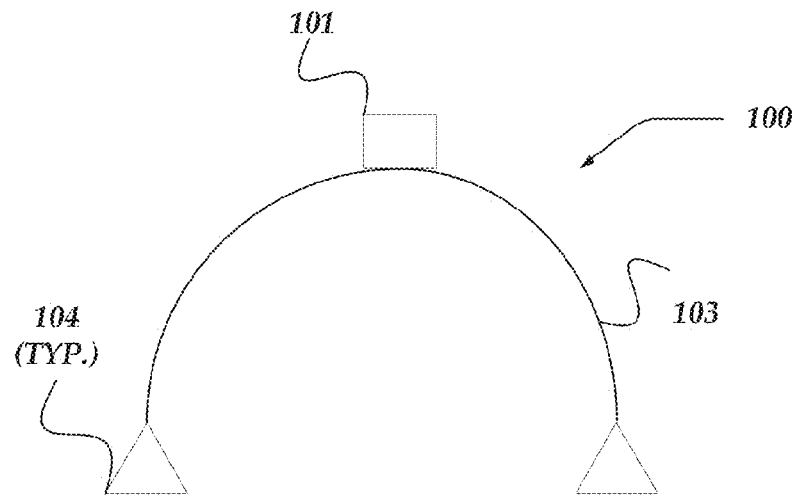
FIG. 1A shows an embodiment of an exemplary head mounted display system.

Various embodiments now will be described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may take the form of an entirely hardware embodiment, an entirely software embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "photon beam," "light beam," "electromagnetic beam," "image beam," or "beam" refer to a somewhat localized (in time and space) beam or bundle of photons or electromagnetic (EM) waves of various frequencies or wavelengths within the EM spectrum.

As used herein, the terms "light source," "photon source," or "source" refer to various devices that are capable of emitting, providing, transmitting, or generating one or more photons or EM waves of one or more wavelengths or frequencies within the EM spectrum. A light or photon source may transmit one or more outgoing light beams. A photon source may be a laser, a light emitting diode (LED), a light bulb, or the like. A photon source may generate photons via stimulated emissions of atoms or molecules, an incandescent process, or various other mechanism that generates an EM wave or one or more photons. A photon source may provide continuous or pulsed outgoing light beams of a predetermined frequency, or range of frequencies. The outgoing light beams may be coherent light beams. The photons emitted by a light source may be of various wavelengths or frequencies.

As used herein, the terms "photon detector," "light detector," "detector," "photon sensor," "light sensor," or "sensor" refer to various devices that are sensitive to the presence of one or more photons of one or more wavelengths or frequencies of the EM spectrum. A photon detector may include an array of photon detectors, such as an arrangement of a plurality of photon detecting or sensing pixels. One or more of the pixels may be a photosensor that is sensitive to the absorption of one or more photon. A photon detector may generate a signal in response to the absorption of one or more photons. A photon detector may include a one-dimensional (1D) array of pixels. However, in other embodiments, photon detector may include at least a two-dimensional (2D) array of pixels. The pixels may include various photon-sensitive technologies, such as one or more of active-pixel sensors (APS), charge-coupled devices (CCDs), Single Photon Avalanche Detector (SPAD) (operated in avalanche mode or Geiger mode), photovoltaic cells, phototransistors, or the like. A photon detector may detect one or more incoming light beams.

As used herein, the term "mirrored surface" refers to one or more various 2D or 3D bodies that reflect at least a portion of incident light, EM waves, or photons. For instance, a mirrored surface may reflect an outgoing light beam that is transmitted by various ones of the various embodiments disclosed herein. In the various embodiments described herein, one or more photon sources may be in relative motion to one or more of photon detectors and/or one or more mirrored surfaces. Similarly, one or more photon detectors may be in relative motion to one or more of photon sources and/or one or more mirrored surfaces. One or more mirrored surfaces may be in relative motion to one or more of photon sources and/or one or more photon detectors.

As used herein, the terms "reflect" and "reflection" refer to one of: (1) specular reflection is used for mirroring images being captured and the light beams making up these images; (2) retro reflection that provides for reflecting light beams back to its source with a minimum of scattering along a vector that is parallel to but opposite in direction from the light beam's source. In one or more embodiments, retro reflection may be used in ultralight, or where a stereo image pair is made or projected to be seen by the user's eyes; and (3) diffuse reflection may be used to generally illuminate a surface with diffused light beams. In one or more embodiments, the diffused light beams may be employed to make images using the optics of a camera.

The following briefly describes embodiments of the invention to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to recording, transmitting, and displaying a three-dimensional video image of a face of a user to another remotely located user. Reflected light from a curved or geometrically shaped screen is employed to provide multiple perspective views of the user's face that are transformed into the image, which is communicated to the remotely located user. A head mounted projection display system is employed to capture the reflective light. The system includes a frame, that when worn by a user, wraps around and grips the user's head. Also, at least two separate image capture modules are included on the frame and generally positioned relatively adjacent to the left and right eyes of a user when the system is worn. Each module includes one or more sensor components, such as cameras, that are arranged to detect at least reflected non-visible light from a screen positioned in front of the user. Optionally, the screen is retroreflective.

In one or more embodiments, a head mounted projection display system includes a frame, that when worn by a user, wraps around and grips a head of the user. Also, at least two separate image capture modules are included on the frame and, in one or more embodiments, may be generally positioned relatively adjacent to the left and right eyes of a user when the system is worn. Each module includes one or more sensor components, such as cameras, that are arranged to detect at least reflected non-visible light from a screen positioned in front of the user. One non-limiting example of such a head mounted projection display system is the PhotonJet UltraLight™ system.

In one or more embodiments, the detected non-visible light is employed to determine multiple perspective views of a face of the user wearing the head mounted projection display system. The multiple perspective views of the user's face are employed to recreate a virtual three-dimensional image (avatar) of the user's face and head, which is subsequently transmitted and displayed to another user that is remotely located. In one or more other embodiments, the virtual image is not limited to the user's face, and may include other parts of the user's body that are recreated for display to the other user.

In one or more embodiments, the image capture modules may be arranged to include one or more projectors of non-visible light, such as infrared light, that emit towards a screen that is positioned to reflect the non-visible light back towards the one or more sensor components. In one or more embodiments, the one or more projectors of non-visible light may be disposed on a ceiling, wall, desk or any other location near the user to project the non-visible light towards the screen which is reflected at the face of the user. In one or more embodiments, the one or more projectors are scanners that scan laser beams of non-visible light onto the screen, which is reflected back onto the face of the user and the non-visible light sensors.

Also, in one or more embodiments, during scanning of the non-visible light beams, individual pixels are illuminated sequentially by the scanned non-visible light beam reflecting from a spot (voxel) on a screen and/or the user's face. In this way, each sequentially illuminated pixel for a corresponding voxel may be detected by one or more sensor components of the image capture modules. Optionally, during scanning of visible light beams, individual pixels are similarly sequentially illuminated for a corresponding voxel.

In one or more embodiments, the screen may be curved, or have a geometric shape, such as a triptych, or the like, to reflect the non-visible light from the user's face towards the receiver components of the system while providing multiple perspective views of the face.

In one or more embodiments, a surface of the screen may include a coating, or be composed of a material, that primarily reflects non-visible light back towards the user while being transparent to colored light. This type of screen may also be arranged to project a colored light image, such as a face of a remotely located user, through its surface towards the face of the user while reflecting the non-visible light towards the face. In one or more embodiments, the screen may be retroreflective.

In one or more embodiments, the image capture modules may also include one or more projectors of visible light, such as colored light, which are arranged to project visible light, towards a screen that reflects the visible light back towards the face of the user. In one or more embodiments, the one or more visible light projectors may be configured as scanners that scan laser beams of visible light onto the screen. In one or more embodiments, the projected visible light may also include one or more color light images of three-dimensional avatars that correspond to one or more remotely located users. Also, in one or more embodiments, the image capture modules may also include sensors for detecting reflections of the visible light from the screen and/or the face of the user.

Illustrated Operating Environment

FIG. 1A illustrates a top view of head mounted projection display system 100. As shown, the system includes frame 103 that when worn by a user, wraps around and grips a head of the user. Modules 104 are included with frame 103 and are arranged to be generally positioned relatively adjacent to the left and right eyes of a user when system 100 is worn on a head of the user. Each module 104 includes one or more receiver components (not shown) that are arranged to detect reflected non-visible light from a screen positioned in front of a face of the user. In one or more embodiments, the detected non-visible light is employed to determine multiple perspectives of the face of a user wearing the head mounted projection display system. The multiple perspectives of the user's face are employed to recreate a virtual three-dimensional image of the user's face and head, which is displayed to another user that is remotely located. In one or more other embodiments, the virtual image is not limited to the user's face, and may include other parts of the user's body that are recreated for display to the other user.

In one or more embodiments, a surface of the screen may include a coating, or be composed of a material, that primarily reflects non-visible light back towards the user while being transparent to colored light. Also, in one or more embodiments, a primarily non-visible light reflective screen may also be arranged to project a colored light image, such as a face of a remotely located user, through its surface towards the face of the user.

In one or more embodiments, modules 104 may also include one or more projectors of visible light, such as colored light, which are arranged to project an image, such as a face of a remote user, towards a screen that reflects the image back towards the face of the user. In one or more embodiments, the projectors of visible light are light scanners.

In one or more embodiments, modules 104 may be arranged to include one or more projectors (not shown) of non-visible light, such as infrared light, towards a screen (not shown) that is positioned to reflect the non-visible light back towards the one or more receiver components. In one or more embodiments, one or more projectors of non-visible light may be disposed on a ceiling, wall, desk or any other location near the user, to project the non-visible light at the screen so that this light is reflected towards the face of the user. In one or more embodiments, the projectors may be light scanners.

In one or more embodiments, the components of system 100 discussed herein may include various embodiments of such systems that are described in detail in at least U.S. Pat. No. 8,282,222, U.S. Pat. No. 8,430,512, U.S. Pat. No. 8,696,141, U.S. Pat. No. 8,711,370, U.S. Patent Publication No. 2013/0300,637, and U.S. Patent Publication No. 2016/0041266. Note that each of the U.S. patents and U.S. patent publications listed above are herein incorporated by reference in the entirety.

In one or more embodiments, frame 103 includes computer 101 which is arranged as a client computer to process the received perspective views into signals that are communicated to one or more of a telepresence server application on a network computer and/or a telepresence client application on another client computer for another head mounted projection system. The client computer and network computer are discussed in greater detail in regard to FIGS. 1B, 2, and 3.

Figure 1B:
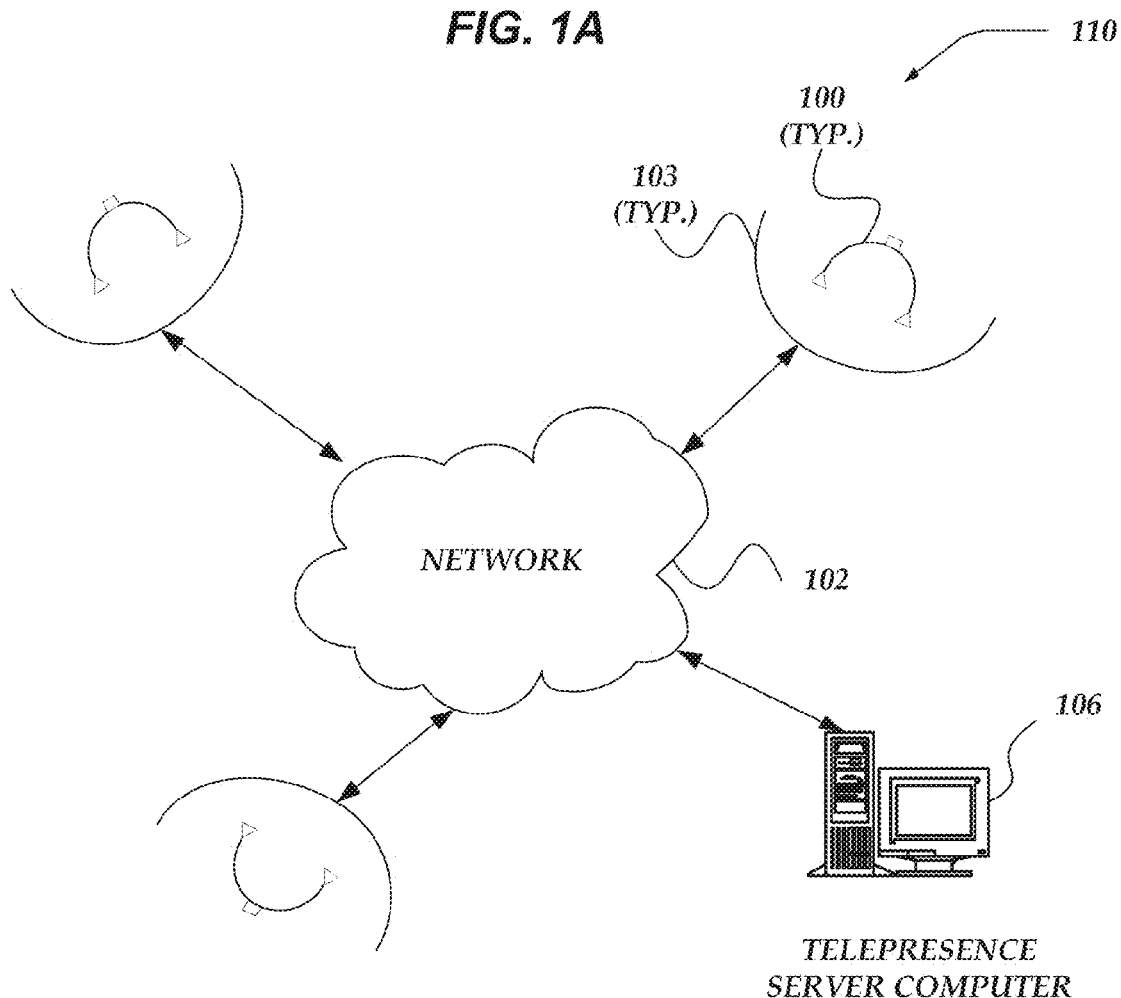
FIG. 1B illustrates an environment in which various embodiments of the invention may be implemented.

FIG. 1b shows exemplary components of one embodiment of an exemplary environment in which various exemplary embodiments of the invention may be practiced. Not all of the components may be required to practice the invention, and variations in the arrangement and type of the components may be made without departing from the spirit or scope of the invention. As shown, system 110 of FIG. 1b includes network 102, telepresence server computer 106, and several head mounted projection display systems 100, and screens 107.

Based on the transmitted signals, from each of systems 100, that represent multiple perspective views of at least a user's face, telepresence server computer 106 may employ these views to recreate a virtual image of the position, orientation, and expression of a user's face for display by another remotely located system for user. It should be understood that one or more portions of the functionality of telepresence server computer 106 can be performed by one or more of the head mounted projection display system 100. Various embodiments of head mounted projection display systems and telepresence servers are described in more detail below in conjunction with FIGS. 2 and 3.

Network 102 may be configured to couple network computers with other computing devices, including head mounted projection display system 100. Network 102 may include various wired and/or wireless technologies for communicating with a remote device, such as, but not limited to, USB cable, Bluetooth®, Wi-Fi®, or the like. In some embodiments, network 102 may be a network configured to couple network computers with other computing devices. In various embodiments, information communicated between devices may include various kinds of information, including, but not limited to, processor-readable instructions, remote requests, server responses, program modules, applications, raw data, control data, system information (e.g., log files), video data, voice data, image data, text data, structured/unstructured data, or the like. In some embodiments, this information may be communicated between devices using one or more technologies and/or network protocols.

In some embodiments, such a network may include various wired networks, wireless networks, or various combinations thereof. In various embodiments, network 102 may be enabled to employ various forms of communication technology, topology, computer-readable media, or the like, for communicating information from one electronic device to another. For example, network 102 can include—in addition to the Internet—LANs, WANs, Personal Area Networks (PANs), Campus Area Networks, Metropolitan Area Networks (MANs), direct communication connections (such as through a universal serial bus (USB) port), or the like, or various combinations thereof.

In various embodiments, communication links within and/or between networks may include, but are not limited to, twisted wire pair, optical fibers, open air lasers, coaxial cable, plain old telephone service (POTS), wave guides, acoustics, full or fractional dedicated digital lines (such as T1, T2, T3, or T4), E-carriers, Integrated Services Digital Networks (ISDNs), Digital Subscriber Lines (DSLs), wireless links (including satellite links), or other links and/or carrier mechanisms known to those skilled in the art. Moreover, communication links may further employ various ones of a variety of digital signaling technologies, including without limit, for example, DS-0, DS-1, DS-2, DS-3, DS-4, OC-3, OC-12, OC-48, or the like. In some embodiments, a router (or other intermediate network device) may act as a link between various networks—including those based on different architectures and/or protocols—to enable information to be transferred from one network to another. In other embodiments, remote computers and/or other related electronic devices could be connected to a network via a modem and temporary telephone link. In essence, network 102 may include various communication technologies by which information may travel between computing devices.

Network 102 may, in some embodiments, include various wireless networks, which may be configured to couple various portable network devices, remote computers, wired networks, other wireless networks, or the like. Wireless networks may include various ones of a variety of sub-networks that may further overlay stand-alone ad-hoc networks, or the like, to provide an infrastructure-oriented connection for at least client computer (e.g., laptop computer 112 or smart phone or tablet computer 114) (or other mobile devices). Such sub-networks may include mesh networks, Wireless LAN (WLAN) networks, cellular networks, or the like. In at least one of the various embodiments, the system may include more than one wireless network.

Network 102 may employ a plurality of wired and/or wireless communication protocols and/or technologies. Examples of various generations (e.g., third (3G), fourth (4G), or fifth (5G)) of communication protocols and/or technologies that may be employed by the network may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), Orthogonal frequency-division multiplexing (OFDM), ultra-wide band (UWB), Wireless Application Protocol (WAP), user datagram protocol (UDP), transmission control protocol/Internet protocol (TCP/IP), various portions of the Open Systems Interconnection (OSI) model protocols, session initiated protocol/real-time transport protocol (SIP/RTP), short message service (SMS), multimedia messaging service (MMS), or various ones of a variety of other communication protocols and/or technologies. In essence, the network may include communication technologies by which information may travel between head mounted projection display system 100 and telepresence computer device 106, as well as other computing devices not illustrated.

In various embodiments, at least a portion of network 102 may be arranged as an autonomous system of nodes, links, paths, terminals, gateways, routers, switches, firewalls, load balancers, forwarders, repeaters, optical-electrical converters, or the like, which may be connected by various communication links. These autonomous systems may be configured to self-organize based on current operating conditions and/or rule-based policies, such that the network topology of the network may be modified.

Generalized Operation

Figure 1C:
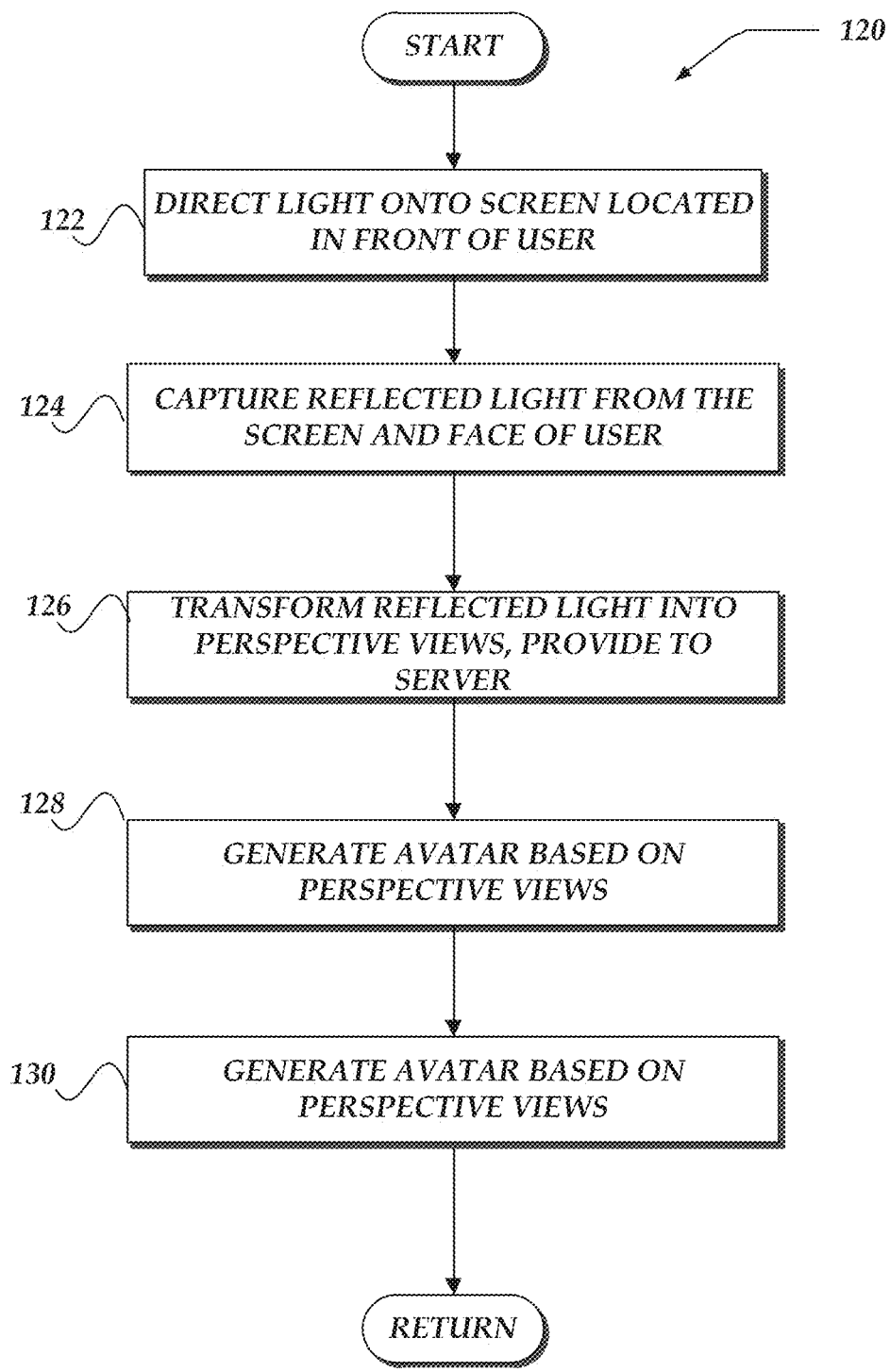
FIG. 1C illustrates a flow chart of a process for capturing and displaying three-dimensional video.

FIG. 1C illustrates a flow chart of process 120 to capture, communicate, and display a virtual three-dimensional avatar for remotely located users of a telepresence system. Moving from a start block, the process moves to block 122 where a head mounted projection display system employs light scanners to reflect laser beam light towards a non-planar screen. In at least one embodiment, the screen is curved or folded in at least one dimension, including concave, parabolic, and triptych. Also, in at least one of the embodiments, one or more portions of the scanned light is non-visible. Optionally, one or more other portions of the scanned light is visible. At block 124, reflections of the scanned light are received in real time by one or more system sensors that are generally positioned at two locations that are relatively close to a left eye and a right eye of the user. Stepping to block 126, the one or more portions of the reflected non-visible light provide multiple perspective views of a position, orientation, and expression of a face of the user. Optionally, the one or more portions of the reflected visible light are employed to determine a color and contrast of the face of the user.

The process flows to block 128, where a virtual image (avatar) of the user is generated based on the multiple perspective views that are provided to a telepresence server. At block 130, the user's avatar is communicated by the telepresence server to, and displayed by, a remotely located user of the system. Next, the process moves to a return block and continues process other actions.

It will be understood that each block of the process descriptions, and combinations of blocks in the process descriptions, can be implemented by computer program instructions. These program instructions may be provided to one or more processors to produce a machine, such that the instructions, which execute in the one or more processors, create means for implementing the actions specified in the process block or blocks. The computer program instructions may be executed by the one or more processors to cause a series of operational steps to be performed by the one or more processors to produce a computer-implemented process such that the instructions, which execute in the one or more processors to provide steps for implementing the actions specified in the process block or blocks. The computer program instructions may also cause one or more portions of one or more of the operational steps shown or otherwise described in the blocks of the process to be performed in parallel or concurrently by the one or more processors or one or more computers. Moreover, some of the steps may also be performed across more than one processor or computer. In addition, one or more blocks or combinations of blocks in the process descriptions may also be performed concurrently with other blocks or combinations of blocks, or even in a different sequence than described without departing from the scope or spirit of the innovations.

Accordingly, blocks of the process descriptions support combinations of means for performing the specified actions, combinations of steps for performing the specified actions and program instruction means for performing the specified actions. It will also be understood that each block of the process descriptions, and combinations of blocks in the process descriptions, can be implemented by special purpose hardware based systems, which perform the specified actions or steps, or combinations of special purpose hardware and computer instructions. The foregoing example should not be construed as limiting or exhaustive, but rather, an illustrative use case to show an implementation of one or more of the various embodiments of the innovations.

Further, in one or more embodiments (not shown in the figures), the logic in the exemplary process descriptions may be executed using one or more embedded logic hardware devices instead of one or more CPUs, such as an Application Specific Integrated Circuits (ASICs), Field Programmable Gate Arrays (FPGAs), Programmable Array Logic chips (PALs), or the like, or combination thereof. The embedded one or more logic hardware devices may directly execute their embedded logic to perform actions. In one or more embodiments, one or more microcontrollers may be arranged as system-on-a-chip (SOCs) to directly execute their own locally embedded logic to perform actions and access their own internal memory and their own external Input and Output Interfaces (e.g., hardware pins or wireless transceivers) to perform actions described herein.

Illustrative Client Computer

Figure 2:
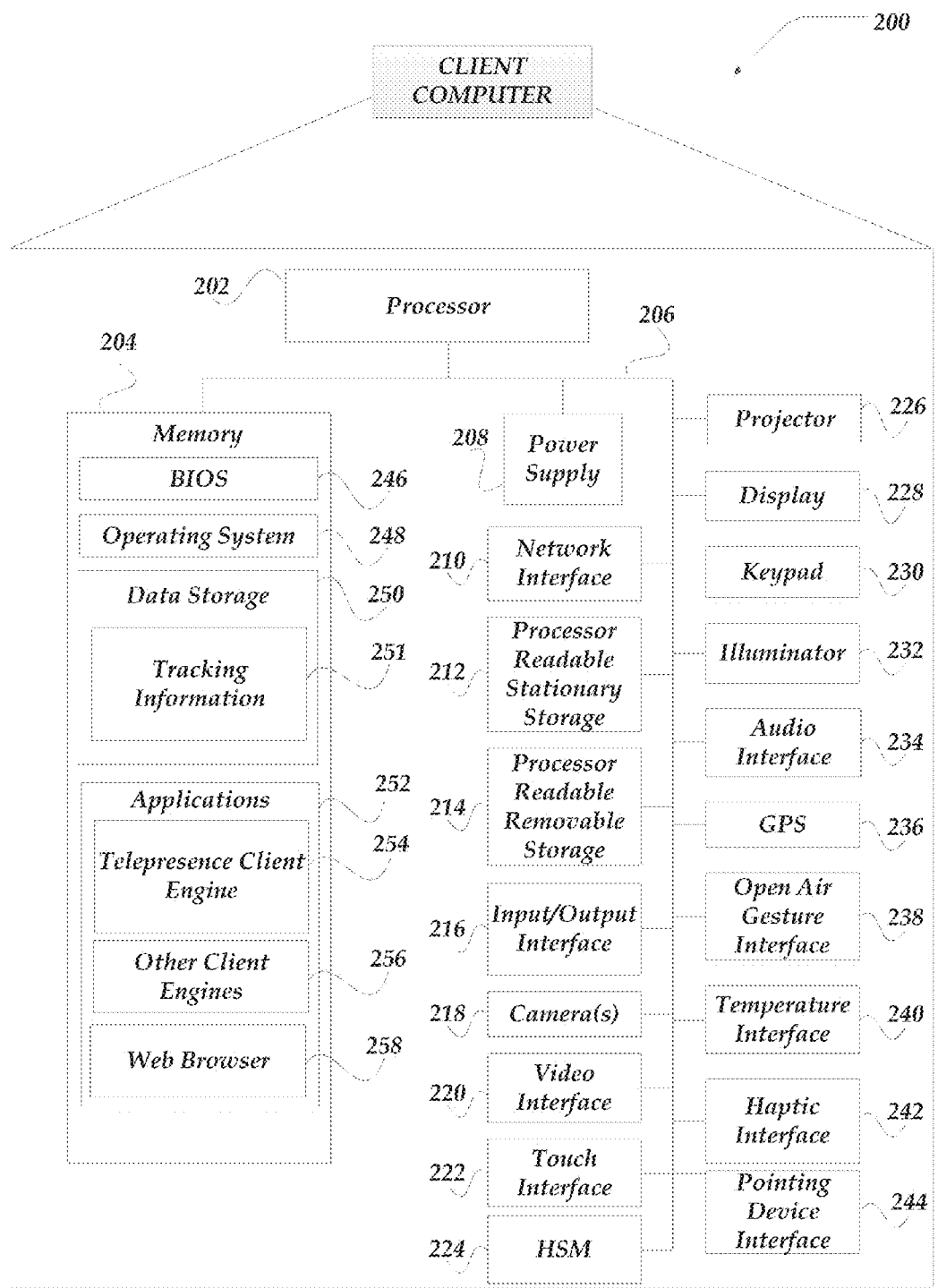
FIG. 2 illustrates an embodiment of an exemplary client computer that may be included in a system, such as that shown in FIGS. 1a and 1b.

FIG. 2 shows one embodiment of an exemplary client computer 200, which is included in a head mounted projection display system such as shown in FIGS. 1a and 1B. Computer 200 may include many more or less components than those exemplary components shown. Also, computer 200 may also be a client of network computer 300.

Computer 200 may include processor 202 in communication with memory 204 via bus 206. Client computer 200 may also include power supply 208, network interface 210, processor-readable stationary storage device 212, processor-readable removable storage device 214, input/output interface 216, camera(s) 218, video interface 220, touch interface 222, hardware security module (HSM) 224, projector 226, display 228, keypad 230, illuminator 232, audio interface 234, global positioning systems (GPS) transceiver 236, open air gesture interface 238, temperature interface 240, haptic interface 242, and pointing device interface 244. Computer 200 may optionally communicate with a base station (not shown), or directly with another computer. And in one embodiment, although not shown, a gyroscope may be employed within client computer 200 for measuring and/or maintaining an orientation of computer 200.

Power supply 208 may provide power to computer 200. A rechargeable or non-rechargeable battery may be used to provide power. The power may also be provided by an external power source, such as an AC adapter or a powered docking cradle that supplements and/or recharges the battery.

Network interface 210 includes circuitry for coupling computer 200 to one or more networks, and is constructed for use with one or more communication protocols and technologies including, but not limited to, protocols and technologies that implement various portions of the OSI model for mobile communication (GSM), CDMA, time division multiple access (TDMA), UDP, TCP/IP, SMS, MMS, GPRS, WAP, UWB, Wi-Fi™, WiMax, Bluetooth™, SIP/RTP, GPRS, EDGE, WCDMA, LTE, UMTS, OFDM, CDMA2000, EV-DO, HSDPA, or various ones of a variety of other wireless communication protocols. Network interface 210 is sometimes known as a transceiver, transceiving device, or network interface card (NIC).

Audio interface 234 may be optional and, when it is included, it may be arranged to produce and receive audio signals such as the sound of a human voice. For example, audio interface 234 may be coupled to a speaker and microphone (not shown) to enable telecommunication with others and/or generate an audio acknowledgement for some action. A microphone in audio interface 234 can also be used for input to or control of client computer 200, e.g., using voice recognition, detecting touch based on sound, and the like.

Display 228 may be optional and, when it is included, it may be a liquid crystal display (LCD), gas plasma, electronic ink, light emitting diode (LED), Organic LED (OLED) or various other types of light reflective or light transmissive displays that can be used with a computer. Display 228 may also include the touch interface 222 arranged to receive input from an object such as a stylus or a digit from a human hand, and may use resistive, capacitive, surface acoustic wave (SAW), infrared, radar, or other technologies to sense touch and/or gestures.

Projector 226 may be a remote handheld projector or an integrated projector that is capable of projecting an image on a remote wall or various other reflective objects such as a remote screen.

Video interface 220 may be arranged to capture video images, such as a still photo, a video segment, an infrared video, or the like. For example, video interface 220 may be coupled to two or more digital cameras. Video interface 220 may comprise a lens, an image sensor, and other electronics for each camera. Image sensors may include a complementary metal-oxide-semiconductor (CMOS) integrated circuit, charge-coupled device (CCD), or various other integrated circuits for sensing light.

Keypad 230 may be optional and, when it is included, it may comprise various input devices arranged to receive input from a user. For example, keypad 230 may include a push button numeric dial, or a keyboard. Keypad 230 may also include command buttons that are associated with selecting and sending images.

Illuminator 232 may be optional and, when it is included, it may provide a status indication and/or provide light. Illuminator 232 may remain active for specific periods of time or in response to event messages. For example, if illuminator 232 is active, it may backlight the buttons on keypad 230 and stay on while the client computer is powered. Also, illuminator 232 may backlight these buttons in various patterns if particular actions are performed, such as dialing another client computer. Illuminator 232 may also cause light sources positioned within a transparent or translucent case of the client computer to illuminate in response to actions.

Further, computer 200 may also optionally comprise HSM 224 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 224 may be arranged as a hardware card that may be added to the computer.

Computer 200 may also comprise input/output interface 216 for communicating with external peripheral devices or other computers such as other client computers and network computers. The peripheral devices may include an audio headset, virtual reality headsets, display screen glasses, remote speaker system, remote speaker and microphone system, and the like. Input/output interface 216 can utilize one or more technologies, such as Universal Serial Bus (USB), Infrared, Wi-Fi™, WiMax, Bluetooth™, and the like.

Input/output interface 216 may also optionally include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to computer 200.

Haptic interface 242 may be optional and, when it is included, it may be arranged to provide tactile feedback to a user of computer 200. For example, the haptic interface 242 may be employed to vibrate computer 200 in a particular way in response to an event. Temperature interface 240 may be optional and, when it is included, it may be used to provide a temperature measurement input and/or a temperature changing output to a user of computer 200. Open air gesture interface 238 may be optional and, when it is included, it may sense physical gestures of a user of computer 200, for example, by using single or stereo video cameras, radar, a gyroscopic sensor inside a computer held or worn by the user, or the like. Cameras 218 may be used to track a physical position of a user of computer 200.

GPS transceiver 236 is optional, and when it is included, it can be employed to determine the physical coordinates of computer 200 on the surface of the Earth, which typically outputs a location as latitude and longitude values. GPS transceiver 236 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of computer 200 on the surface of the Earth. It is understood that under different conditions, GPS transceiver 236 can determine a physical location for computer 200. In one or more embodiments, however, computer 200 may, through other components, provide other information that may be employed to determine a physical location of the client computer, including for example, a Media Access Control (MAC) address, IP address, and the like.

Human interface components may be optional and, when they are included, they can be peripheral devices that are physically separate from computer 200, allowing for remote input and/or output to computer 200. For example, information routed as described here through human interface components such as optional display 228 or optional keypad 230 can instead be routed through network interface 210 to appropriate human interface components that are located remotely. Examples of optional human interface peripheral components that may be remote include, but are not limited to, audio devices, pointing devices, keypads, displays, cameras, projectors, and the like. These peripheral components may communicate over a Pico Network such as Bluetooth™ Zigbee™ and the like. One non-limiting example of such peripheral human interface components might include a remote pico projector along with two or more cameras that detect the physical position and orientation of a user, and also project, by the pico projector, a video or image onto a reflected surface such as a screen or a wall.

Memory 204 may include RAM, ROM, and/or other types of memory. Memory 204 illustrates an example of computer-readable storage media (devices) for storage of information such as computer-readable instructions, data structures, program modules or other data. Memory 204 may store BIOS 246 for controlling low-level operation of client computer 200. The memory may also store operating system 248 for controlling the operation of client computer 200. It will be appreciated that this component may include a general-purpose operating system such as a version of UNIX, or LINUX', or a specialized client computer communication operating system such as Windows™, or the Apple iOS® operating system. The operating system may include, or interface with a Java virtual machine module that enables control of hardware components and/or operating system operations via Java application programs.

Memory 204 may further optionally include one or more data storage 250, which can be utilized by computer 200 to store, among other things, applications 252 and/or other data. For example, data storage 250 may also be employed to store information that describes various capabilities of computer 200. In one or more of the various embodiments, data storage 250 may store tracking information 251. The information 251 may then be provided to another eye stalk computer or network computer based on various ones of a variety of methods, including being sent as part of a header during a communication, sent upon request, or the like. Data storage 250 may also be employed to store social networking information including address books, buddy lists, aliases, user profile information, or the like. Data storage 250 may further include program code, data, algorithms, and the like, for use by a processor, such as processor 202 to execute and perform actions. In one embodiment, at least some of data storage 250 might also be stored on another optional component of computer 200, including, but not limited to, non-transitory processor-readable stationary storage device 212, processor-readable removable storage device 214, or even external to the client computer.

Applications 252 may include computer executable instructions which, if executed by computer 200, transmit, receive, and/or otherwise process instructions and data. Applications 252 may include, for example, telepresence client engine 254, other client engines 256, web browser 258, or the like. Computer 200 may be arranged to exchange communications, such as, queries, searches, messages, notification messages, event messages, alerts, performance metrics, log data, API calls, or the like, combination thereof, with telepresence application servers, network file system applications, and/or storage management applications.

The optional web browser engine 226 may be configured to receive and to send web pages, web-based messages, graphics, text, multimedia, and the like. The computer's optional browser engine 226 may employ virtually various programming languages, including a wireless application protocol messages (WAP), and the like. In one or more embodiments, the browser engine 258 is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), computer 200 may include a hardware microcontroller instead of a CPU. In one or more embodiments, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Network Computer

Figure 3:
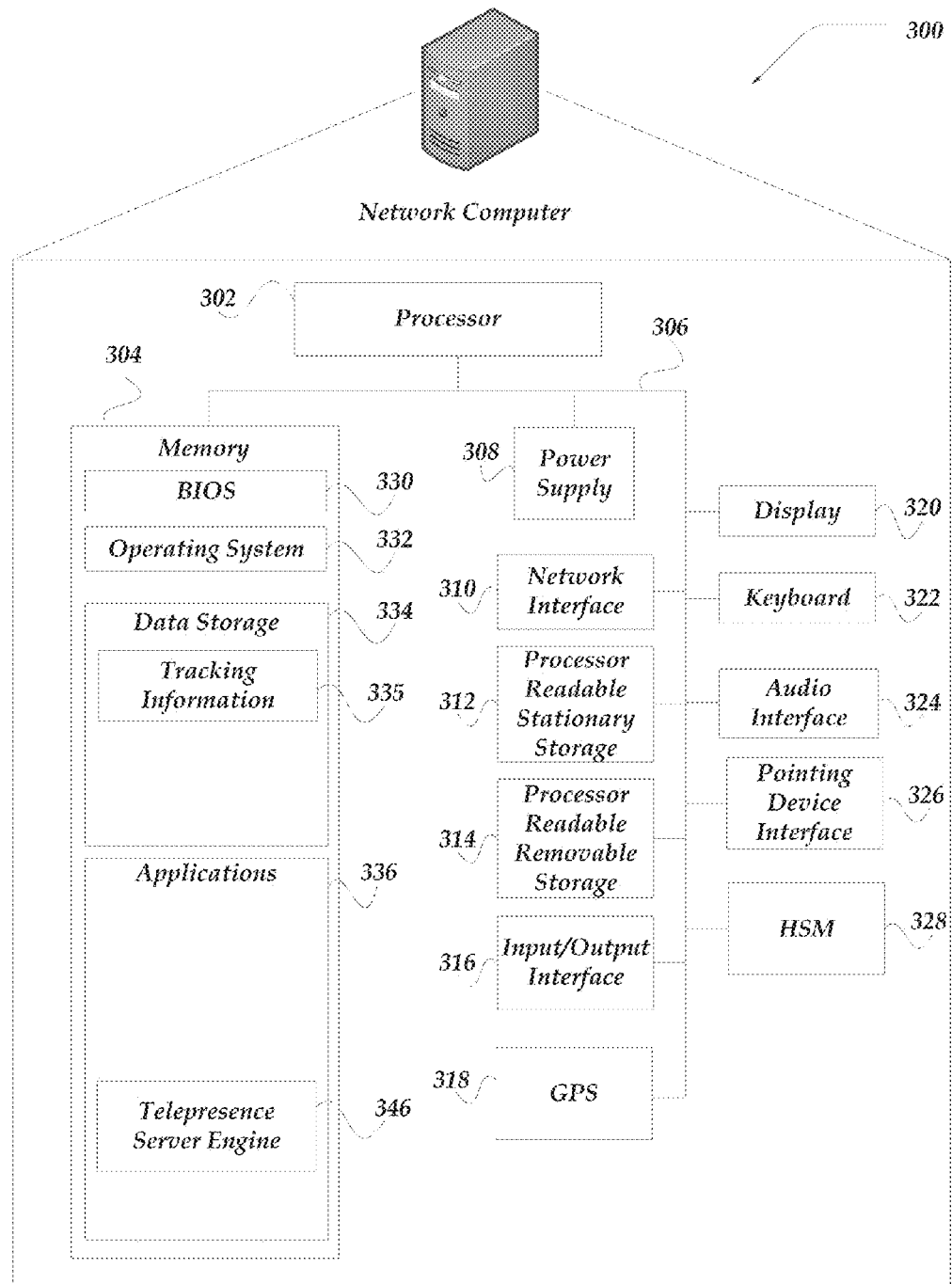
FIG. 3 shows an embodiment of an exemplary network computer that may be included in a system, such as that shown in FIG. 1b.

FIG. 3 shows one embodiment of an exemplary network computer 300 that may be included in an exemplary system implementing one or more of the various embodiments. Network computer 300 may include some, all, or more components than those shown in FIG. 3. However, the components shown are sufficient to disclose an illustrative embodiment. Network computer 300 may include a desktop computer, a laptop computer, a tablet computer, a server computer, a client computer, and the like. Network computer 300 may represent one embodiment of telepresence server computer 106 of system 100 of FIG. 1b.

As shown in FIG. 3, network computer 300 includes processor 302 that may be in communication with memory 304 via bus 306. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 308, network interface 310, processor-readable stationary storage device 312, processor-readable removable storage device 314, input/output interface 316, GPS transceiver 318, display 320, keyboard 322, audio interface 324, pointing device interface 326, and HSM 328. Power supply 308 provides power to network computer 300.

Network interface 310 includes circuitry for coupling network computer 300 to one or more networks, and is constructed for use with one or more communication protocols and technologies including, but not limited to, protocols and technologies that implement various portions of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MIMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or various ones of a variety of other wired and wireless communication protocols. Network interface 310 is sometimes known as a transceiver, transceiving device, or network interface card (NIC). Network computer 300 may optionally communicate with a base station (not shown), or directly with another computer.

Audio interface 324 is arranged to produce and receive audio signals such as the sound of a human voice. For example, audio interface 324 may be coupled to a speaker and microphone (not shown) to enable telecommunication with others and/or generate an audio acknowledgement for some action. A microphone in audio interface 324 can also be used for input to or control of network computer 300, for example, using voice recognition.

Display 320 may be a liquid crystal display (LCD), gas plasma, electronic ink, light emitting diode (LED), Organic LED (OLED) or various other types of light reflective or light transmissive display that can be used with a computer. Display 320 may be a handheld projector or pico projector capable of projecting an image on a wall or other object.

Network computer 300 may also comprise input/output interface 316 for communicating with external devices or computers not shown in FIG. 3. Input/output interface 316 can utilize one or more wired or wireless communication technologies, such as USB™, Firewire™, Wi-Fi™ WiMax, Thunderbolt™, Infrared, Bluetooth™, Zigbee™, serial port, parallel port, and the like.

Also, input/output interface 316 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to network computer 300. Human interface components can be physically separate from network computer 300, allowing for remote input and/or output to network computer 300. For example, information routed as described here through human interface components such as display 320 or keyboard 322 can instead be routed through the network interface 310 to appropriate human interface components located elsewhere on the network. Human interface components include various components that allow the computer to take input from, or send output to, a human user of a computer. Accordingly, pointing devices such as mice, styluses, track balls, or the like, may communicate through pointing device interface 326 to receive user input.

GPS transceiver 318 can determine the physical coordinates of network computer 300 on the surface of the Earth, which typically outputs a location as latitude and longitude values. GPS transceiver 318 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 318 can determine a physical location for network computer 300. In one or more embodiments, however, network computer 300 may, through other components, provide other information that may be employed to determine a physical location of the client computer, including for example, a Media Access Control (MAC) address, IP address, and the like.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 330 for controlling low-level operation of network computer 300. The memory also stores an operating system 332 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs. Likewise, other runtime environments may be included.

Memory 304 may further include one or more data storage 334, which can be utilized by network computer 300 to store, among other things, applications 336 and/or other data. For example, data storage 334 may also be employed to store information that describes various capabilities of network computer 300. In one or more of the various embodiments, data storage 334 may store tracking information 335. The tracking information 335 may then be provided to another device or computer based on various ones of a variety of methods, including being sent as part of a header during a communication, sent upon request, or the like. Data storage 334 may also be employed to store social networking information including address books, buddy lists, aliases, user profile information, or the like. Data storage 334 may further include program code, data, algorithms, and the like, for use by one or more processors, such as processor 302 to execute and perform actions such as those actions described below. In one embodiment, at least some of data storage 334 might also be stored on another component of network computer 300, including, but not limited to, non-transitory media inside non-transitory processor-readable stationary storage device 312, processor-readable removable storage device 314, or various other computer-readable storage devices within network computer 300, or even external to network computer 300.

Applications 336 may include computer executable instructions which, if executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 336 may include tracking engine 346 that performs actions further described below. In one or more of the various embodiments, one or more of the applications may be implemented as modules and/or components of another application. Further, in one or more of the various embodiments, applications may be implemented as operating system extensions, modules, plugins, or the like.

Furthermore, in one or more of the various embodiments, telepresence engine 346 may be operative in a cloud-based computing environment. In one or more of the various embodiments, these applications, and others, may be executing within virtual machines and/or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines and/or virtual servers dedicated to tracking engine 346 may be provisioned and de-commissioned automatically.

Also, in one or more of the various embodiments, telepresence engine 346 or the like may be located in virtual servers running in a cloud-based computing environment rather than being tied to one or more specific physical network computers.

Further, network computer 300 may optionally comprise HSM 328 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 328 may be a stand-alone network computer, in other cases, HSM 328 may be arranged as a hardware card that may be installed in a network computer.

Additionally, in one or more embodiments (not shown in the figures), the network computer may include one or more embedded logic hardware devices instead of one or more CPUs, such as, an Application Specific Integrated Circuits (ASICs), Field Programmable Gate Arrays (FPGAs), Programmable Array Logics (PALs), or the like, or combination thereof. The embedded logic hardware devices may directly execute embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins and/or wireless transceivers) to perform actions, such as System On a Chip (SOC), or the like.

Illustrative Architecture of Head Mounted Projection System

FIG. 4A illustrates an embodiment of a two-dimensional overhead view of exemplary telepresence system 400 that provides three dimensional video conferencing. In some of the various embodiments, telepresence system 400 may include a mirrored surface 402 and a head-mounted projection display system 404 having a frame with left eye stalk 406 and right eye stalk 408. In one or more of the various embodiments, left eye stalk 406 and right eye stalk 408 may be communicably or mechanically coupled to each other by one or more wearable supports 410.

The user wears the head-mounted projection display system, such as head-mounted projection display system 404 on their head above their eyebrows, so that it does not obscure the user's face. One non-limiting example of such a system is the PhotonJet UltraLight™ system.

In one or more of the various embodiments, mirrored surface 402 may be a projection screen with a concave surface, or alternatively a geometric multi-planar mirror surface, such as a triptych, that is arranged for a user in the concave perspective. In one or more of the various embodiments, the user may face concave mirrored surface 402 while mirrored surface 402 is arranged around the user.

In one or more of the various embodiments, one or more of left eye stalk 406 or right eye stalk 408 may include one or more cameras for receiving non-visible light. In some of the various embodiments, one or more cameras on a head mounted system (on the user's head), such as cameras of head-mounted projection display system 404, see a facial image reflected in a concave surface of a screen, such as mirrored surface 402, in one or more wavelengths (e.g., Near Infrared (NIR) light, such as light at 850 nm).

In one or more of the various embodiments, after reflecting on mirrored surface 402, from the vantage point of a camera or a detector mounted on the head-mounted projection display system 404, the facial images may appear to stretch laterally across mirrored surface 402, similar to the effect of a carnival fun mirror with concave cylindrical horizontal distortion. (See FIGS. 4D and 4E).

In one or more of the various embodiments, these stretched images may include one or more captured views of the user's face from multiple perspective angles simultaneously, such that the images appear both stretched and wrapped around the head, such as shown for left eye stalk 406 in FIG. 4D and as shown for right eye stalk 408 in FIG.

4E. An unwarped view of the user's head from the left eye stalk is shown in FIG. 4B, and from the right eye stalk is shown in FIG. 4C. Also, a reference three-dimensional straight ahead view is shown in FIG. 4F.

Figure 5:
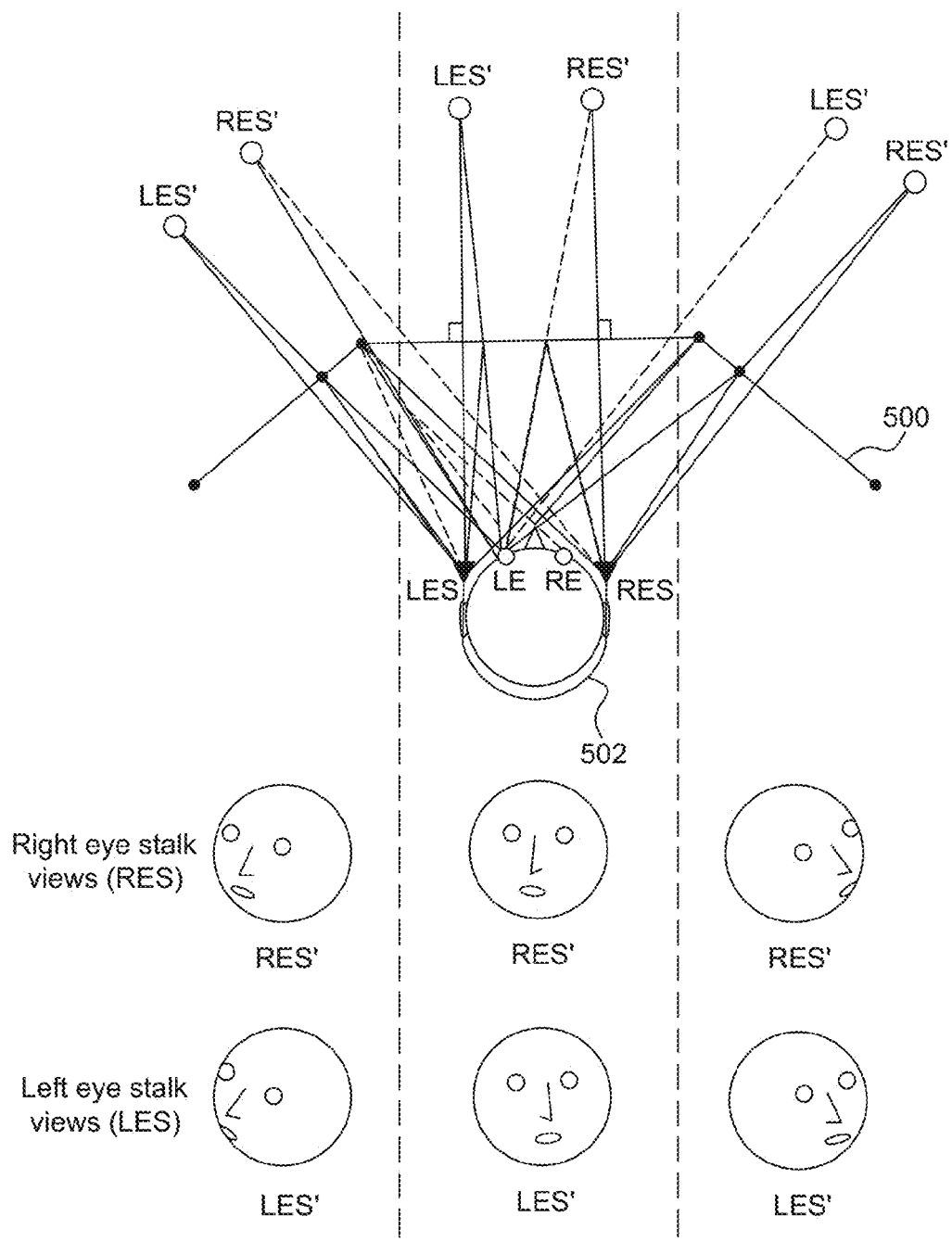
FIG. 5 illustrates an embodiment of a two-dimensional logical ray diagram for an exemplary concavely oriented triptych-style mirrored surface and an exemplary head-mounted projection display system having a left eye stalk and a right eye stalk, along with views from each panel of the triptych-style mirrored surface as captured by the left and right eye stalks.

FIG. 5 illustrates an embodiment of a two-dimensional logical ray diagram for an exemplary concavely oriented triptych-style folded mirrored surface 500 and an exemplary head-mounted projection display system 502 having a left eye stalk and a right eye stalk, along with views from each panel of the triptych-style mirrored surface as captured by the left and right eye stalks;

In one or more of the various embodiments, the curved or folded mirror reflection recording arrangement may provide a warped geometric inversion of what otherwise may have been a stereoscopic wide-angle panoramic video recording. For example, it is as if a plurality of stereo camera pairs were arranged in a wide arc around the viewer and embedded in the display screen itself. This array of virtual cameras is looking inwards towards the center, approximately the position of the user's face, rather than outwards towards the periphery, as in panoramic cameras, as present in many conferencing rooms in front of or above the screen. Instead, the various embodiments of the invention capture images from a three-dimensional surround style "selfie" perspective. In this way, these captured images appear as if they were filmed with one or more cameras that are swept around the user's face from the left ear to a full frontal view and all the way to the right ear.

Figure 18:
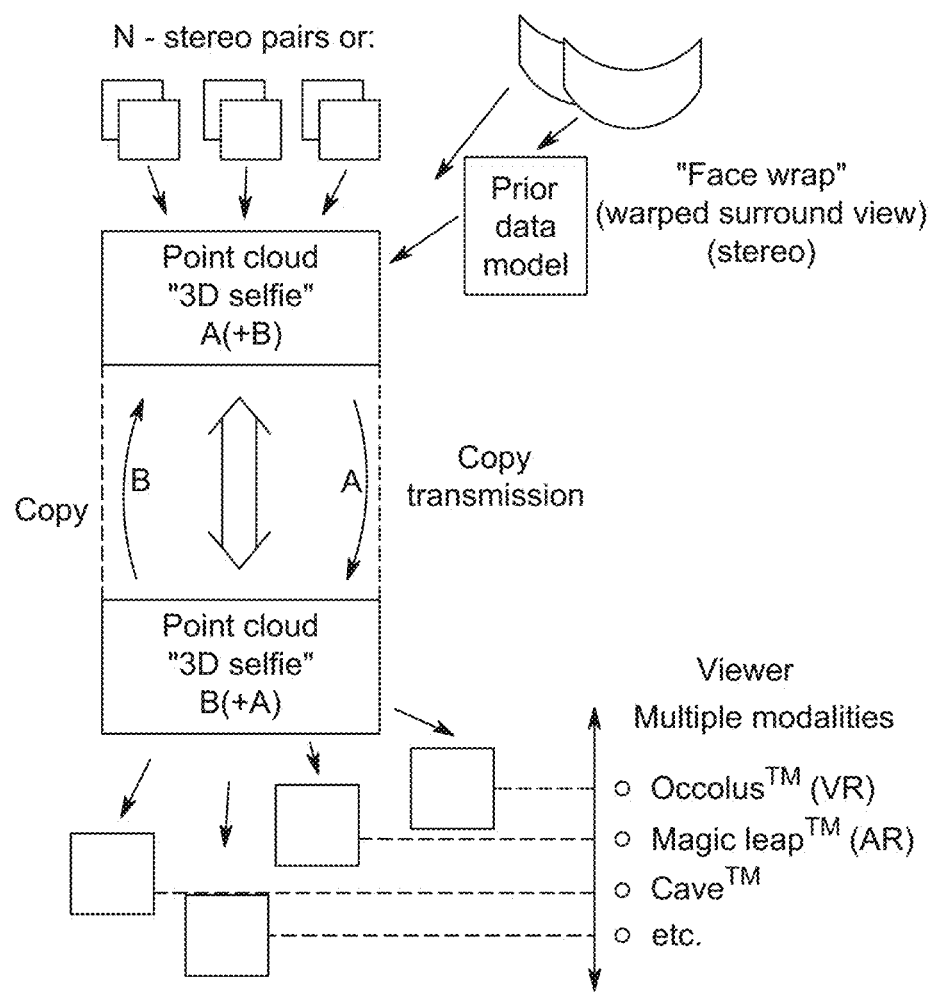
FIG. 18 illustrates an embodiment of a logical flow diagram for an exemplary data-set generation system that provides one or more data sets, such as one or more point clouds, that represent one or more three-dimensional views of one or more objects based on one or more overlapping views of the one or more objects, such as one or more stereo image pairs or one or more wrapped views, such as one or more of those of FIGS. 4B-4E or FIG. 5.

In one of the various embodiments, at a remote location, such as at a telepresence server computer that employs unwarping software, a captured holographic "selfie" three-dimensional stereoscopic video recording can be reconstructed and displayed over a range of three-dimensional perspectives. The unwarping and perspective rendering transformation of the image streams may (optionally) be based on a known "ground truth" model of the actual shape of the user's head, based on a previously acquired 3D scan of the user's face. (See FIG. 18 and FIG. 4F). In one of he various embodiments, a high-resolution accurate color image of the surface of the user's face, head, and back of the head may also be acquired in advance using existing approaches.

In one of the various embodiments, a ground truth 3D facial model of the user may be acquired in advance, e.g. by using a regular selfie cam and panning around the face. For example, a high-quality, still, facial 3D recording can be accomplished by holding the face in a fixed expression and by recording a high resolution selfie video while rotating the mobile phone in a panning motion around one's own face. In one or more of the various embodiments, the resulting synthetic (fused) holographic three dimensional stereoscopic video stream enables the rendering of a colored three dimensional surface point cloud. The point cloud may be created by fitting previously acquired facial color textures to a fine grained three dimensional surface of voxels tracking the current three dimensional facial shape and facial expression. In one or more of the various embodiments, the colored, three dimensional, stereo perspective of the user's head can be inserted into a three-dimensional rendered virtual environment, which enables the rendering of multiple simultaneous viewing angles.

In one or more embodiments, a receiving system may use the colored point cloud stream to render and display any appropriate stereo stream, for any viewing angle, and can smoothly pan these three-dimensional motion stereo video streams, in real time, with minimal latency or artifacts. See FIG. 18 for a data flow architecture of such a receiving system environment. In one of the various embodiments, multiple such stereo pairs can be rendered on the fly with freely roaming perspectives for the correct positions of the eyes of others in the environment, using standard three-dimensional graphics techniques e.g. as used to render avatars in video games. Also, in one of the various embodiments, other holographic systems may be similarly configured using more conventional displays. They may be conventional multi-view liquid crystal display (LCD) monitors or auto stereoscopic displays arranged around the user, either concave shaped or traditional planar displays arranged in triptych style and with their surfaces enhanced by an additional reflective layer, with special coatings, and the like (as described throughout the Specification and in regard to FIGS. 8A-8D).

A benefit of a concave oriented triptych or curved screen is that two head mounted cameras can record a partial surround perspective. To achieve the maximum effect, a wide field of view in the camera is desirable. By extension of this effect, the greater the field of view of the cameras and the greater the curvature around the head, body or object, the greater the surface area of a round object that will be captured in each view. With the cost of megapixel cameras being very low, a full 360-degree array panoramic selfie system can be both compact and affordable.

Illustrative Architectures of Telepresence Systems

Figure 19A:
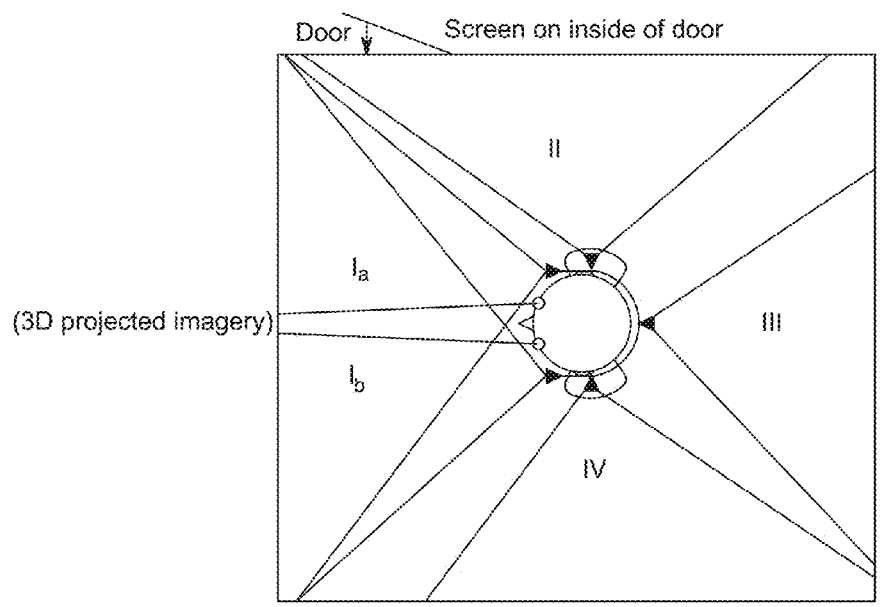
FIG. 19A shows an embodiment of a two-dimensional logical ray diagram for an exemplary motion and image capture system that includes a panoramic camera array employed within a room defined by walls that each have mirrored surfaces to capture 360-degree wrap-around images of one or more objects within the room.
Figure 19B:
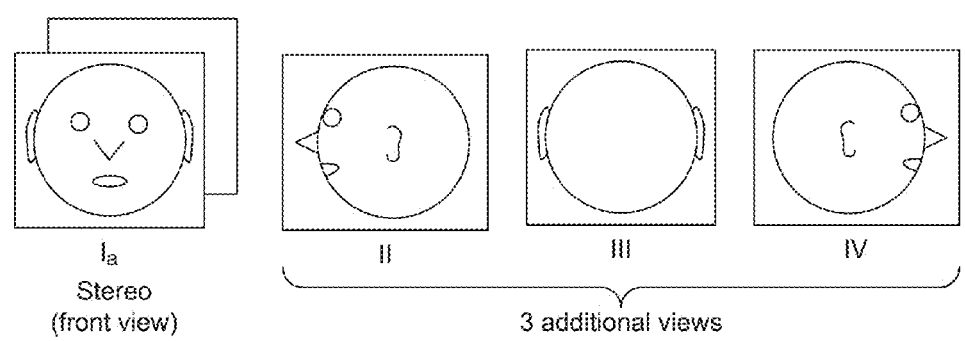
FIG. 19B illustrates an embodiment of two-dimensional perspective views of exemplary images captured from one or more reflective surfaces, such as those of FIG. 19A, by a motion and image capture system, such as that of FIG. 19A.
Figure 19C:
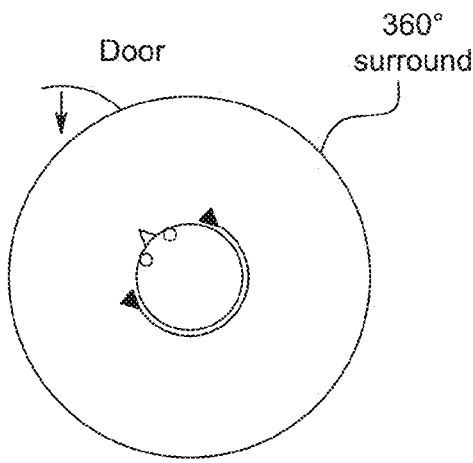
FIG. 19C shows an embodiment of a two-dimensional overhead view of an exemplary concave space surrounded by one or more mirrored surfaces that form a cylindrical or toroidal shape to facilitate capturing one or more warped views of one or more objects within the concave space.
Figure 19D:
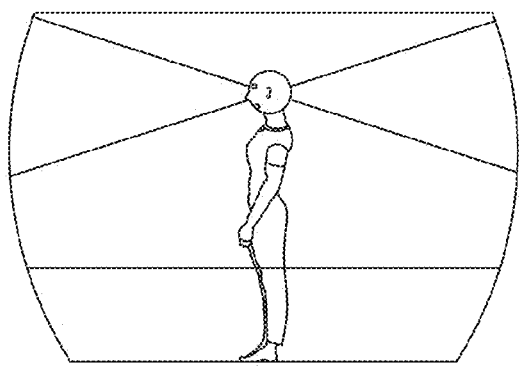
FIG. 19D illustrates an embodiment of a cross-sectional view of an exemplary concave space, such as that of FIG. 19E.

In FIG. 19A, a full circular 360 degree panoramic view is provided from a head mounted projection display system or as a collar. However, in a HoloCave™ type of system, with multi-modal reflective surfaces a full 360 degree video capture can be performed without requiring in-painting any back-of-the-head, body or object's surfaces. All sides around the user would be recorded as moving shapes (voxels) and in color surface contrast (pixels), and a wide range of immersive viewpoints can be rendered with minimal in painting. (Hands, arms or objects may have temporarily occluded some parts of the user's body surfaces). In one or more embodiments, this type of system might work well for easy, do-it-yourself constructions of such a HoloCave™. One advantage is that all of the interior the surfaces could be wallpapered onto existing structures (FIG. 19A) or a rapidly set up in a tent-like temporary structure (FIG. 19C or FIG. 19D). Once having been captured in 360 degrees, other users would be able to approach you (your holographically projected avatar), and they would appear as avatars in your space from any direction. There would be no strange missing parts in the back of your head, or back, which would otherwise require extensive modeling, or else it would ruin the desired telepresence illusion.

In one or more of the embodiments, a concave-shaped, layered, multi-modal display surface is employed for the screen that light is projected on and reflected from. Since the projection screen is concave in shape, the user's face is typically in a focal area centered on the same axis as the radial center of the screen. The screen has two functions, each provided by a different layer in the screen. The first function of the screen is to mirror an image of the user's face (and optionally part of his or her torso, or even the whole of the body). The concave shape of this reflective surface aids in being able to reflect not just the front of the face but also parts of the sides, and optionally, the top and the bottom of the face to prevent any gaps from opening up caused by missing camera angles when a changed perspective is required at the other end of the communication link. By capturing a more complete three-dimensional facial image stream, a greater immersive realism of the holographic imagery can be maintained. Further it allows a greater degree of head motion, and a more dynamic stereoscopic perspective to participants using the holographic video communication system.

Additionally, in one or more embodiments, the reflective layer of the screen (on or near the surface) needs to be both reflective to one or more non-visible wavelengths and, simultaneously, substantially transparent to visible light used for image projection or emitted by an active emissive display below this reflective layer. One instantiation of the reflective layer is a special wavelength selective reflective coating, e.g. in a narrow near-infra-red spectral band (NIR, e.g. 850 nm) the screen is specularly reflective. (See FIGS. 8A-8D) The concave shape of the surface has a fun mirror expansion effect (See FIGS. 4D and 4E). The wavelength selective reflectivity can be achieved e.g. with a Bragg style coating, by alternating thin display layers with varying layers of a different refraction index. In one or more embodiments, the front surface of the screen may optionally have an anti-reflective (AR) coating, for optimal transparency in the visible spectral (VIS) domain (the spectral range from 450 nm/blue to 650 nm/red).

In one or more embodiments, when a projection screen is used with a head mounted projection display system, the second function of the screen is to provide retro-reflectivity. The latter can be achieved in various ways, such as microstructuring the back surface of the screen with optical microstructures to make it retro-reflective. (embossed with small cubic facets smaller than the smallest image elements, e.g. 100 microns).

In one or more embodiments, the projection screen may be provided as a portable pop-up screen. Rather than a fixed screen surface, the projection screen's surface might be instantiated as a lightweight concave portable screen that is easily collapsed and opened up. Multimodal reflection (i.e. specularly reflecting narrow-band NIR light for motion capture, i.e. voxels, retro-reflectively reflecting light in the visible domain for imaging, i.e. pixels) can be achieved in a thin stretchable but strong and light material, just 300 micron thick. A collapsible ultra-light pop up screen can be constructed than enables a ubiquitous mobile deployment of the holographic video communication system. The dual-function layered material might be slightly elastic on a strong woven backing material, so it can be used in a light, foldable or collapsible pop-up style screen like an umbrella or a fan.

In one or more embodiments, for a work place cubicle or personal office, in private or public workspaces, the screen might be shaped to fit into such spaces with rounded corners and a slightly concave two-dimensional curvature. This would provide a wide angled three dimensional "infinity view" personal three-dimensional view space. Such a workspace three-dimensional infinity view extension would also serve as a "teleportation portal', i.e., a window through which one can see other online remote teleconference participants as if they are right there in the next cubicle. (See FIG. 16). The user would be able to instantly, spontaneously, place herself in a virtual meeting place and start interacting with others there. Computer models, three-dimensional visualization, Computer Aided Design (CAD) three-dimensional imagery or real three-dimensional objects placed in that central workspace would be seen and manipulated by the user and selected other participants/users. Real objects might be "virtualized" simply by placing them in the holographic viewing & capture zone. This type of system would capture their shape (e.g. using the stereoscopic scanners built into the head mounted projection display system) or even their live motion by the same means as it captures the user's face. Since real objects are not reflective, the front, facing the viewer, would be recorded by the stereo color scanners. The back might be captured after reflecting in the mirrored screen surface behind the object (See FIG. 16). As noted elsewhere NIR light might be employed to capture the shape of the object and visible light is used to capture its color, surface texture and contrast. The visible light source might be from scanning beams, additional LED illuminators on the HIVID or just from ambient natural or indoor lighting sources.

In one of the various embodiments, ae central viewing zone (CVZ) of a concave shaped screen could be approximately where the user's eyes are (e.g. nose bridge) and provided the cameras are positioned close to the eyes—e.g. ultra miniature cameras on tiny "eyestalks"—then others in the virtual view would be able to see a hologram face (an active real-time wide angle viewable stereoscopic video of the face) over a wide range of view angles. The viewing experience would be analogous to peering through a window: the more the user leans into the central focal zone of the concave screen, the more the viewer can look around the virtual meeting space and the more others would see of the participant (sides of her head etc.). The perceptive experience (e.g. projection of the images of others in the conference) and the degree of visibility (three-dimensional facial and head exposure) can be arranged to be symmetrically consistent, so it is a wholly natural experience, consistent with real-world face-to-face social interactions. Additionally, whenever the user wants to leave the virtual place, she just needs to lean back, away from the central focal zone. She might do so in response to an interrupt, or to take a sip from a water bottle. (See FIGS. 12A and 12B). In this way, the real world of an office, home, or a coffee shop table can be seamlessly extended via this holographic collaboration system towards virtually limitless workspace and community. Furthermore, in a round-table style virtual presence circle conference, or a group of friends sitting in a (virtual) circle, when a user leans in, both sides of the user's face would be recorded, and the user would be able to see most of the participants. Leaning in and looking around the meeting circle would be a most natural experience. Note each participant in the virtual circle would have their own concave personal projection surface. (FIGS. 9A and 9B).

Figure 12A:
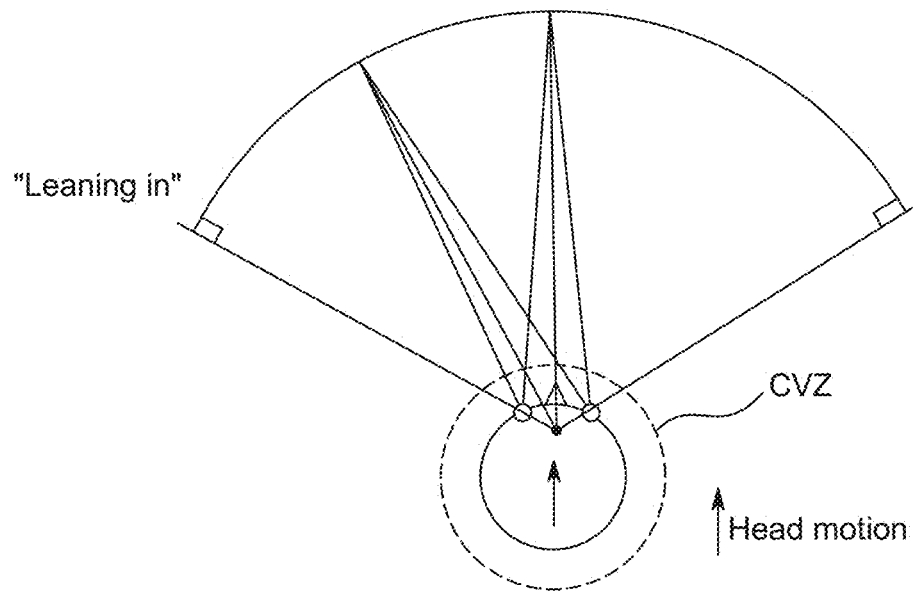
FIG. 12A shows an embodiment of a two-dimensional logical ray diagram of an exemplary concave screen when a user moves her head toward the concave screen.
Figure 12B:
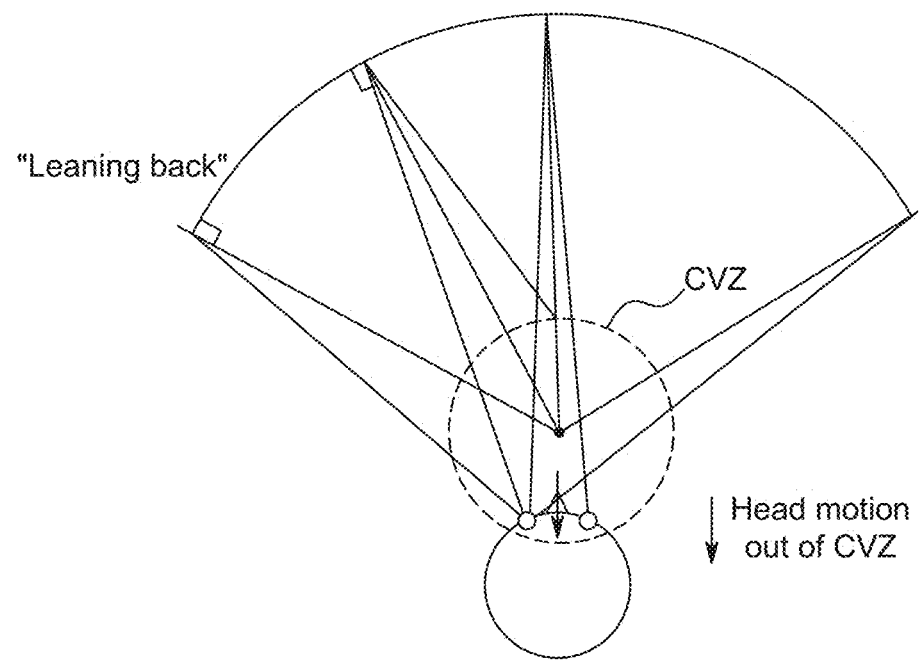
FIG. 12B illustrates an embodiment of a two-dimensional logical ray diagram of an exemplary concave screen when a user moves her head away from the concave screen.

One or more embodiments, provide for joining a holographic videoconference by "leaning in" (i.e. leaning forward towards the screen, into the CVZ, towards a table or meeting in progress, see FIG. 12A). Due to the concaveness of the user's screen, the screen will capture progressively more of the face as the user leans in. In this way, one or more embodiments may "patch in" a user only after the user leans in and a visual feedback cue may be provided, e.g. translucent privacy curtain that enables the viewer to consciously "enter" and "exit" with a simple head motion (leaning back, exiting the CVZ, see FIG. 12B). Analogously, a sort of three-dimensional mute freeze function may be enabled when the user leans back.

Figure 7:
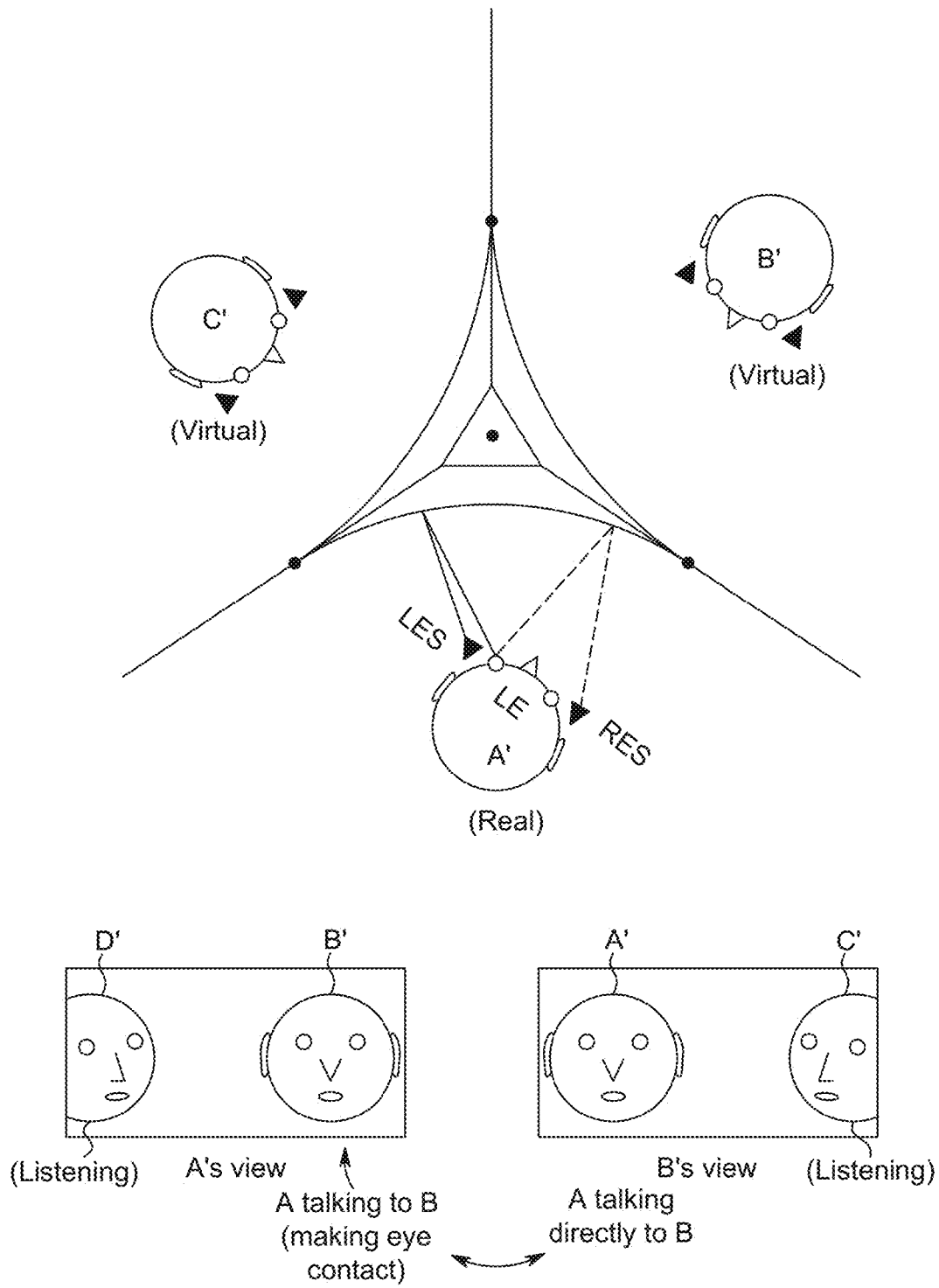
FIG. 7 shows an embodiment of a two-dimensional logical ray diagram for exemplary virtual images of person B and person C projected onto a concave screen by a head-mounted projection display system worn by person A during a three-way videoconference and exemplary views from the perspectives of person A and person B while person A and person B make eye contact.
Figure 8A:
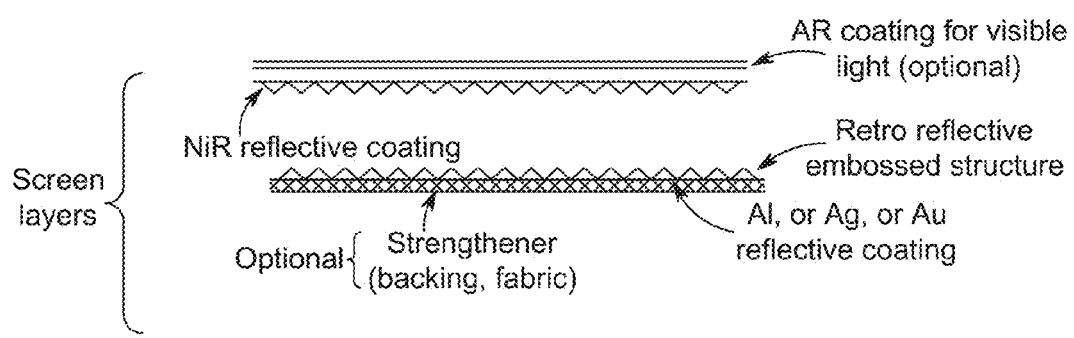
FIG. 8A illustrates an embodiment of a cross-sectional view of an exemplary reflective opaque display screen having multiple layers.
Figure 8B:
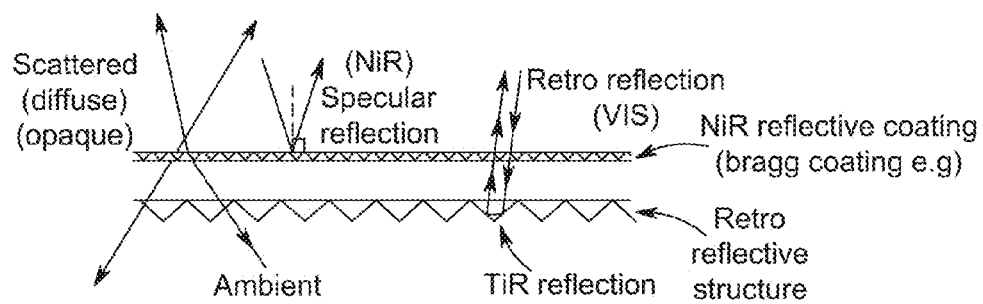
FIG. 8B shows an embodiment of a two-dimensional logical ray diagram for an exemplary reflective translucent display screen having multiple layers.
Figure 8C:
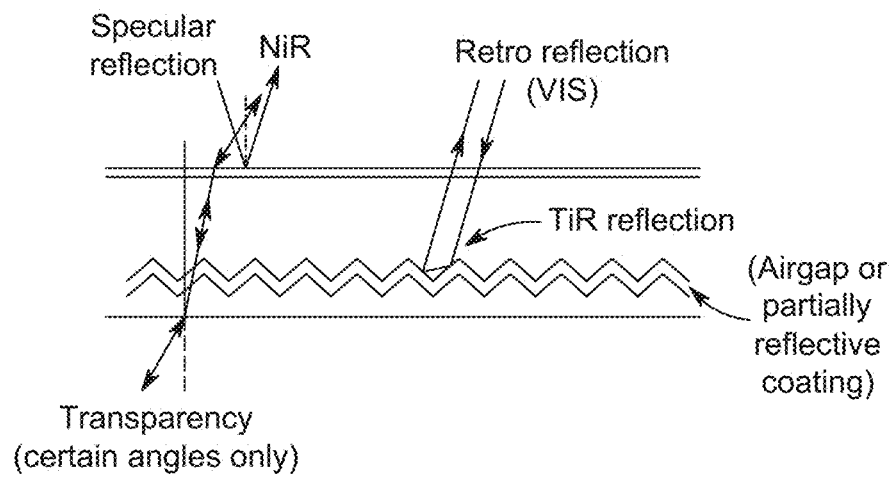
FIG. 8C illustrates an embodiment of a two-dimensional logical ray diagram for an exemplary reflective transparent display screen having multiple layers.
Figure 8D:
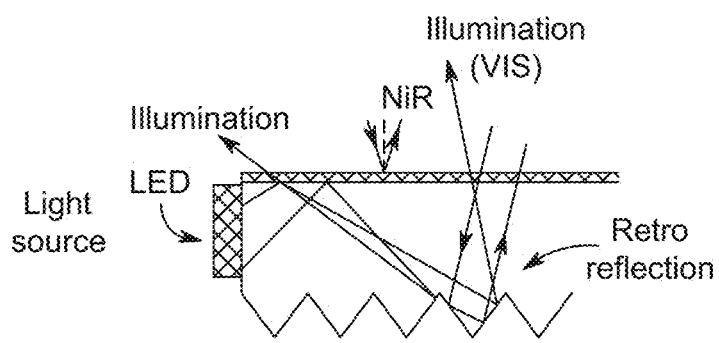
FIG. 8D shows an embodiment of a two-dimensional logical ray diagram for an exemplary reflective illuminated display screen having multiple layers.
Figure 9A:
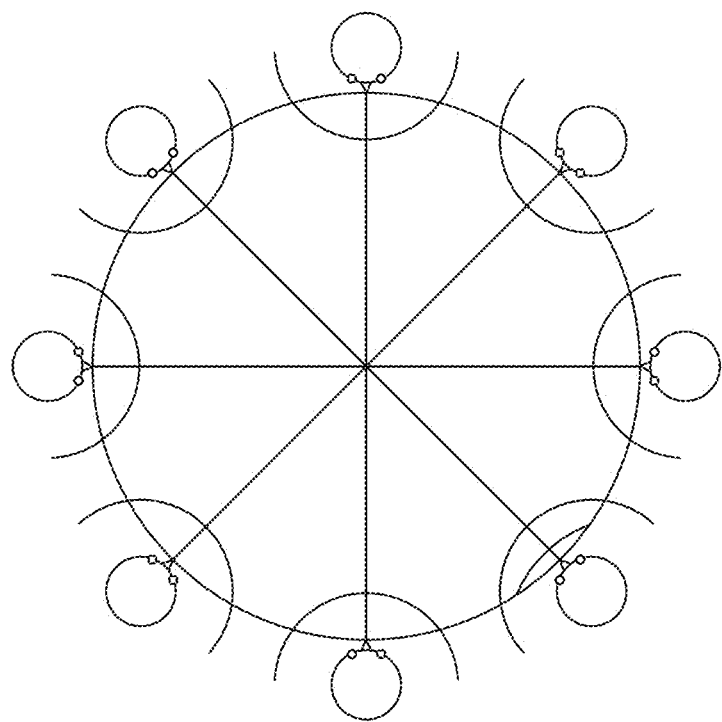
FIG. 9A illustrates an embodiment of a two-dimensional logical overhead view of an exemplary virtual round-table conference.
Figure 9B:
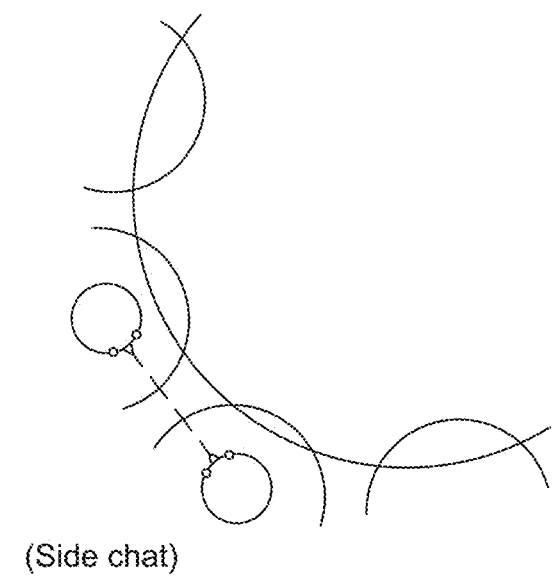
FIG. 9B shows an embodiment of a two-dimensional logical overhead view of an exemplary side chat during a virtual round-table conference, such as that of FIG. 9A.

FIG. 9A depicts an 8-way virtual round table conference. Each participant is at his or her own location with a concave holographic projection-recording screen. FIG. 9B shows two parties, as in FIG. 7, which can turn to each other to have a "side chat", and this will be obvious to the others as they will see the side-chatters' faces turned away from the main conference table center. Each party in the conference, at all times, maintains a full immersive location accurate three-dimensional stereo perspective of the conference. Even small head motions will generate subtle perspective changes and provide immediate immersive visual motion feedback such as motion parallax and realistic occlusion effects. For example, when virtual objects are present on the conference table, such as three-dimensional architectural models, the immersive perception of all participants is enhanced as they see other viewers' faces rendered in stereoscopic three-dimensional and dynamically occluded by these objects during head movements, enhancing the "really being there" sensation. The experience will further ensure that the participant will stay "tuned-in" to the proceedings. They are present in the meeting with friends or colleagues rather than looking at video screen images of other people at remote locations.

Mirrors

Since it is easiest to manufacture, most curved mirrors have a spherical profile. Unfortunately, spherical mirrors, suffer from spherical aberrations. In particular, parallel rays reflected from such mirrors do not focus to a single point. For parallel rays, such as those coming from a very distant object, a parabolic reflector can do a better job. Such a parabolic mirror can generally focus incoming parallel rays to a much smaller spot than a spherical mirror can do under similar conditions.

Figure 10A:
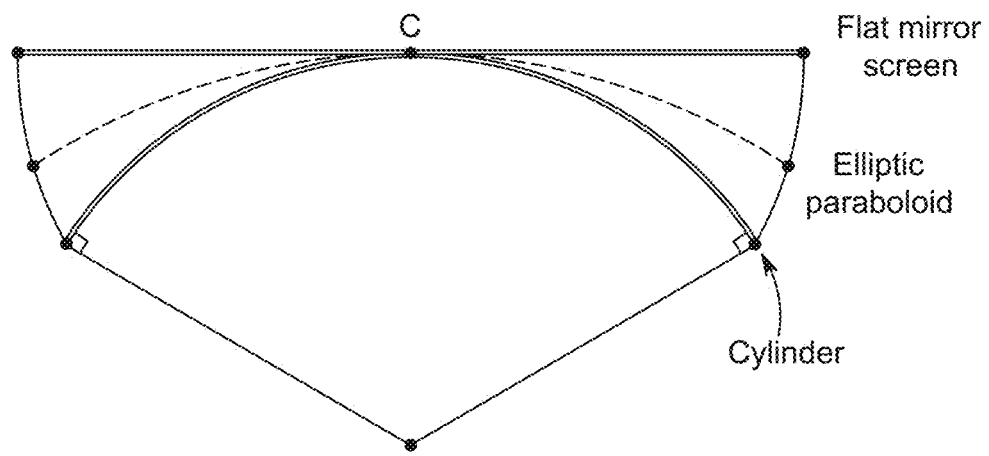
FIG. 10A illustrates an embodiment of an overhead cross-sectional view of various exemplary display screen shapes, including a flat screen shape, an elliptical paraboloid screen shape, and a cylindrical screen shape, to highlight the differences in fields of view (FOV) provided by these various screen shapes.
Figure 10B:
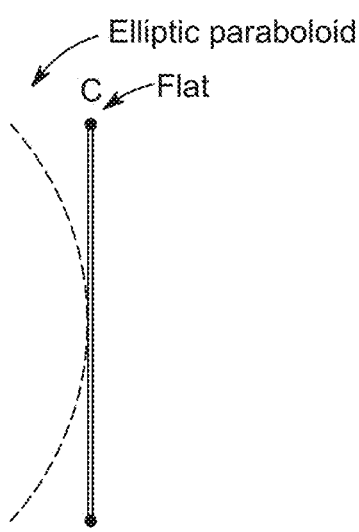
FIG. 10B shows an embodiment of a lateral cross-sectional view of various exemplary display screen shapes, including an elliptical paraboloid screen shape and a flat screen shape, to highlight the multiple dimensions of FOV increase provided by an elliptical paraboloid screen shape in comparison to a flat screen shape.
Figure 10C:
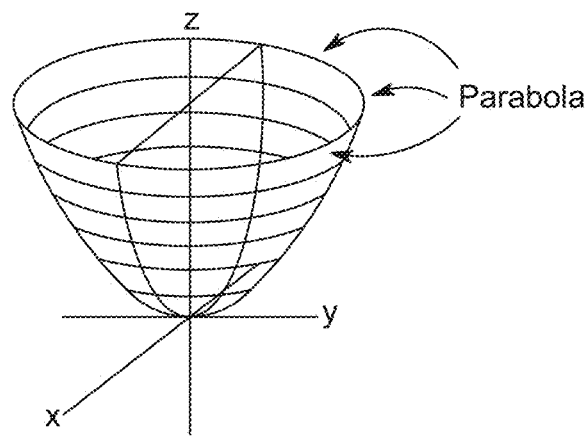
FIG. 10C illustrates an embodiment of a three-dimensional logical view of an exemplary elliptical paraboloid that opens upward.

A toroidal mirror is a form of parabolic reflector, which has a different focal distance depending on the angle of the mirror. The curvature is actually that of an elliptic paraboloid where a≠b. See FIGS. 10A, 10B and 10C. However, if the shape of a mirror were that of a toroid, the mirror would also exhibit spherical aberration. Typically, toroidal mirrors are used in devices where the source and detectors of the light are not located on the optic axis of the mirror, so the use of a true paraboloid of revolution (when a=b) would cause a distorted image. Since in many of the various embodiments the camera and the scanning projection devices will be off center, at both sides of the head (See FIG. 4A), e.g. left and right side "eyestalks" at approximately 15 cm distance from each other, approximately three times the inter-ocular distance, an elliptical paraboloid surface may be desirable.

Multiple separate mirrors, triptychs, cylindrical and other roughly concave assemblies will all to some extent assist towards the objective of the concave shape which enable a head mounted set of cameras to capture as much of the user's head at possible.

Illustrative Architectures for Telepresence

In one or more the various embodiments, a concave mirror surface stretches and "wraps" a selfie video perspective around a user's face. Cameras or scanning sensing systems imbedded in "Eyestalks" left and right of the user's head (denoted as LES and RES) positioned close to his eyes, record reflections of his face creating a stereo pair of video streams. Due to the concave curvature of the screen the mirrored images are warped as shown in FIGS. 4D and 4E. Using a previously acquired three-dimensional shape reference model of the user's head, as shown in FIG. 4F, aided by an accurate estimation of the current vantage points of the LES and RES sensors, these images are de-warped into a "normal" right and left side view as shown in FIGS. 4B and 4C. Note that the shape of the screen and the headset position on the head, as well as the relative position of the two eyestalks are substantially invariant, so the key parameters to de-warp the images can be computed in advance or during the first few frames and then stored in system memory to serve a fast real-time conversion algorithm. So de-warping requires minimal compute resources, power and latency. Moreover, optionally, raw warped data of the user's moving talking face might be cropped out from the background and be streamed to a server, or cloud based computational resources, where in addition to de-warping, the right perspective might be generated for each of many pairs of eyes in a virtual telepresence conference.

In one or more of the various embodiments, a scanned triangulation projection system may be employed to crop out a user's face from the background, which is relatively easy because the Near Infra Red (NIR) scanning beam's spot on the user's face is displaced laterally when viewed by a sensor with a viewpoint that is separate from the projector (a stereo Tx-Rx transmit-receiver pair with a substantial base line off set.) Scanning pixel-by-pixel, the observable disparity can be used as an instantaneous filter (sorting function) informing which pixel belong to the face (close by=>greater disparity) and which pixels belong to the background (farther away=>lesser disparity than facial pixels in foreground).

In one or more of the various embodiments, a "Triple Stereo" triptych style mirror-projection screen may be employed. With this type of screen, the images show that the two side panels of the triptych aid significantly by reflecting the sides of the user's head more fully than a flat mirror screen. As shown here each of the eyestalk cameras has 3 reflected views of the head, for a total of 6 video angles. This 6 view, "triple-stereo" enables a full 120-degree pan around the face. Basically the six facial angles can be recovered by the graphics operations and serve to create a variable viewable perspective with strong rotational perspective fidelity, which is particularly valuable for multi-view, multi-party immersive conferencing. (See e.g. FIGS. 5, 13A, and 13B). Naturally for a 4-way conference each participant might use a triptych style panel, so that each participant has a view of 3 others.

Figure 13A:
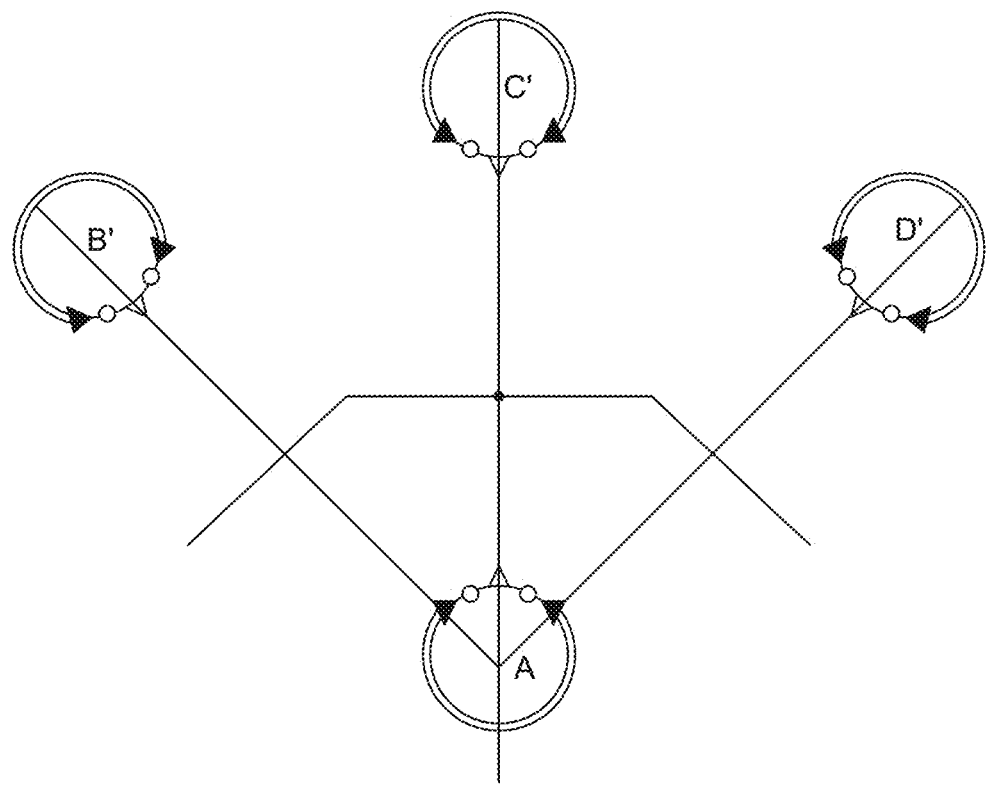
FIG. 13A shows an embodiment of a two-dimensional logical ray diagram for exemplary virtual images of person B, person C, and person D projected onto a triptych-style screen by a head-mounted projection display system worn by person A during a four-way videoconference.
Figure 13B:
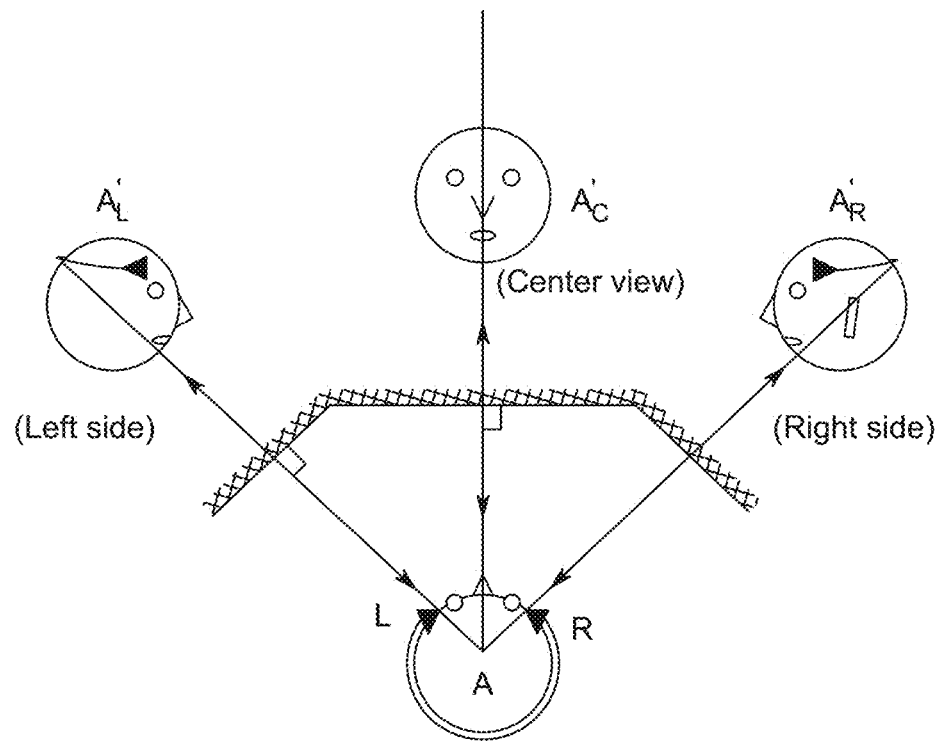
FIG. 13B illustrates an embodiment of a two-dimensional logical ray diagram for exemplary views from each panel of a triptych-style screen as captured by a head-mounted projection display system.

In FIGS. 13A and 13B, four conference participants, A, B, C and D, each face triptych style reflective recording-projection screens. Each of the four participants has three views and each headset both projects and records three stereo streams. Each headset contains a single (or a stereo pair of) wide area scanning projector(s) and single (or a stereo pair of) wide angle scanning detector(s), e.g. a Near Infra Red (NIR) scanning pixel sequential laser headset such as the PhotonJet UltraLight™ system. Alternatively, each headset may have three or more projectors and three or more cameras to ensure a sufficiently wide view angle. In the depicted situation, A is facing C and in a conversation while B and D are also looking at A. FIG. 13A shows A's screen (top view) and his headset projecting holographic images of B, C, and D (marked B", C' and D' respectively). In FIG. 13B what is shown is the three triptych surfaces reflecting three stereo selfie views of A's face, left side (Red), right side (Blue) and a central frontal view (Black). These selfie videos are captured by the left and right sensors in the headset's eyestalks (RES and LES), and these three different videos streams are sent for viewing to participants B, C and D respectively.

Figure 6A:
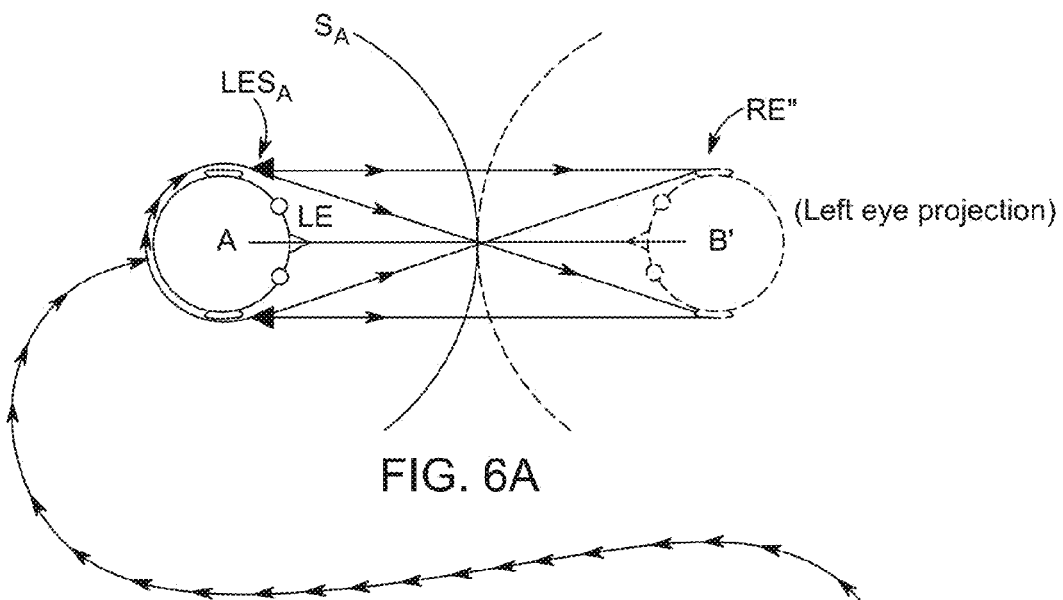
FIG. 6A shows an embodiment of a two-dimensional logical ray diagram for an exemplary virtual image of person B projected onto a concave screen by a head-mounted projection display system worn by person A.

In one or more embodiments for holographic telepresence conferencing that is one on one, two parties A and B are in the conference. A sees a holographic video stream recorded by B's headset, transmitted and projected by two projectors built into the left and right eyestalks in A's headset. The arrows in FIG. 6A depict A's left eyestalk (LESA) projecting the image intended for viewing by his left eye. This left eye image stream was computed in real-time, a few milliseconds earlier, based on a combination of NIR based motion captured voxel streams from tracking the reflected image of B's face captured by B's right eyestalk (RESB), and colored pixel surface map of B's face, provided at the beginning of the session by B's system.

Figure 6B:
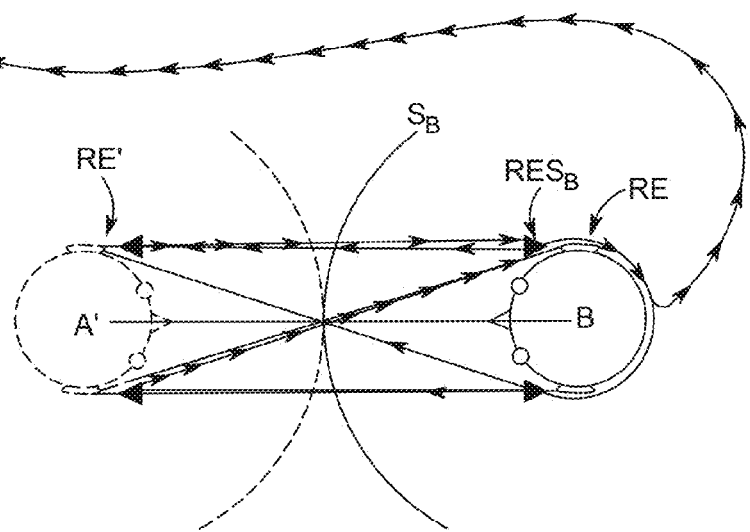
FIG. 6B illustrates an embodiment of a two-dimensional logical ray diagram for an exemplary virtual image of person A projected onto a concave screen by a head-mounted projection display system worn by person B.

It is noteworthy that B's right ear (RE) reflects in mirror as RE'(in FIG. 6B), and is projected from A's perspective on the left side as RE" (in FIG. 6A), as would be if A was facing B in real life. In FIG. 6B, at B's location, participant B sees A's hologram projected by his own headset. All this happens in real time and with only minimal delays. The eyestalk miniature cameras are close enough to the natural eye perspective, yet they do not obstruct the view of the face and eyes. With simple geometry transforms the stereo perspective can be adjusted for the correct stereo perspective (adjusted for the user's inter-ocular distance) at each location. In FIGS. 6A and 6B the warping and de-warping of the camera-acquired images have been omitted for clarity. (See also FIG. 6D).

Figure 6C:
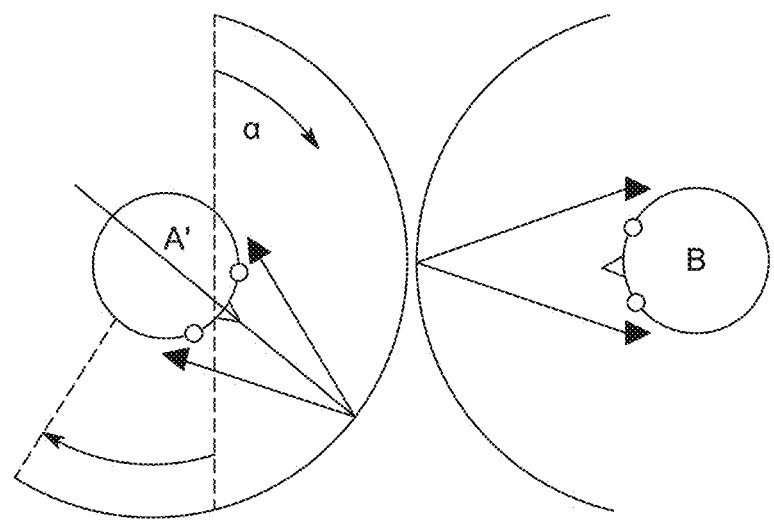
FIG. 6C shows an embodiment of a two-dimensional logical ray diagram for an exemplary perspective change for a virtual image of person A projected onto a concave screen by a head-mounted projection display system worn by person B, such as that of FIG. 6B.

FIG. 6C shows how it is possible, because a full "wrap-around" stereo motion image is required by each participant's headset, to change the perspective views of a user at any time, which is quite valuable in enabling a natural immersive communication experience. As show here, B may decide to look at a different side of A's face e.g. rotating A's 3D hologram (A') by a significant angle (a).

Figure 6D:
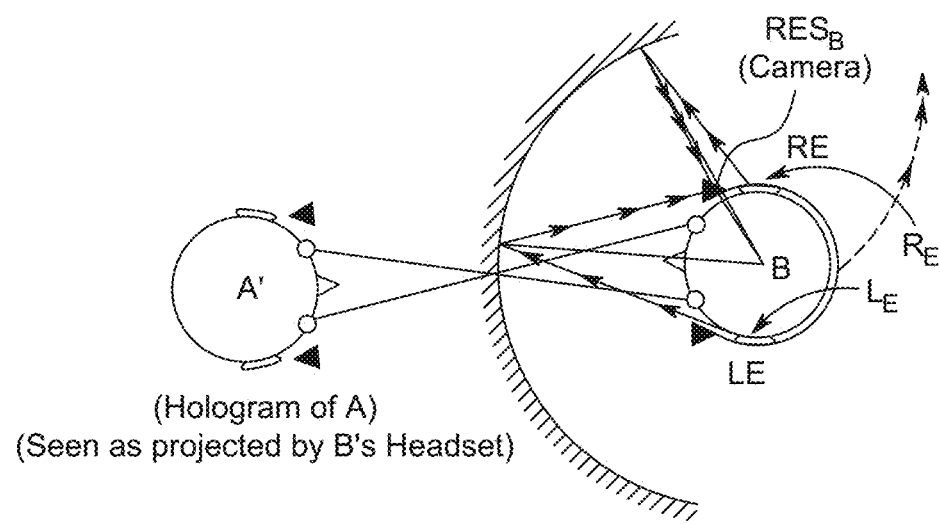
FIG. 6D illustrates an embodiment of a two-dimensional logical ray diagram for an exemplary warped view from a concave screen as captured by a right eye stalk of a head-mounted projection display system worn by person B, such as that of FIG. 4E, and an exemplary virtual image of person A projected onto the concave screen by the head-mounted projection display system.

In FIG. 6D we show how B's right side eyestalk (RESB) is able to record a significant part of his own face after reflecting in the concave mirror surface. The RESB camera can see from his left ear (LE) all the way to his right ear (RE) and this captured "face-wrap" motion image stream (typically recorded with a NIR sensor) informs the 3D visible image later projected by the projector in LESA in FIG. 6A (See warped right side headshot image in FIG. 4E).

In a holographic 3-way telepresence conference, 3 parties, A, B and C, face each other in a virtual location at 120-degree angles from each other. Each user has their own location and faces a concave reflective projection screen, shown here with about 60 degrees of curvature. See FIG. 7. Each user can see the two others on a wide projection screen. When A is talking to B they can make direct eye contact and face each other. For example, A can turn to B and each will see the other face to face (full frontal view), with good stereoscopic eye contact, but each will see party C from the side. A will see him on his left, seeing the right side of C's face and B will see him on his right seeing the left side of C's face.

A multi-party video conference with good natural eye contact is difficult without recording the concave mirrored wrap-around stereo images as described earlier. This 3-way set up would require embedding two camera pairs in each of the three screens. In a 4-way conference without a concave or triptych screen it would require embedding three stereo pairs in each of the four screens. For larger numbers the number of cameras and required data flow would be prohibitive. For example, in the round table telepresence conference depicted in FIG. 9A, this eight screen system would have required 56 stereo pairs of cameras and 112 camera feeds if the screens were not curved, instead of just 16 camera feeds.

Illustrative Architectures for Screens

For translucent screens, NIR light is specularly reflected by a wavelength selective narrow band reflector, e.g. a Bragg style coating, that is close to or on the surface of a screen. The bottom back surface may be an embossed microstructure that creates a retro reflective grating so that visible light from the laser primaries will retro-reflect back towards each eye position ("return to sender"). Optionally, additional top coatings might be applied such as an anti-reflective layer (shown as a AR coating) tuned to make the top layer more transparent to visible light and a scratch-resistant transparent layer (not shown). Additional reflecting coatings might be applied on the screen's back side, typically sputtered metal (Au, Ag or Al) and a structural material such as epoxy, mesh, textile or adhesive layers. See FIG. 8A.

For transparent screens, the phenomenon of Total Internal Reflection (TIR) can be exploited to ensure retro-reflectivity at the back surface by exposing it directly to air. This creates a translucent screen that retro-reflects collimated laser beams emanating from the headset so that projected images will appear bright and clear in the 3D viewing space of the user (both in front and behind the screen). The outside world will see a translucent privacy panel with a matte appearance. Ambient light will be diffused, both by the retro-reflective structures and optionally by an additional diffuse back panel mounted with an air gap behind the retro reflective back surface. See FIG. 8B.

Also, for transparent screens, a second matching cubic retro-reflective structure may be positioned in close proximity with a tiny air gap will create a transparent surface that also retro-reflects. The same effect might be achieved by applying a thin partially reflective coating and then back filling the cubic cavities so as to create a smooth optically transparent back surface. Either way the screen will be transparent enough so the user behind it will be visible through the screen, and will it not block her view of the real world around her, nor will it make shadows by blocking illumination. See FIG. 8C.

For illuminated screens, light sources such as LEDs can be coupled into the screen body so that the screen can be back illuminated, creating a diffuse light source illuminating the work surface. The optical microstructures on the back of the screen and the visible AR coatings on the front surface will enhance this luminaire function. See FIG. 8D.

Although a screen may have only one-dimensional curvature e.g. such as a 60 curve degree cylinder shape (creating FoV angle of 120 degrees at the radial center of the screen), they may also have two dimensions of curvature e.g. spherical (not shown), or elliptic paraboloid. (FIG. 10C) The latter is a geometric surface defined by the equation $x^2/a^2 + y^2/b^2 = z^2/c$, where $a \neq b$. It is a screen that looks like a cup that is elliptical in one cross-section, and parabolic in two other cross-sections. a and b are measures of curvature in the XZ and YZ planes respectively. As shown in the FIG. 10C, as depicted c is positive, therefore the cup shape opens at the top. Cross-sections parallel to the XY plane are elliptical.

Figure 11A:
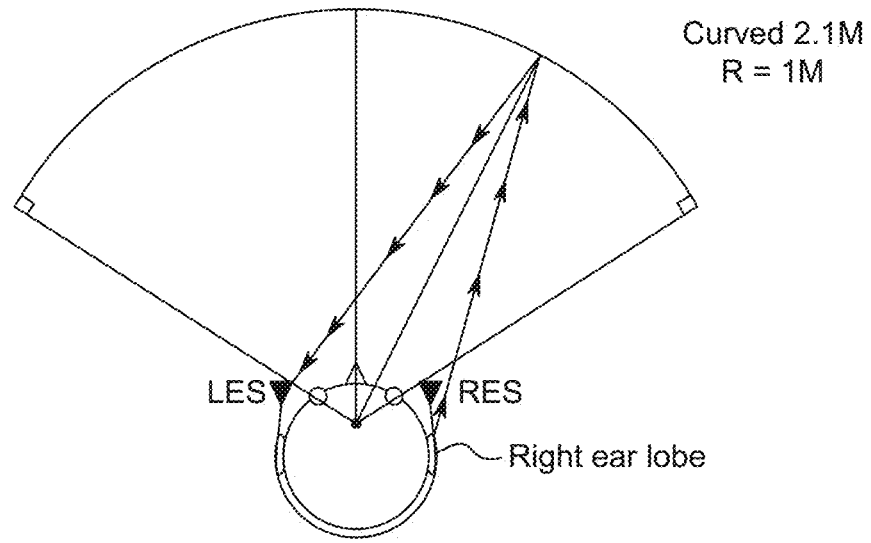
FIG. 11A shows an embodiment of a two-dimensional logical ray diagram of an exemplary concave screen and an exemplary head-mounted projection display system having eye stalks to highlight the FOVs of the eye stalks when employing a concave screen.
Figure 11B:
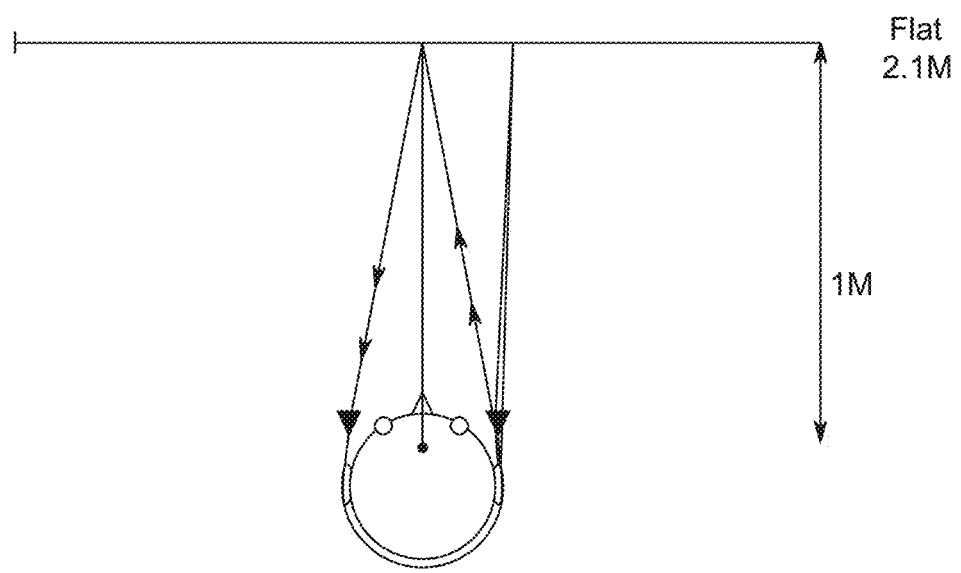
FIG. 11B illustrates an embodiment of a two-dimensional logical ray diagram of an exemplary flat screen and an exemplary head-mounted projection display system having eye stalks to highlight the FOVs of the eye stalks when employing a flat screen.

An advantage to reflecting light onto the surface of a concave screen, as compared to a flat mirror screen, as shown in FIG. 11B, a concave screen, as shown in FIG. 11A, allows the eyestalk cameras to see more of the side of the user's face. For example, in FIG. 11A, the left eyestalk (LES) camera can clearly see the right side of the user's face including fully his ear, which is not occluded by the eyestalk. however, in FIG. 11B with equally large but flat screen surface, this is not the case. In particular, a concave screen enables a "wrap around" or an "inverted-panoramic" image that captures a great deal more of the three-dimensional roundness of a user's face.

In one or more embodiments, facial color imagery may be captured by quasi-broadband screen reflections in addition to NIR reflections on the screen to track the shape and motion of the face, head or object in the CVZ. When a full color image is captured at the same time, a more complete image of the user's face is provided in real-time for both the position (in voxels) and color (in pixels).

Figure 14A:
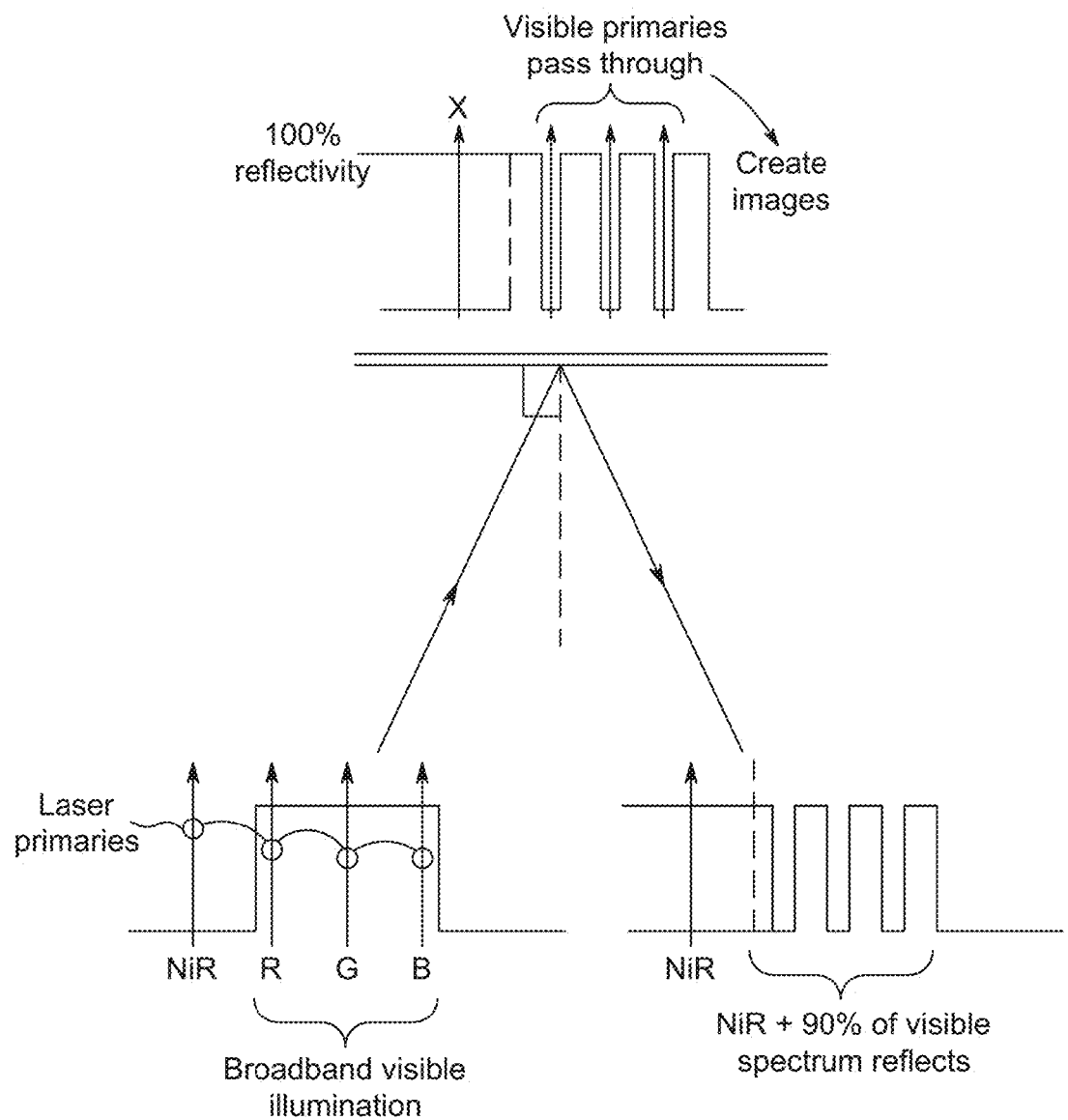
FIG. 14A shows an embodiment of a two-dimensional logical ray diagram for an exemplary mirrored surface that employs filters that are anti-reflective for one or more narrow bands per primary color to facilitate capturing a full color image of an object while tracking the shape or motion of the object.
Figure 14B:
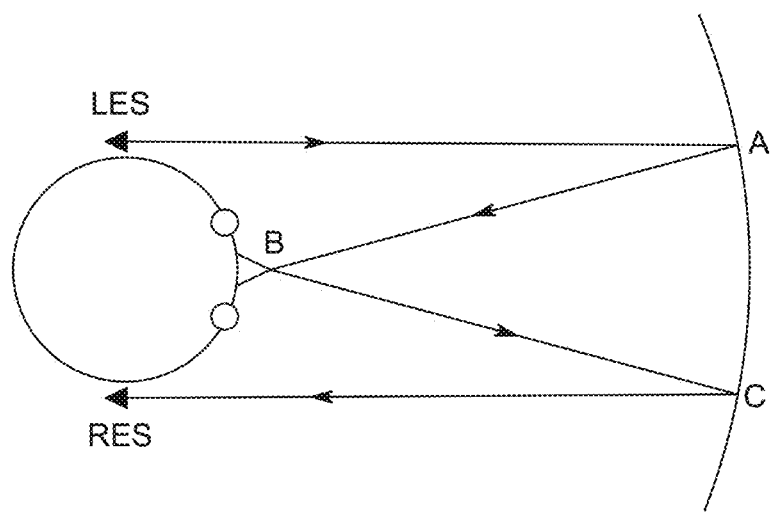
FIG. 14B illustrates an embodiment of a two-dimensional logical overhead ray diagram for an exemplary mirrored surface, such as that of FIG. 14A, when a light source in a left eye stalk emits broadband light toward point A in the mirrored surface, the mirrored surface reflects one or more portions of the broadband light to illuminate a face at point B, and a right eye stalk captures a color image of the face from point C in the mirrored surface.
Figure 20A:
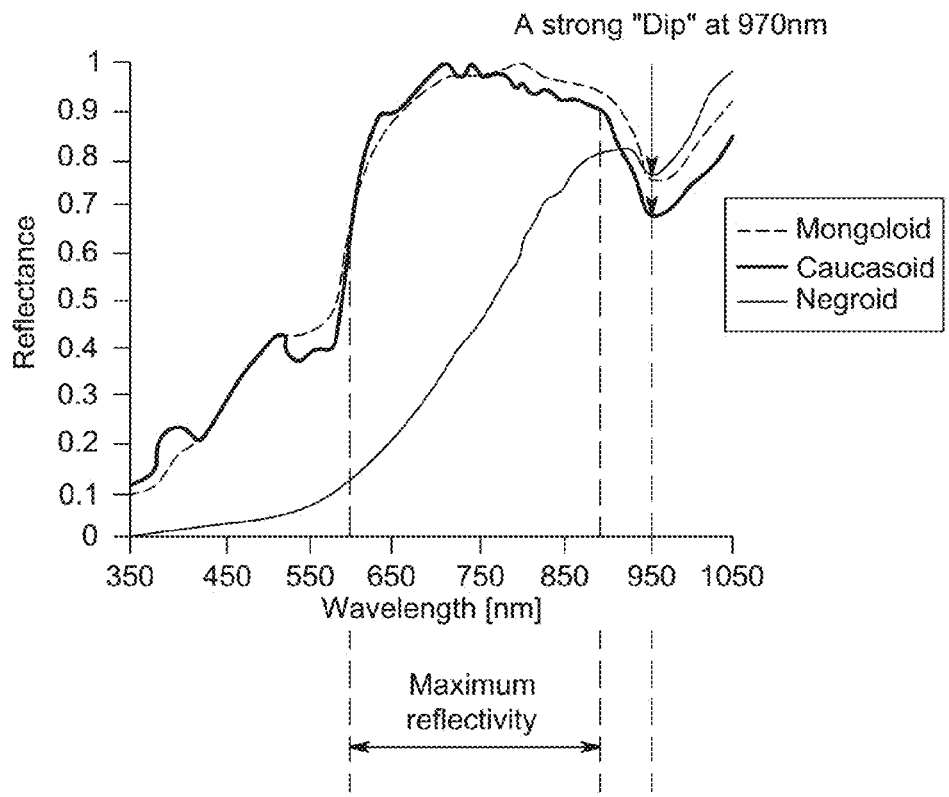
FIG. 20A illustrates an embodiment of a logical diagram of an exemplary graph that indicates that human skin is more reflective of light within one or more ranges of wavelengths than light within one or more other ranges of wavelengths.
Figure 20B:
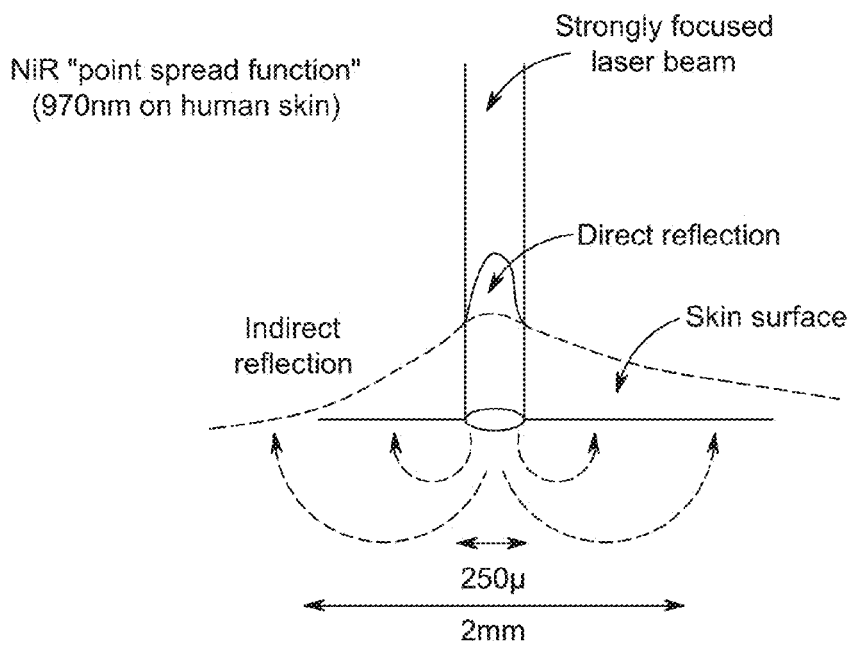
FIG. 20B shows an embodiment of a logical diagram of an exemplary graph that indicates that a beam of light projected onto a given location on an outer surface of human skin can provide a reflection of one or more portions of the light from the outer surface of the skin, can penetrate the skin with one or more other portions of the light, and can provide various magnitudes of subdermal reflections of the one or more other portions of the light at various distances from the given location to provide a blurred reflection of the beam.

In FIG. 14A, a special reflective layer is added that reflects more than 90% of the visible light in a broadband fashion. Exclusions are created by filters that are complementary to the reflectivity, e.g. only the specific narrow bands of the laser light's primary colors. If a broadband source is used to illuminate the face, then about 90% of this light will reflect on the surface and then return to the face, illuminate it and with another reflection some 90% of the diffuse light will be available to a camera aligned to view this mirrored warped stretched facial image. In FIG. 14B light is emitted by a broadband source at the Left Eye Stalk (LES). Ninety percent of the spectrum is reflected by the wavelength selective layer of the screen surface at point A. Some of the light reflects off the user's nose at point B. One of the rays of broadband reflecting from B will reflect again on the screen's surface at point C and is captured by a camera at the Right Eye Stalk (RES). The camera at RES is capturing a color image of the face. Because 90% of the visible spectrum remains present in the acquired image, reasonably high color fidelity can be achieved, and, optionally, small color corrections can be applied ex-post to make up for known spectral holes in the image. See FIGS. 20A and 20B where the detection of human skin is used to improve the rendering of flesh tones.

Figure 14C:
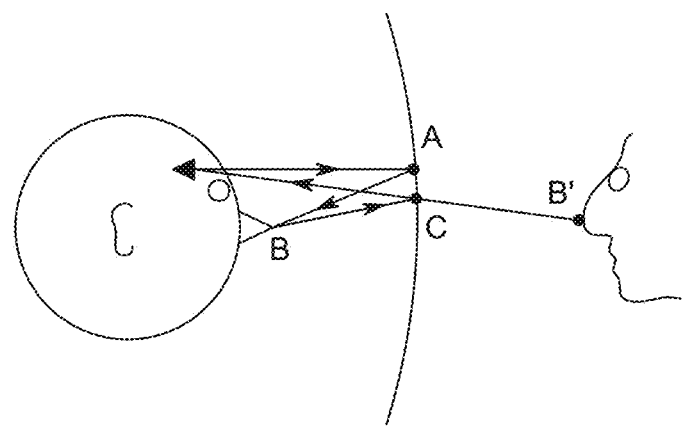
FIG. 14C shows an embodiment of a two-dimensional logical lateral ray diagram for an exemplary mirrored surface, such as that of FIG. 14A, when a light source in a right eye stalk emits broadband light toward point A in the mirrored surface, the mirrored surface reflects one or more portions of the broadband light to illuminate a face at point B, and the right eye stalk captures a color image of the face from point C in the mirrored surface, as represented by a virtual image at virtual point B'.
Figure 14D:
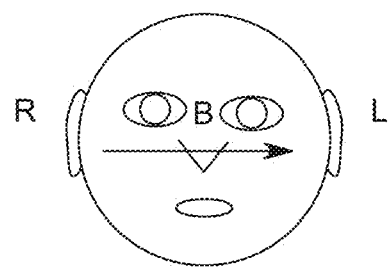
FIG. 14D illustrates an embodiment of a two-dimensional perspective view of an exemplary object illuminated by a beam that horizontally traverses the object.
Figure 14E:
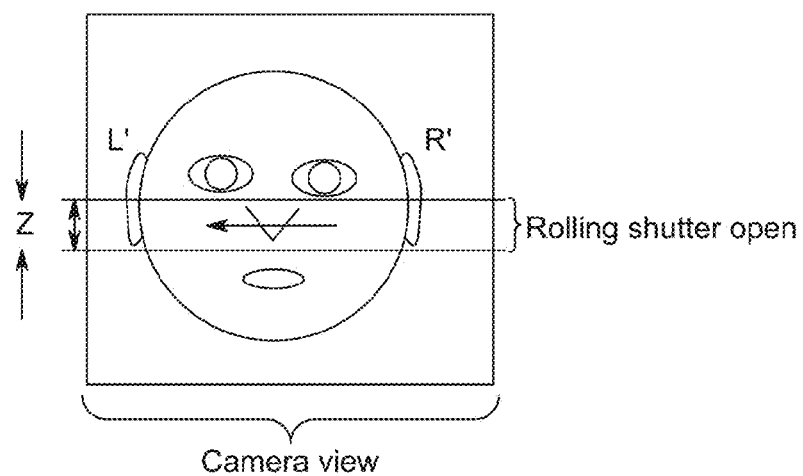
FIG. 14E shows an embodiment of a two-dimensional perspective view of an exemplary object, such as that of FIG. 14D, from a mirrored surface as captured by one or more image sensors that each have multiple rows of pixels and that each reduce the number of activated pixel rows to those associated with a vertical position of a beam that horizontally traverses the object.

Epipolar Illumination is a form of computational illumination that enables high speed and also efficient blur-free acquisition of images in the most challenging of environments. In one or more of the embodiments, an extra set of laser primaries with slightly altered wavelengths might be used as a scanned illumination source. By synchronizing a rolling shutter camera with a vertical scan progression, a strong ambient light can be achieved. However, since there may be shift in the elevation of the reflected scan line of the face (at point B in FIGS. 14C and 14D), the mirror image captured by the camera needs to be synchronized to that row, which may be accomplished with auto lock synchronization in the shutter mechanism. For Example, in FIG. 14E initially a large part of the field of view is open (rows in the camera are reset and are ready to receive light, but as the row location of the beam's spot is detected by the camera's smart asynchronous pixel logic, the row exposure in successive frames is narrowed to a narrower zone Z so that only the part of the face currently being scan-illuminated is recorded. This auto-shutter-lock feature corrects for any horizontal shifts caused by the mirror surface.

Also, one or more embodiments, may use non-epipolar synchronization to see low light reflections outside the retro reflective view cone. See FIG. 14F. In a head mounted projection display system, stereoscopic images are viewable in a narrow view cone close to the projectors. That is why the eyestalks need to be positioned as close as possible to the eyes. When the scanning image beams impinge on the screen's surface at position A, some of the light will be reflected towards position B— the tip of A's nose, and some will transmit towards the retro-reflective back surface, where it is strongly retro-reflected back towards the eyestalk and its corresponding eye. The retro-reflected rays form the pixels that make up part of the nose of party B being projected. (Note the nose A to nose B' symmetry in FIG. 14F is coincidental).

Additionally, the portion of the scanned beam that impinges on point A reflects back and may be enough to illuminate A's nose (at point B in FIG. 14F) sufficiently to capture a color selfie image. The image captured by using this "stray" projection light can be color adjusted because we know that projected color mix at each instant, thus the illumination color mix of each captured pixel can be deducted from checking the sequence and timing of the captured images. If we know the exact color mix with which the tip of the A's nose (at point B) is being illuminated then the hue of the reflected light captured by the color camera informs on the color contrast created by the coloring of the surface of nose itself. In one or more embodiments, the color camera is mounted preferentially outside the retro-reflective cones (i.e. more than 5 cm away from the eyestalk projection source). (See FIG. 14G). Further, the color camera is arranged to be in an epipolar arrangement with the scanner(s). The color camera is shuttered in a "non-epipolar" manner to exclude any of the direct image projection light that is retro reflecting back.

Figure 14F:
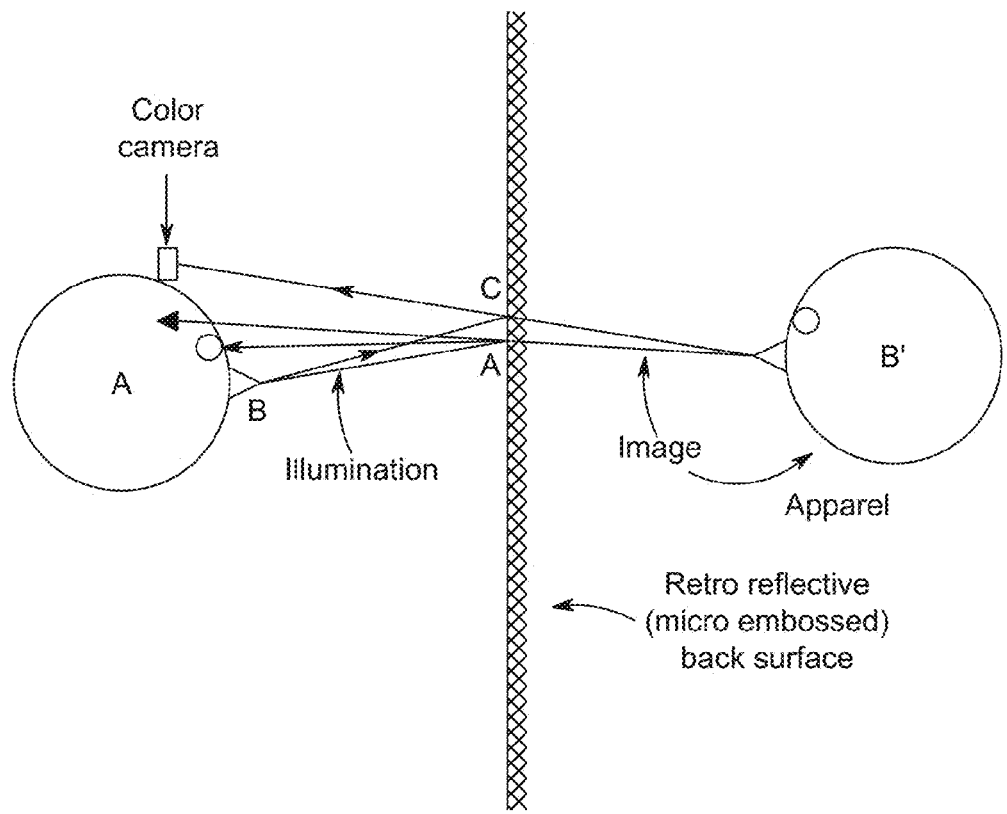
FIG. 14F illustrates an embodiment of a two-dimensional logical ray diagram for an exemplary scanning beam when a light source in an eye stalk emits the scanning beam toward point A in a mirrored surface, the mirrored surface reflects one or more portions of the scanning beam to illuminate a face of person A at point B, a camera that is vertically offset from the light source captures a color image of the face of person A from point C in the mirrored surface, and person A perceives a virtual image of person B based on the mirrored surface having one or more retro-reflective layers that retro-reflect one or more other portions of the scanning beam emitted toward point A.
Figure 14G:
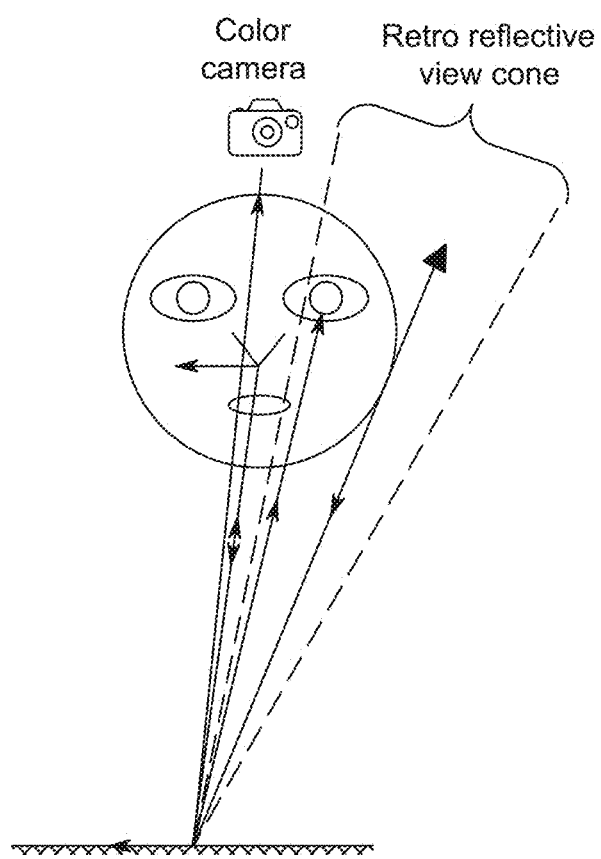
FIG. 14G shows an embodiment of a three-dimensional logical ray diagram for an exemplary scanning beam, such as that of FIG. 14F, from a light source in an eye stalk when the scanning beam traverses a mirrored surface to illuminate an object, such as a user's face, for capturing an image of the object by a camera and to provide one or more retro-reflected view cones that may overlap a field of view of the user while remaining outside a field of view of the camera due to an offset distance between the camera and the light source.

In FIG. 14F, the tip of A's nose (at point B) reflects back via point C on the screen, and therefore in the image field of the color camera, it will fall well above point A, where the current scan line is illuminating the screen. Non-epipolar capture works because it highly favors indirect (reflected) light such as coming from point C, over direct light, such as coming from point A. In non-epipolar exposure mode the rolling shutter is kept closed while the scan line traverses its row in the FoV, essentially blocking that direct light from becoming part of the captured image. (In FIG. 14F, this row selective shuttering is possible because there is a vertical offset between the color camera and the eyestalk projector, so the light returning from B must reflect higher up on the flat screen. But it can be shown that with proposed curved screen any offset (e.g. horizontal, as in a strict epipolar arrangement) of the color camera enables non-epipolar direct light to be excluded from the image. Also, when just a small portion of the light reflects back, with a sensitive camera set to capture only the portion of the face currently being illuminated, at least a portion of the facial color contrast can be observed. Optionally, the reflectivity of the screen surface can be tuned towards a greater portion being specularly reflected. (Bragg coatings, partially silvered mirror surface, and the like).

In one or more embodiments, flash exposure may be provided during the projection blanking interval. In most pixel sequential projectors the image projector is dark during the blanking interval, when the mirror returns to the top of the FoV to start the next frame. During that blanking interval, a white illumination flash source may strobe briefly. And the reflected light can be used to capture a full color image that can be matched to the NIR acquired 3D surface. Unwanted views of the projectors, illumination sources and eyestalks occluding the face can be removed from the final facial avatar point cloud.

Further illumination by visible scanning beams can be choreographed to exclude the center parts of the eyes, the iris, rendering illumination substantially invisible.

Illustrative Architectures for Heads Up Displays

Figure 15A:
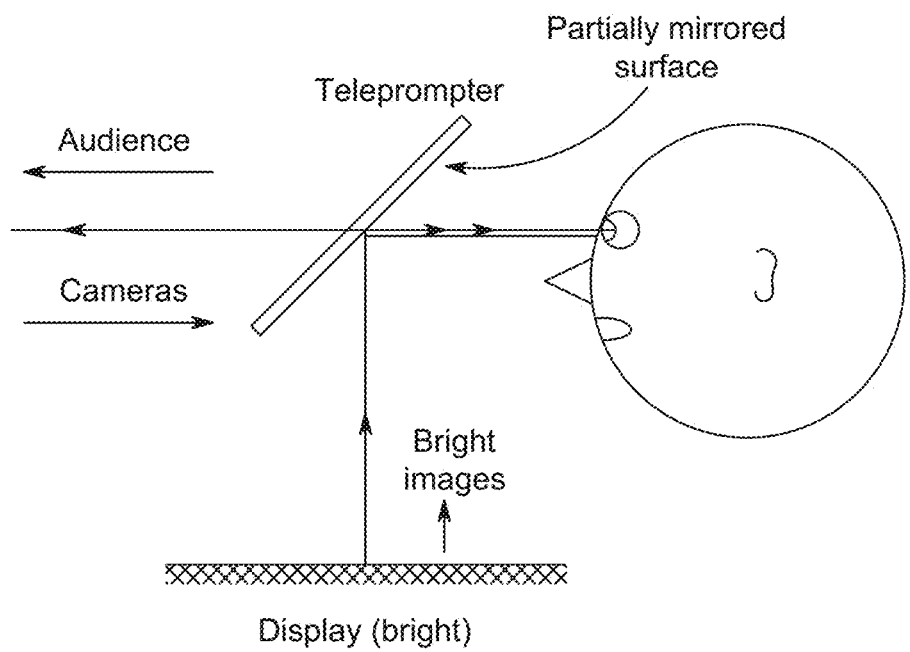
FIG. 15A illustrates an embodiment of a two-dimensional logical ray diagram for a conventional teleprompter.

There are systems with two separate surfaces, one for the display and an additional one for cameras. For example, in FIG. 15A, a conventional teleprompter is shown with the viewer looking through a partially mirrored surface, which reflects a bright display typically hidden, outside the audience and the presenter's view, and also outside any of the studio cameras' lines of sight. Although the half mirror loses some of the display light, the display illumination level compensates for that loss and is bright enough to create a clear image for the presenter. Similar arrangements might enable a display to be viewed while cameras hidden behind the screen capture the viewer's face. The camera sees light coming though the mirror, while the viewer sees light reflecting off the mirror, or visa-versa.

Figure 15B:
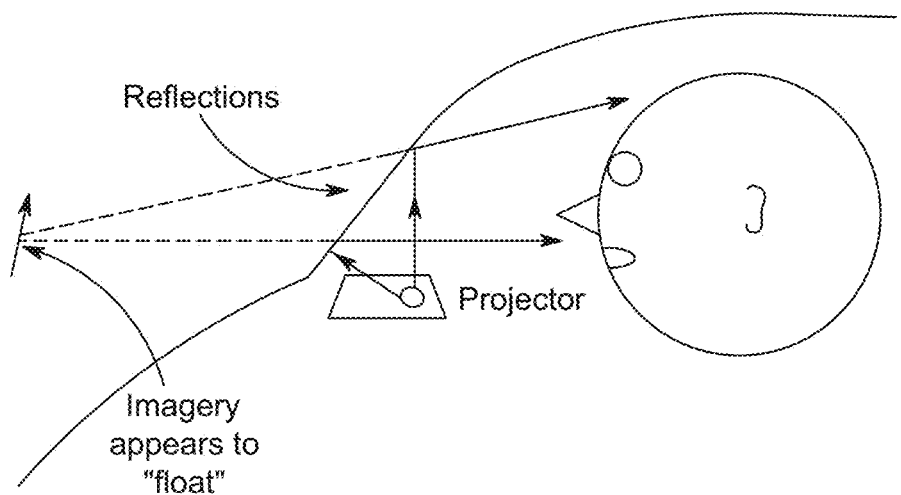
FIG. 15B shows an embodiment of a two-dimensional logical ray diagram for a conventional heads-up display (HUD) that employs special optics to reflect light from a windshield of a vehicle to provide virtual images in a narrow view space.

In FIG. 15B, a conventional heads up display (HUD) is shown where a projection imaging system is hidden from view and the image is relayed to the viewer (typically the pilot or driver) via a partially reflective surface, often via the inside of the cockpit or car window. Special optics make the displayed symbols appear at a distance in front of the vehicle by setting the virtual display surface several feet away from the driver's eyes to mitigate accommodation fatigue of the user's eyes. This type of HUD optics tends to create a narrow view space referred to as the "eye box." The eye box must be large enough for both eyes to see the image and should allow the head position to move.

Figure 15C:
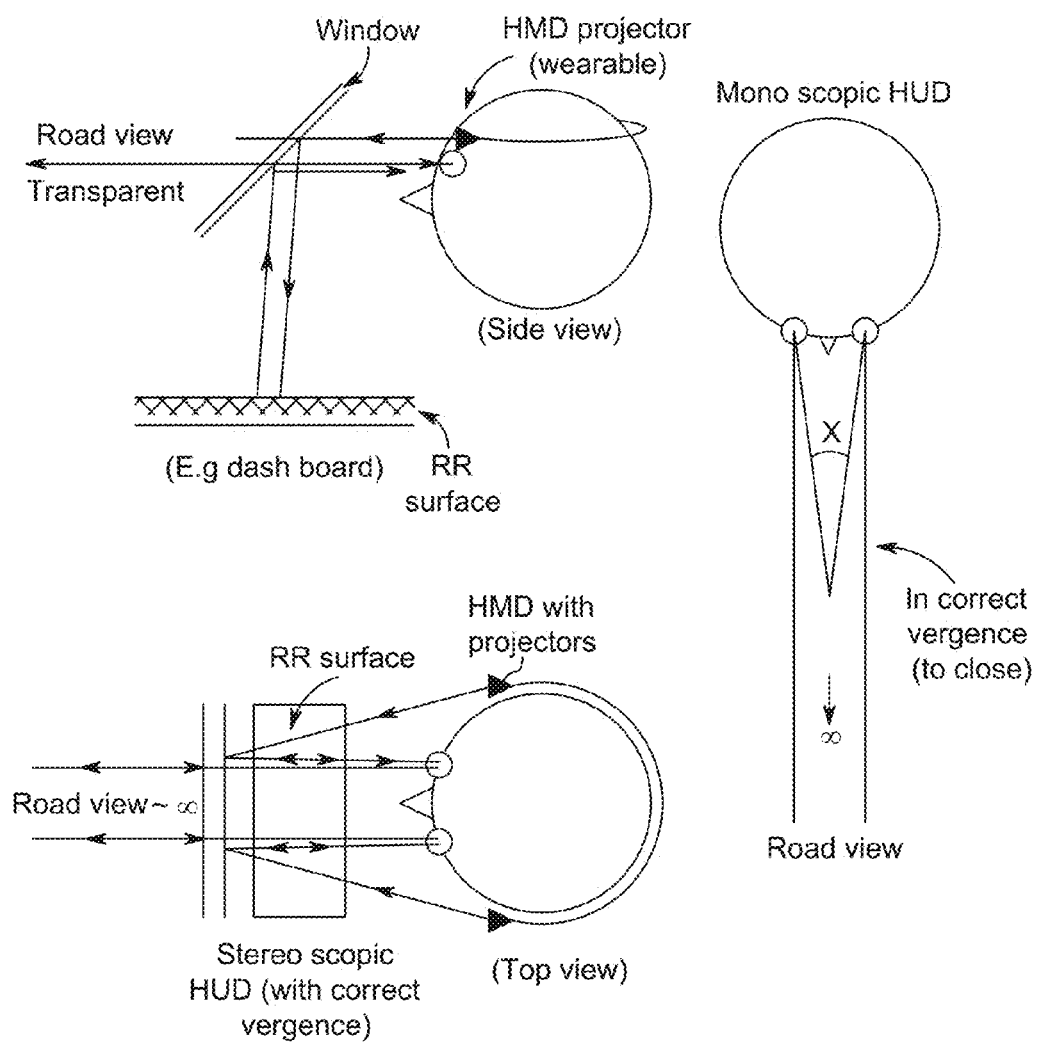
FIG. 15C illustrates an embodiment of a two-dimensional logical lateral ray diagram for an exemplary stereoscopic projection system that includes a wearable projection system that employs a retro-reflective surface offset from a window, a two-dimensional logical overhead ray diagram for the stereoscopic projection system, and a two-dimensional logical overhead ray diagram for exemplary convergence ranges of the stereoscopic projection system.

In one or more of the various embodiments, a stereoscopic HUD can be provided with accurate perspective tracking. See FIG. 15C. A user wearing a head mounted projection display system can see stereoscopic images reflected on the inside of the vehicle window, such as an automobile or an airplane. Actually the left eye and right eye of the user sees images projected by the left and right scanning laser projectors build into the "eyestalks" of the system. There is a retro-reflecting surface outside the driver's view space such as the dashboard, so that all rays coming from each projector retro-reflect and return approximately to the left and right eye of the driver respectively.

Additionally, unlike in the conventional HUD depicted in FIG. 15B, the novel system can be fully stereoscopic. Sensors in the system may track the head position of the driver with respect to the display field of view (FoV). Images can be perspective adjusted, in real time, even during rapid head movements, instantly informed of the new head position in six Degrees of Freedom (6 DoF) by the head tracker integrated in the system. An optical tracker (e.g. camera or laser scanning) using e.g. simple retro reflective fiducials in the car's window can yield an extremely accurate head position every millisecond. The vergence perspective can be adjusted to correspond to the correct vergence for distance of a real world object (e.g. a road hazard), and the hazard warning will not take away the driver's focus on the road by inserting a monoscopic near field image in front of a real world road hazard in the far-field.

For Example, when a moose crosses the road at a substantial distance, high resolution, high dynamic range or hyper spectral stereo cameras might detect the moose. Such an advanced machine vision system might be placed well above the viewer's line of sight in the windshield or even on a separate module on top of a vehicle. Smaller cameras in the headset align the perspective of the driver with that of the car's camera system. Good alignment insures that the stereoscopic hazard call-outs are placed exactly in the three-dimensional FoV of the viewer. As a result, exactly where the moose is crossing, a hazard call-out red, flashing "look out!" three-dimensional pointer pointing at the crossing moose appears. The color of the call-out would indicate the remaining distance to impact, from green, to yellow & red. The warning may show the predicted impact & collision point, and advice on which might be the best collision avoidance maneuver. (Steer left/right/slow down).

Figure 15D:
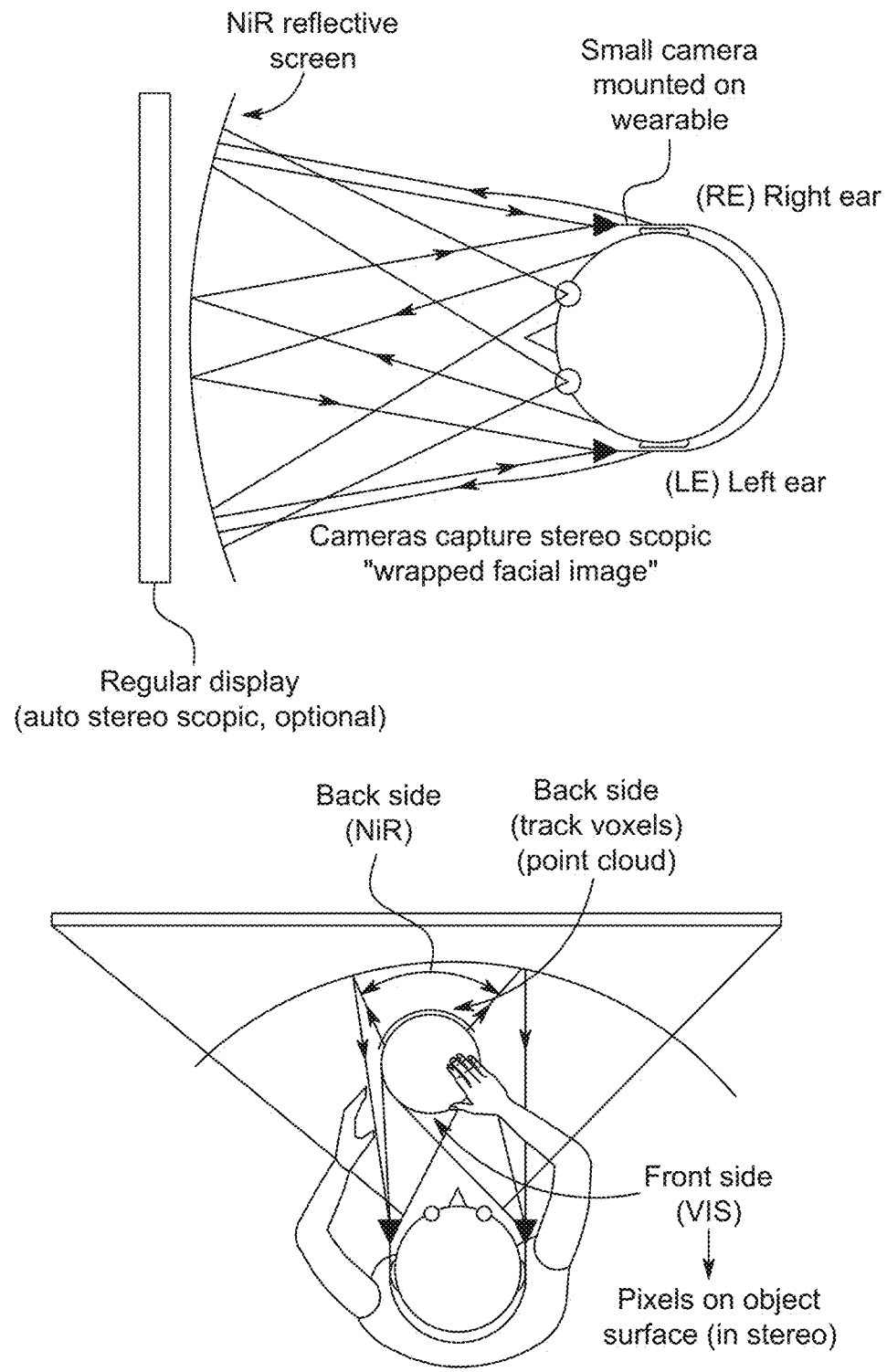
FIG. 15D shows an embodiment of a two-dimensional logical ray diagram for one or more exemplary cameras that capture one or more views of one or more objects directly from the one or more objects or from a mirrored surface that can be positioned between a user and a display system to provide one or more surround images that wrap partially or completely around the one or more objects.

In FIG. 15D, a three-dimensional holographic display and interactive workspace is shown. In one or more embodiments, the head mounted projection display system uses a concave surface reflector or a triptych style reflector as described in previous sections. The user wears tiny cameras, or scanning sensors, which enable the face, the hands or objects manipulated by the user to be motion captured and efficiently turned into a high-resolution three-dimensional point cloud. Such a concave surface might be a partially silvered mirror, or a wavelength selective mirror surface, as described earlier, which is placed between the display surface and the viewer. The viewer sees a bright display through the curved reflector. The user's view of the display remains un-warped, as it is not reflecting on the curved surface. The head-mounted wearable camera(s) records the warped "surround" reflection of the face, hands and/or manipulated objects as (stereoscopic) selfie video. The display might be a conventional monitor or TV, a projection surface optimized for a stereoscopic system, or any other suitable bright display system.

Figure 15E:
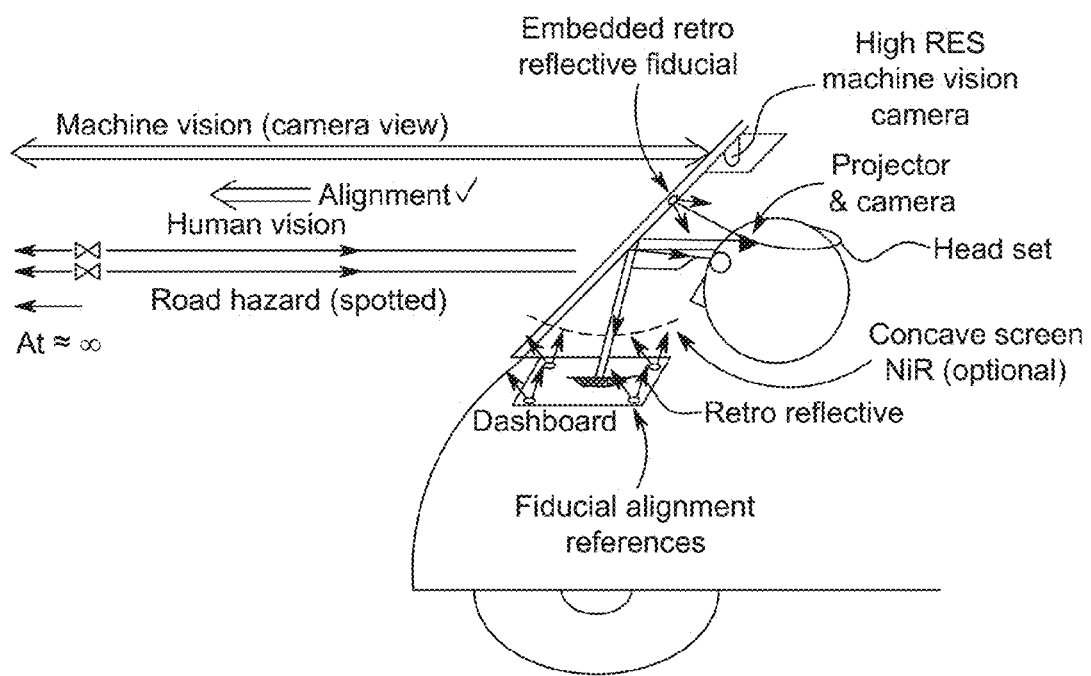
FIG. 15E illustrates an embodiment of a two-dimensional logical ray diagram for one or more exemplary reflective surfaces and an exemplary stereoscopic projection system, such as that of FIG. 15C, to provide an advanced driver assistance system (ADAS) a constant view of a driver's face or eyes.

In FIG. 15E, one or more embodiments of a driver assisting multi modal stereoscopic HUD and driver monitor system are illustrated. In one or more embodiments, an additional configuration combines the stereoscopic HUD described in FIG. 15C with a concave reflecting surface to enable the system to maintain a constant view of the driver's face and eyes. This would be helpful in monitoring the driver's attention to detect road hazards and their general state of alertness. Having the system co-located on the user's head allows not only a full stereoscopic image to be presented to the driver/user, but also a full three-dimensional stereoscopic image both of the driver's face e.g. using infra-red light, scanning laser or a strobed NIR flash, and look along with the driver to closely follow the driver's actual current perspective through the window onto the road in a perspective correct stereoscopic three-dimensional view. As described previously, by monitoring the user's head position and gaze the system can detect whether the driver is alert and is likely to take the expected evasive action or whether intervention by an automated collision avoidance system is warranted.

Improvements for Telepresence Systems

Figure 16:
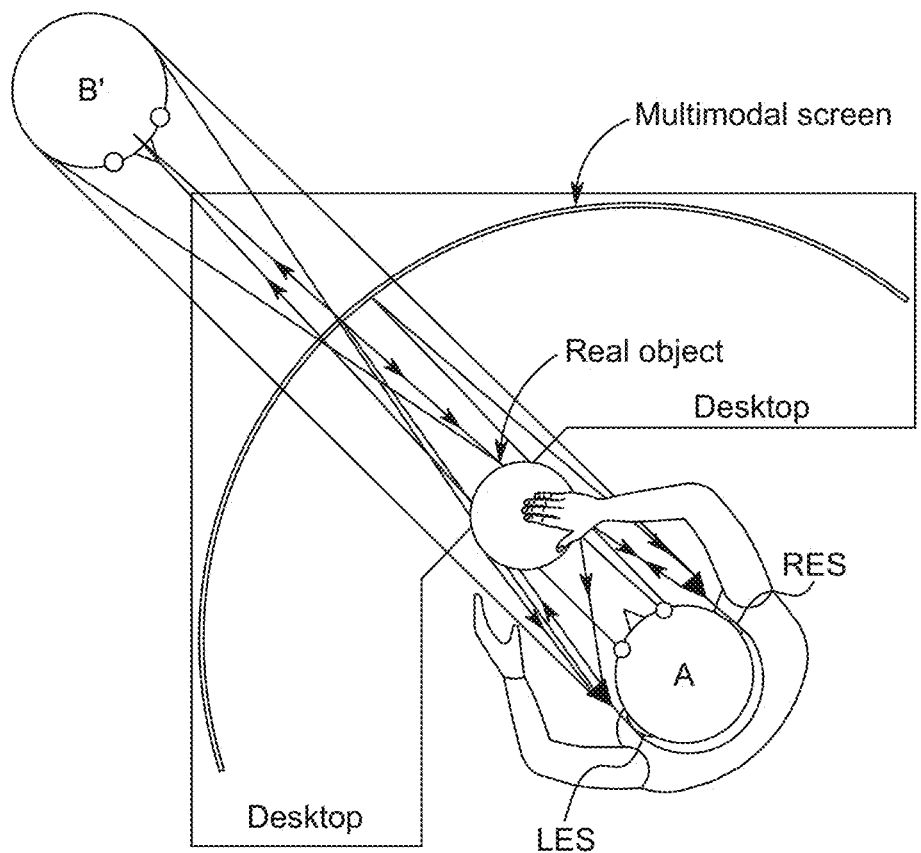
FIG. 16 shows an embodiment of a two-dimensional logical ray diagram for an exemplary headset that projects one or more virtual images of person B onto a mirrored surface and that captures one or more images of one or more objects directly from the one or more objects or from the mirrored surface.

In an office environment, a multi-modal screen that provides an infinity three-dimensional view for a cubicle and a "teleportation" screen can be useful. As shown in FIG. 16, a concave screen can be fitted between adjacent walls in a cubicle so that the optical projection surface is at eye level in a cubicle space corner. User A can manipulate a real object and show it off to a remote colleague B viewed on A's infinity work view holographic display screen in three-dimensions as hologram B'. A's headset eye-stalks (RES & LES) both display the hologram he is viewing, and record the object in his hands as well as his face, sending these as a colorized point cloud to the remote colleague. The multi-modal display screen may be opaque, translucent or transparent. (See FIGS. 8A-8D).

Figure 17A:
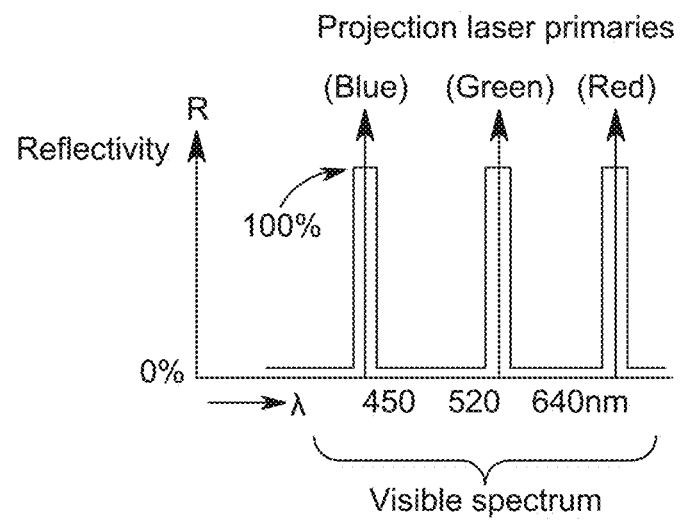
FIG. 17A illustrates an embodiment of a logical diagram of an exemplary graph that indicates one or more ranges of wavelengths blocked by one or more exemplary spatial filters that employ one or more reflective coatings.
Figure 17B:
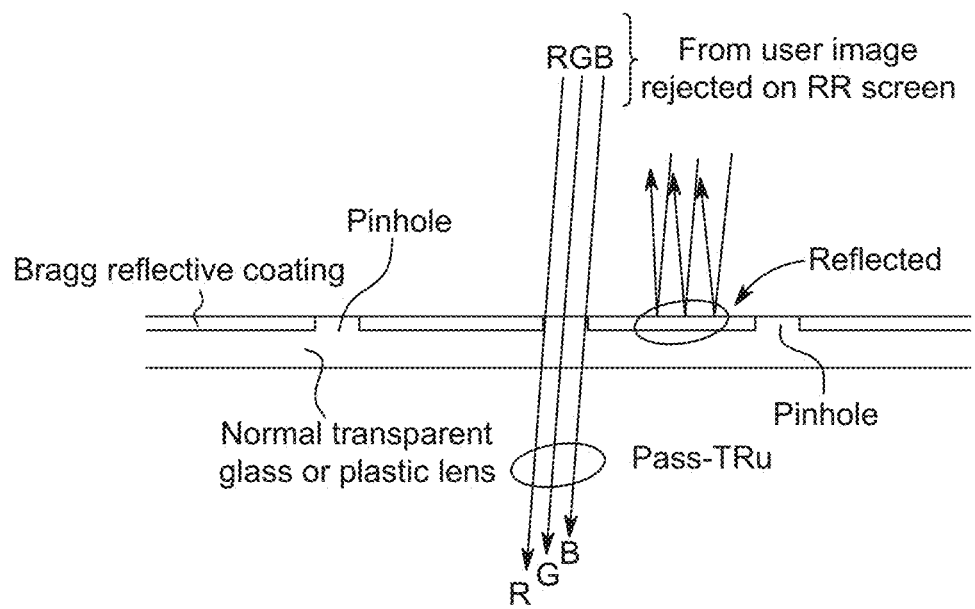
FIG. 17B shows an embodiment of a two-dimensional logical ray diagram for an exemplary spatial filter that has one or more reflective coatings that block one or more ranges of wavelengths and one or more pin holes that pass a whole portion of the light field.
Figure 17C:
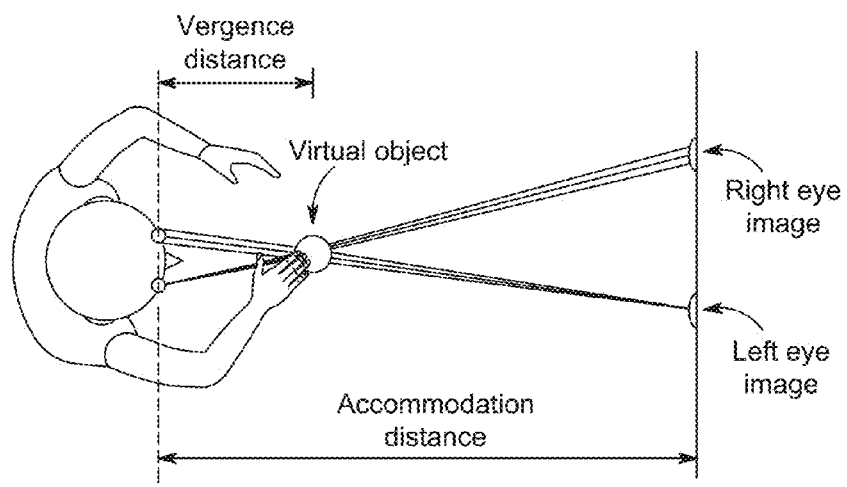
FIG. 17C illustrates an embodiment of a two-dimensional logical ray diagram for an exemplary mixed-reality environment where a discrepancy exists between a distance from a location of a user's eyes to a perceived location of a virtual object (a vergence distance) and a distance from the location of the user's eyes to a location of a display surface (an accommodation distance) to highlight potential for the user to experience blurriness of real objects at a location near the perceived location of the virtual object or to experience discomfort from the user adjusting focus from the vergence distance to the accommodation distance and back again.
Figure 17D:
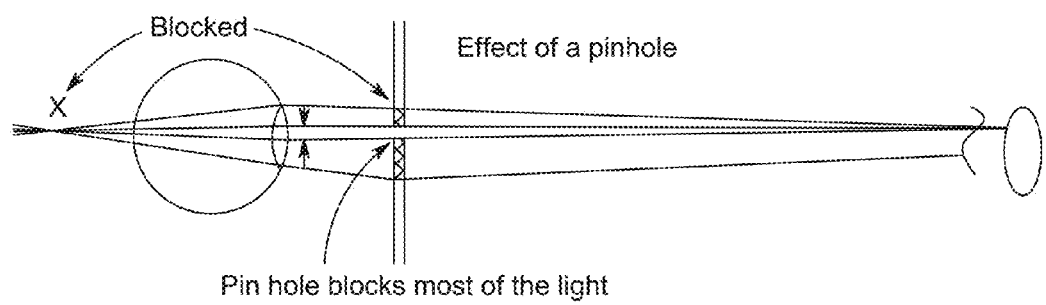
FIG. 17D shows an embodiment of a two-dimensional logical ray diagram for exemplary eyewear that includes one or more lenses having one or more pinholes, such as one or more of those of FIG. 17B, to mitigate one or more effects of one or more discrepancies between two or more distances, such as the discrepancy of FIG. 17C.

FIG. 17C shows that, when in mixed reality, a virtual image that is held up close and the projection surface is at some distance, then the accommodation distance of the eyes fixating the object is greater than the distance where the object is perceived (the vergence distance). As a result the real fingers holding the object may appear blurry, unfocussed. As a user's vision tries to adjust zooming in and out between the two realities this may cause discomfort. To mitigate this issue somewhat, a special spatial filter may be applied, based on the concept of a pinhole eyewear. For example, a special selective Bragg style reflective coating filter can be employed to block out just a few nanometers of the visible spectrum where the head mounted projection display system's primary laser colors are, e.g. blocking out by reflective coatings, such as blocking only 448-453 nm blue, 518-523 nm green and 637-642 nm red. See FIG. 17A. Such a surface would block the lasers at 450, 520, 640 nm respectively, but would be substantially transparent, passing the rest of the light, which is greater than 90% of the spectrum. Further, a great density of small pinholes could be made in this coating. When wearing eyewear with lenses with such a coating the laser light of the virtual object images would be spatially filtered passing only through these pinholes. The accommodation of the virtual objects would be greatly facilitated and such eyewear would substantially mitigate the accommodation vergence conflict. See FIGS. 17C and 17D.

In one or more of the embodiments, a range of views of the user's face, body or an object, are reflected by the concave screen arrangement towards one or more cameras, typically a stereo camera pair with at least partially overlapping fields of view. From these multiple overlapping views, a three-dimensional point cloud of the face, body or object is derived. Each observed pixel is anchored on a precise voxel location at any one time. Optionally, a prior shape or texture model of the face, body, or object, is used to complete surfaces that are temporarily occluded. (i.e. not within the range of the motion capture cameras, e.g. the back of the head or under a hand or arm.)

In one or more embodiments, a point cloud of a three-dimensional surface in motion is maintained by the system in-real time and stored in system memory where it represents the current state of the moving three-dimensional surface with only a minimal delay (10-50 milliseconds). Optionally the point cloud is sent to other locations. E.g. in a two way conference after generating new facial point cloud data of user A, A's system transmits the update to system B, and visa-versa. See FIG. 18. A virtually unlimited number of views with dynamic perspectives of the user's face, body or object can be generated from this point cloud. The right immersive perspective tailored to each viewer's observation angle, her personal inter-ocular distance, and her current head orientation can be rendered, ensuring the most natural and artifact-free viewing experience. The rendering of these dynamic viewpoints in real-time at the destination ensures the lowest latency in responding to fast random (inherently unpredictable) head movements of the viewers at that destination. Fast three-dimensional stereo parallax calculations might run in local devices using a graphics processor, similar to how such views are currently rendered in three-dimensional graphics operations in mobile games. The views might be tailored towards the particular display system screen geometry, such as Oculus™, Photon-Jet UltraLight™ or Augmented Reality glasses, ensuring that the holographic three-dimensional video acquisition and rendering system can in fact function in heterogeneous networks. Minimizing latency in head mounted projection display systems requires some kind of "foveation". Foveation is the rendering of only what is being looked at, just in time, in the last 1 millisecond before the new image photons are presented to the fovea. In each case the final transformation is directly computed from the surface point cloud data. By keeping the data as close as possible to the output system, —e.g. in graphic processor buffers in the actual rendering system so that minimal latency is assured.

In one or more embodiments, a holographic space is created by surrounding the user with multi-modal surfaces on all sides. The reflective surfaces enable a panoramic outward looking camera array to capture 360-degree wrap-around images of the user. In FIG. 19A, a person is in a room that has been retrofitted with multi modal surfaces on each of the four walls surrounding the user. The head mounted projection display system headset is outfitted with an additional three cameras that capture the reflections of the user's back (III) and sides (II and IV). These three additional views should enable a holographic system to capture all of the user's facial surfaces and render a flawless and complete surface point cloud of the user's head. FIG. 19B shows the three additional views that are captured by each of these additional cameras.

Figure 19E:
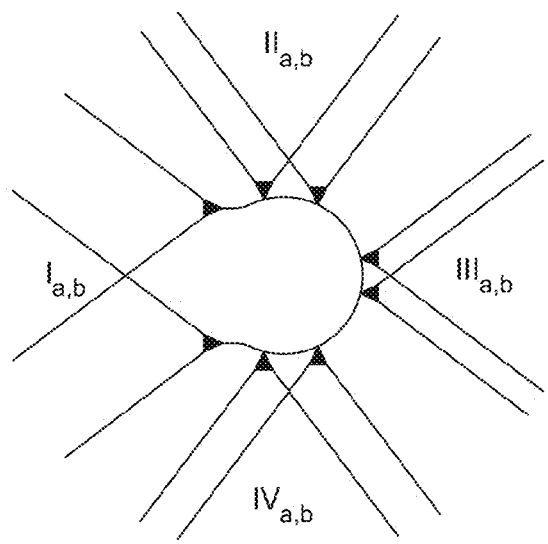
FIG. 19E shows an embodiment of a two-dimensional ray diagram for an exemplary motion and image capture system that includes a panoramic camera array having a stereoscopic pair for each quadrant around the panoramic camera array.

In FIG. 19C, a concave cylindrical room is shown where the surfaces surrounding the user might be stretched into a toroidal shape to maximize the capturing angles. See FIG. 19D. A wearable device, such as the laurel wreath configuration of a head mounted projection display system (in FIG. 19E) has additional cameras to capture a 360-degree surround view, to capture rear and side views. E.g. partially overlapping eight way views (four stereo pairs, front (Iab), back (IIIab) and two sides (IIab and IVab). It has the effect of capturing motion simultaneously in all directions (creating a "selfie surround video").

In one or more embodiments, human skin can be detected with a NIR point spread function. When a highly collimated beam illuminates a small spot (e.g. <250 microns in diameter), some of the NIR lights will spread sub-dermally and a broader spot is observed. The width of this point spread is a good indicator that we are illuminating human skin tissue. Additionally, human skin is least reflective in UV and Blue, rising to maximum reflectivity in the 600 to 800 nm domain (yellow & red) but it strongly dips again in NIR with a minimum reflectivity around 970 nm. (See FIG. 20A. It has been shown that NIR light starting at 850 nm peaking at 970 nm tends to penetrate up to a 1 mm into the sub-dermal layers, and will re-emerge at least partially, therefore it tends to blur sharp edges drawn by high focused an illumination sources. (See FIG. 20B). In one or more embodiments, a NIR scan beam can be employed to detect human skin, by two complementary methods. First, by looking at the RED-NIR differential, which works well on light skinned people. Second, by looking at the NIR "point spread function", as indicated previously and which works equally well for all skin tones.

It is advantageous to get the correct skin tones reproduced on holographic avatar representing a user in a three-dimensional telepresence system. Using a palette of just three narrow band Red Green Blue (RGB) primary colors may otherwise introduce metameric aberrations, which will be most noticeable in the face, or other body parts. Human vision is particularly sensitive to detecting "true" skin tones. Thus, having a prior model of the user's exact skin tones is advantageous, as that the system can instantly switch to the correct RGB settings given that there is certainty that skin is in fact being detected.

Additionally, smiles, grins, frowns and blushes etc. are critically emotional feedback signals that are of importance in empathetic communications. Having an instant way to segment out and prioritize acquisitions and ensure lowest latency transmission of skin tone and motion helps to close the loop emotionally. Further, when driving non-human avatars, e.g. an animated green troll, being able to transpose such emotional human facial percepts instantly, also has proven to be quite compelling in creating the perception of emotional truth.

Holographic Video Capture and Telepresence System Capturing real-time 3D motion imagery through exact spatial-temporal light field registration for 5 generation mobile communications. Automated Methods to calibrate and setup, creating 360 degree viewable holographic live imagery, detect surface details using plenoptical scan methods, use multi-spectral signals to detect empathetic percepts.

Figure 21:
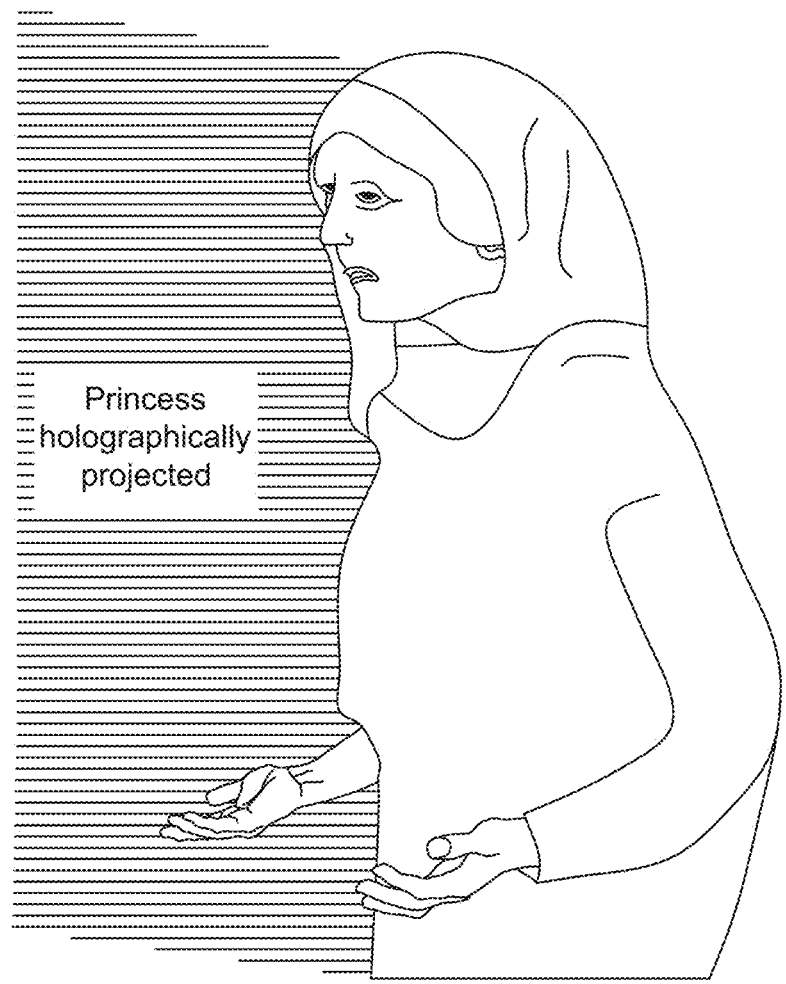
FIG. 21 illustrates an embodiment of a three-dimensional view of an exemplary virtual image of a princess that is holographically projected onto a mirrored surface.

FIG. 21 shows a "hologram" message of a Princess pleading for a General's help that is similar to a scene in a famous science fiction movie initially released in 1977, which has inspired many attempts to realize the non-fictional version of holographic communications ever since. Up until now, capturing and transmitting an exact moving three-dimensional image of a person talking has proven to be technically challenging. It remains a compelling fiction, but alas it was not yet been widely available to consumers.

Figure 22A:
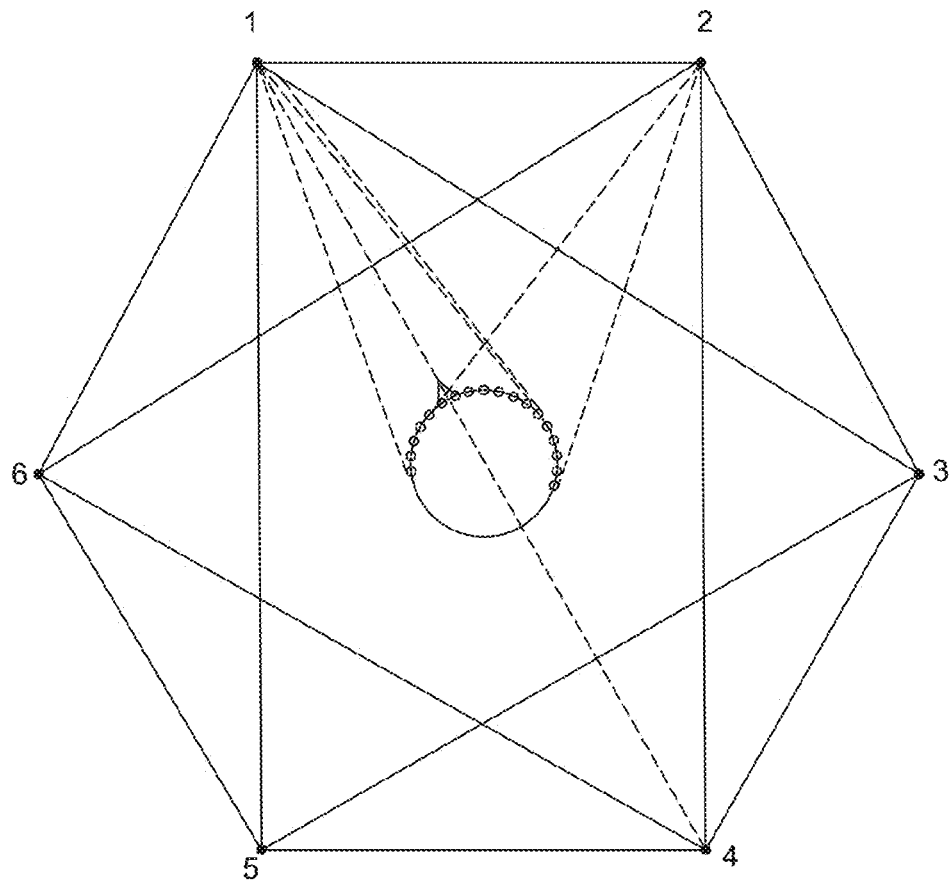
FIG. 22A shows an embodiment of a two-dimensional logical ray diagram for an exemplary telepresence system that includes six mirrored surfaces that surround a space and an array of six cameras that are positioned around the space and that are arranged to form a collective FOV within the space to facilitate three-dimensional image capturing of one or more objects within the collective FOV, where dots illustrated along an outer surface of an object in the collective FOV indicate directly viewable portions of the surface from the perspectives of the first and second cameras in the array.
Figures 22B, 22C:
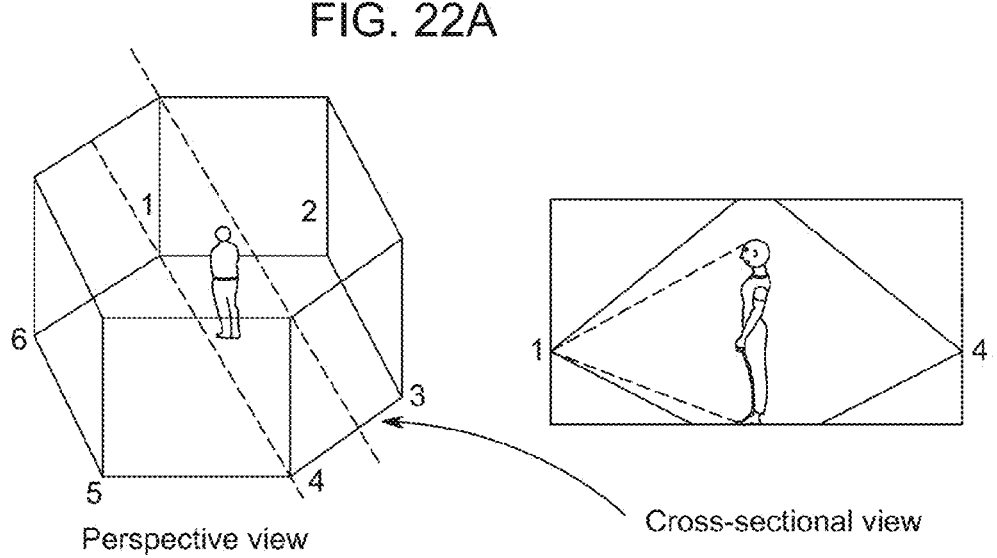
FIG. 22B illustrates an embodiment of a perspective view of an exemplary telepresence system, such as that of FIG. 22A.
FIG. 22C shows an embodiment of a two-dimensional logical ray diagram for the telepresence system of FIG. 22B along the dashed lines of FIG. 22B.
Figure 23A:
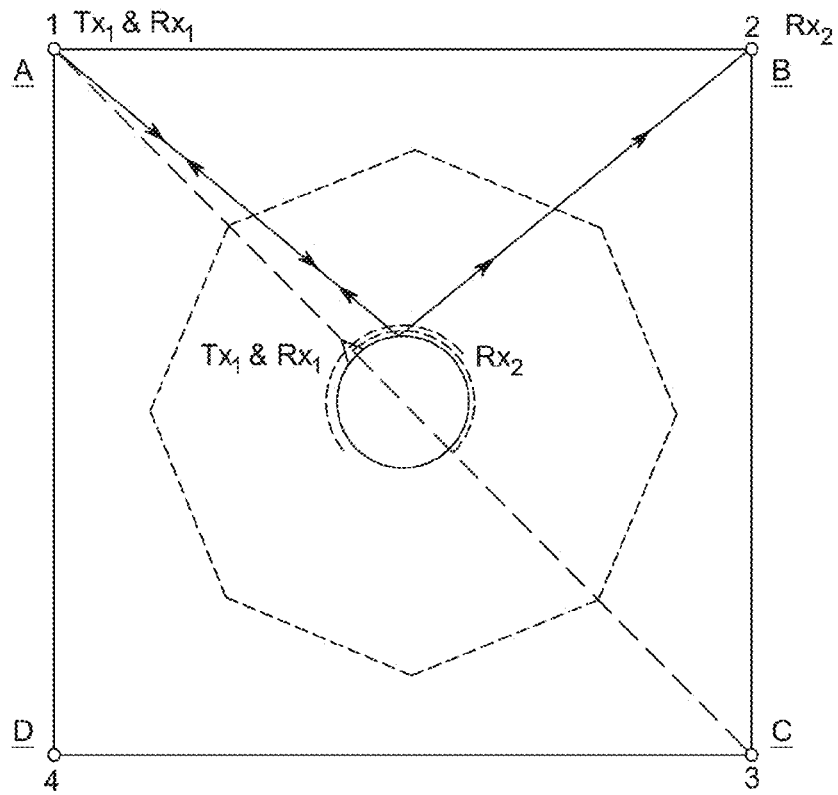
FIG. 23A illustrates an embodiment of a two-dimensional logical ray diagram for an exemplary telepresence system that includes four mirrored surfaces that surround a space and an array of four cameras that are positioned around the space and that are arranged to form a collective FOV within the space to facilitate three-dimensional image capturing of one or more objects within the collective FOV, where dashed lines illustrated along an outer surface of an object in the collective FOV indicate directly viewable portions of the surface from the perspectives of the first and second cameras in the array.
Figure 23B:
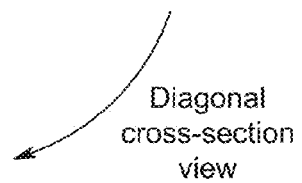
FIG. 23B shows an embodiment of a two-dimensional logical ray diagram for an exemplary pair of elevated cameras in an array of cameras of a telepresence system, such as the first and second cameras in the array of cameras of the telepresence system of FIG. 23A.
Figure 23B:
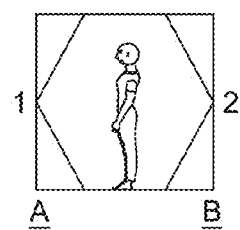
Figure 23C:
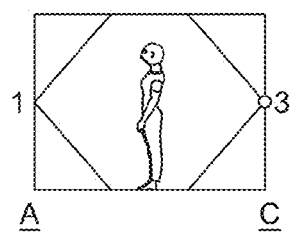
FIG. 23C illustrates an embodiment of a two-dimensional logical ray diagram for an exemplary pair of elevated cameras in an array of cameras of a telepresence system, such as the first and third cameras in the array of cameras of the telepresence system of FIG. 23A.
Figure 23D:
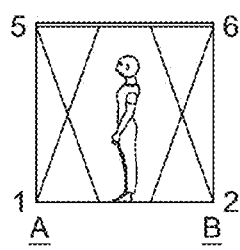
FIG. 23D shows an embodiment of a two-dimensional logical ray diagram for an exemplary pair of elevated cameras in an array of cameras of a telepresence system and for an exemplary pair of ground-level cameras in the array of cameras of the telepresence system, such as the first and second cameras in the array of cameras of the telepresence system of FIG. 23A.
Figure 23E:
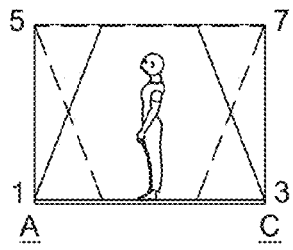
FIG. 23E shows an embodiment of a two-dimensional logical ray diagram for an exemplary pair of elevated cameras in an array of cameras of a telepresence system and for an exemplary pair of ground-level cameras in the array of cameras of the telepresence system, such as the first and third cameras in the array of cameras of the telepresence system of FIG. 20A.

FIGS. 22A through 22C illustrate a series of identical, small three-dimensional image capture devices that are arranged around a user, which record the user simultaneously from multiple views or directions. The number (N) of the image capture devices is scalable and can range from four to 18. However, typically six devices can be used. The cameras might be arranged in a circle, a sphere, a hemisphere, or in any concave inward looking combination of overlapping viewpoints. Each image capture device might be quite simple, e.g. consisting of a scanning laser projection device and one or more camera-like sensors.

In one or more embodiments, the Field of View (FoV) of each image capture device is wide enough and positioned so that its FoV overlaps to some degree with one or more other image capture device. These devices might have signal Light Emitting Diodes (LEDs) that blink during configuration, perhaps in various colors, to coordinate, calibrate and orchestrate their scanning, and adjust their view positions. These signals might also help the initial set up, or keep the user in the view field of the camera sensors, while a holographic communication is in operation. ("Your "on camera" cues, indicating a current active viewer position: "Here is where I am, looking at you kid!")

Figure 25A:
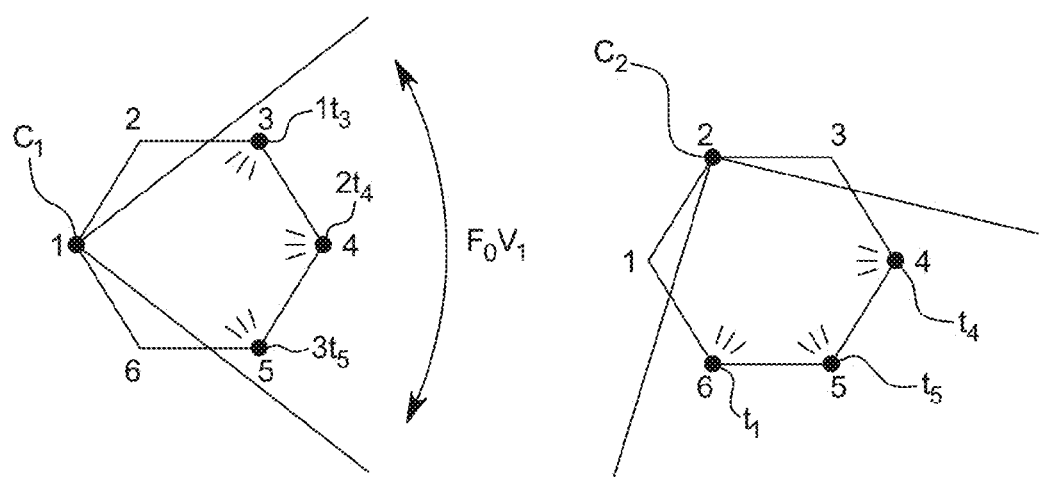
FIG. 25A shows an embodiment of a two-dimensional logical ray diagram for an exemplary active beacon response system that includes an array of cameras when the first camera in the array captures light from the third camera in the array at $t_3$, captures light from the fourth camera in the array at $t_4$, and captures light from the fifth camera in the array at $t_5$ and when the second camera in the array captures light from the fourth camera in the array at $t_4$, captures light from the fifth camera in the array at $t_5$, and captures light from the sixth camera in the array at $t_6$ to facilitate automatic camera position discovery.
Figure 25B:
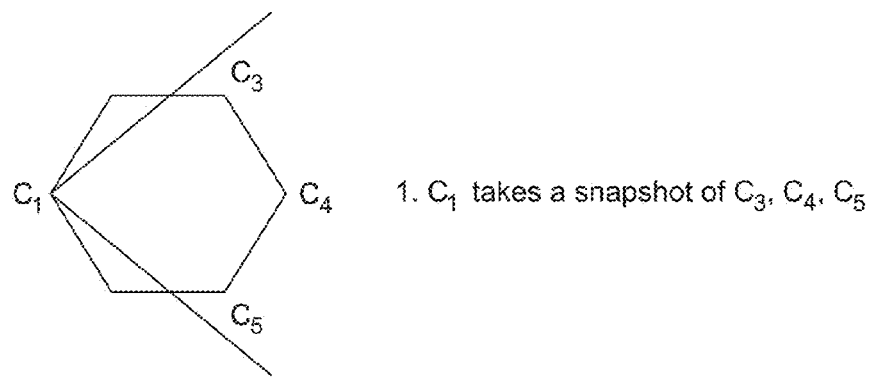
FIG. 25B illustrates an embodiment of a two-dimensional logical ray diagram for an exemplary step in an automatic camera position discovery process when a snapshot is taken by a camera in an active beacon response system, such as that of FIG. 25A.
Figure 25C:
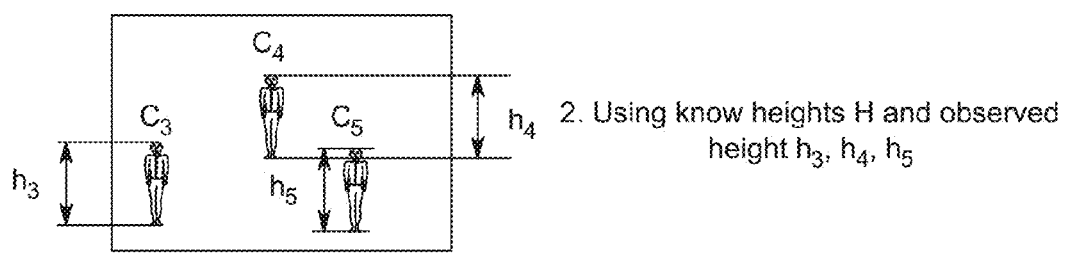
FIG. 25C shows an embodiment of a two-dimensional perspective view of an exemplary image captured by a camera during an exemplary step in an automatic camera position discovery process for an active beacon response system, such as that of FIG. 25B.
Figure 25D:
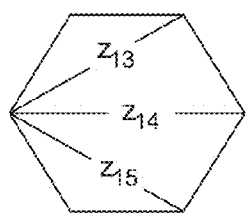
FIG. 25D illustrates an embodiment of a two-dimensional logical schematic of relative distances determined for multiple cameras based on a comparison of known heights of the cameras to observed heights of the cameras as captured in an image, such as that of FIG. 25C.
Figure 25E:
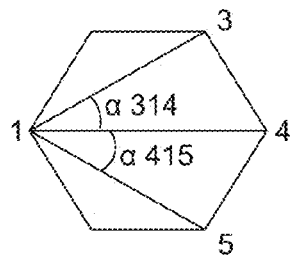
FIG. 25E shows an embodiment of a two-dimensional logical schematic of azimuthal angles determined for multiple cameras based on observed positions of the cameras as captured in an image, such as that of FIG. 25C.
Figure 25F:
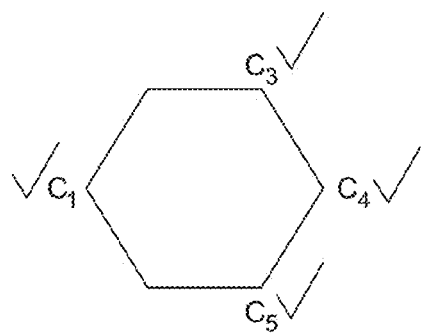
FIG. 25F illustrates an embodiment of a two-dimensional logical diagram of an exemplary completion of an automatic camera position discovery process, such as that of FIGS. 25A-25E, for an active camera and multiple cameras observed by the active camera.
Figure 25G:
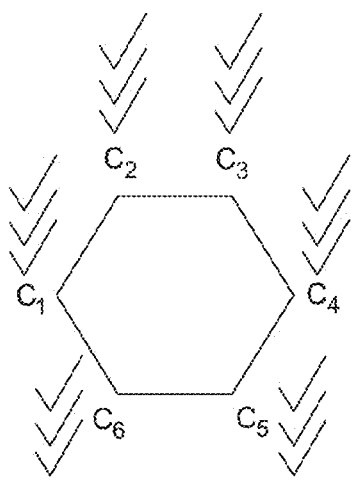
FIG. 25G shows an embodiment of a two-dimensional logical diagram of an exemplary completion of an automatic camera position discovery process, such as that of FIGS. 25A-25F, for each camera of an active beacon response system, such as that of FIG. 25A.

In one or more embodiments, the system can perform auto-calibration with one or more options. See FIGS. 25A-25G and FIGS. 27A-27F. Also, indicator signals might be as simple as a green flashing LED to confirm a correct view capture, or more sophisticated such as a laser pointer director, using the laser scanners as pointing or three-dimensional annotation devices during set up to indicate good positions to place the next image capture device. In FIG. 25A, Camera $C_1$, in position 1, sees three flashes in its Field of View ($FoV_1$) and identifies Cameras 3, 4 and 5 by blinking LEDs at times $t_3$, $t_4$ and $t_5$. Camera $C_2$ sees Cameras 4, 5 and 6. After this configuration at set up, knowing where each of the cameras is, the system can adjust its pre-calculated geometric transforms.

In FIGS. 25B-25G, seven steps are shown for a process using photogrammetry. At FIG. 25B (step 1), Camera $C_1$ takes snapshot of cameras $C_3$, $C_4$ and $C_5$. Moving to FIG. 25C (step 2), known heights and the known camera intrinsics are used to observe the apparent (observed) heights $h_3$, $h_4$ and $h_5$ and position in camera $C_1$'s FoV. At step, 3 the system establishes the relative three-dimensional position, including the distances $z_{13}$, $z_{14}$ and $z_{15}$ to each of cameras $C_3$, $C_4$ and $C_5$ respectively. Flowing to FIG. 25D (step 4), the system observes each of the azimuthal angles between the cameras $C_3$, $C_4$ and $C_5$ that can be calculated from the positions of their images in camera $C_1$ sensor. At FIG. 25E (Step 5), by simple geometry angles $\alpha_{314}$ and $\alpha_{415}$ are known and the sides (the distances $z_{13}$, $z_{14}$ and $z_{15}$) of the two triangles $\Delta_{314}$ and $\Delta_{415}$ are then fully characterized. Flowing to FIG. 25F (step 6), the exact position of the three cameras $C_3$, $C_4$ and $C_5$ with respect of $C_1$ is fully known. Also, at FIG. 25G (step 7), after this process is repeated for each of the 6 cameras, all of the positions are then known.

Self-calibration. Auto-system geometry setup by an active laser scan sequence, e.g. with retro-reflective fiducials. Scan timing or stereo observation will yield instant 3D positions for each fiducial point. Self-calibration. Auto system geometry set up, with fixed calibration target.

FIGS. 27A-27F: Self-calibration. Auto system geometry set up with a calibrated common 3D fiducial shape e.g. figurine—perhaps Princess Leia!—or with a moving calibration target such as a "magic wand" or a bouncing ball. By placing a such a fiducial shape with a known height H somewhere in the view of all system cameras (FIGS. 27A-27C: 4 in the quad camera TeleMagic™ system depicted) the exact orientation in 6 degrees of freedom—its position and its perspective—of each camera is discovered. A motion object will help tease out the synchronization of the system. E.g. the center of bouncing ball (sphere) will need to be at the same point observed by any of the cameras from any observable direction. (N views of the same ball see FIG. 8d).

Figure 27A:
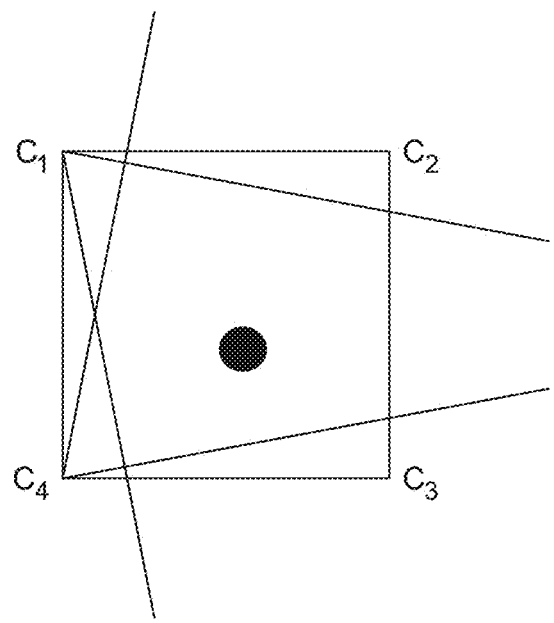
FIG. 27A shows an embodiment of a two-dimensional logical ray diagram for an exemplary telepresence system that includes mirrored surfaces that surround a space and an array of cameras that are position around the space and that are arranged to form a collective FOV within the space, where a fiducial marker having one or more known dimension values can be placed or moved within the collective FOV to facilitate self-calibration of the telepresence system, including position and perspective discovery for each camera in the array and synchronization of the telepresence system.
Figure 27B:
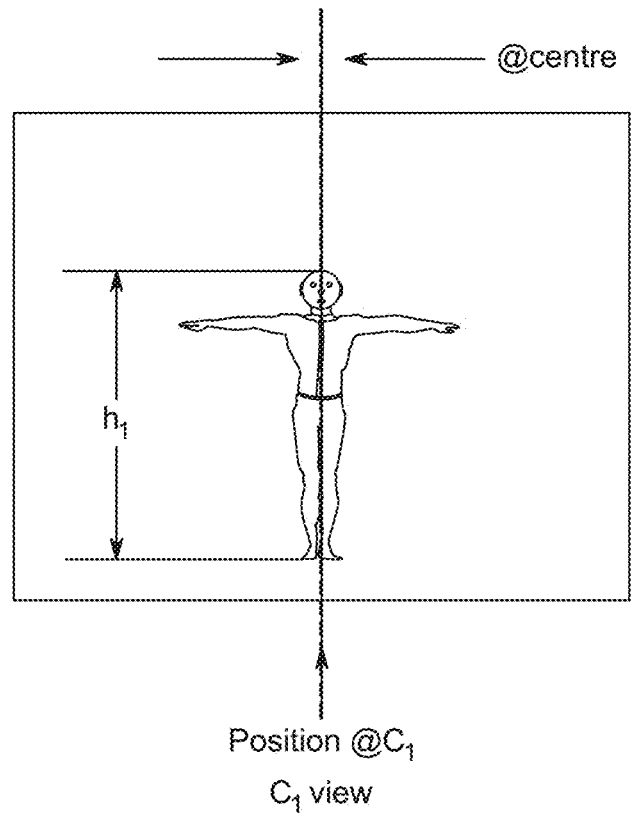
FIG. 27B illustrates an embodiment of a two-dimensional perspective view of an exemplary image of an object captured by a first camera in an array of cameras included in a telepresence system, such as that of FIG. 27A, to facilitate self-calibration of the telepresence system based on the image indicating an observed height of the object at an observed position.
Figure 27C:
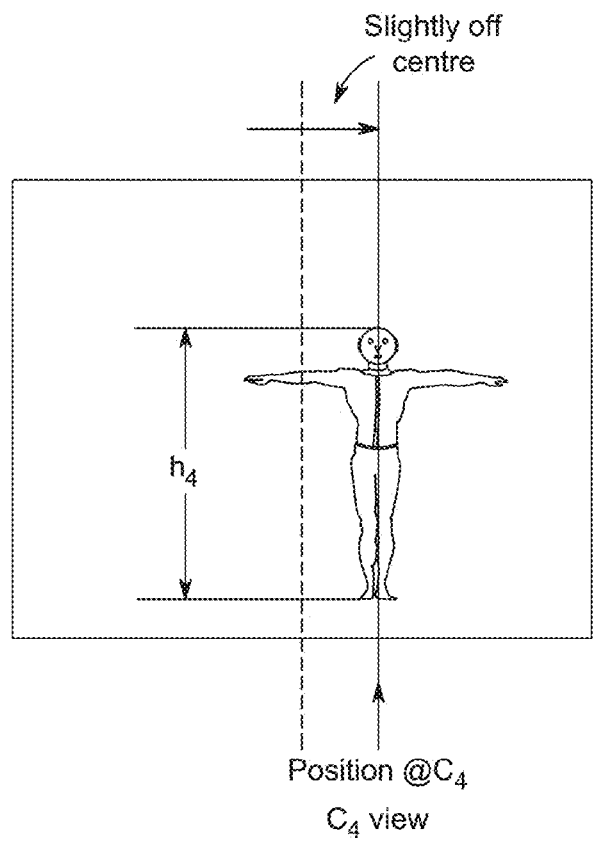
FIG. 27C shows an embodiment of a two-dimensional perspective view of an exemplary image of an object captured by a fourth camera in an array of cameras included in a telepresence system, such as that of FIG. 27A, to facilitate self-calibration of the telepresence system based on the image indicating an observed height of the object at an observed position.
Figure 27D:
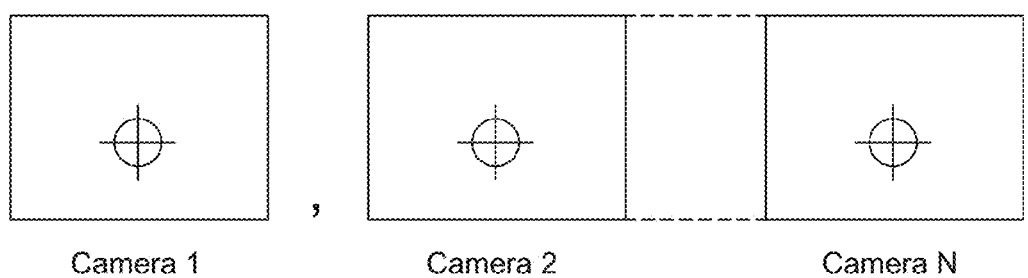
FIG. 27D illustrates an embodiment of two-dimensional perspective views of exemplary images of a fiducial marker captured by multiple cameras in an array of cameras included in a telepresence system, such as that of FIG. 27A, to facilitate self-calibration of the telepresence system based on various observed magnitudes of one or more dimensions of the fiducial marker and various observed positions of the fiducial marker as captured by the multiple cameras.
Figure 27E:
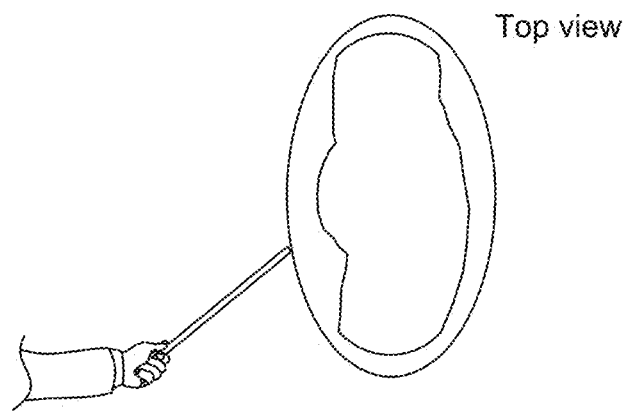
FIG. 27E shows an embodiment of a two-dimensional top view of an exemplary fiducial wand used to probe a perimeter of a collective FOV formed by an array of cameras included in a telepresence system, such as that of FIG. 27A, to facilitate calibration of the telepresence system.
Figure 27F:
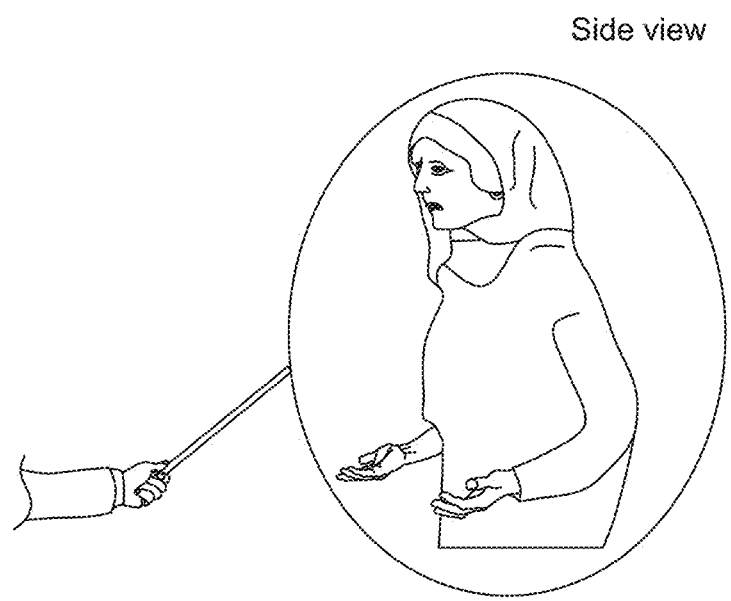
FIG. 27F illustrates an embodiment of a two-dimensional side-view of an exemplary fiducial wand, such as that of FIG. 27E, used to probe a perimeter of a collective FOV formed by an array of cameras included in a telepresence system, such as that of FIG. 27A, to facilitate calibration of the telepresence system.

FIG. 27E (top view) and FIG. 27F (perspective view) show how during setup a "magic wand" is used to probe the invisible perimeter of the "center stage" holographic area.

In one or more embodiments, the image capture devices have scan patterns and cameras that are synchronized (orchestrated) as a system to capture all laser beams reflecting on the person or object in the system's "center stage." Each capture device is configured to output a stream of voxel-pixel pairs that is carefully annotated with time-stamps at individual pixel times that are accurate to 10 or so nanoseconds (e.g. might be referencing a 100 MHz or 1 GHz system master clock).

Figure 24A:
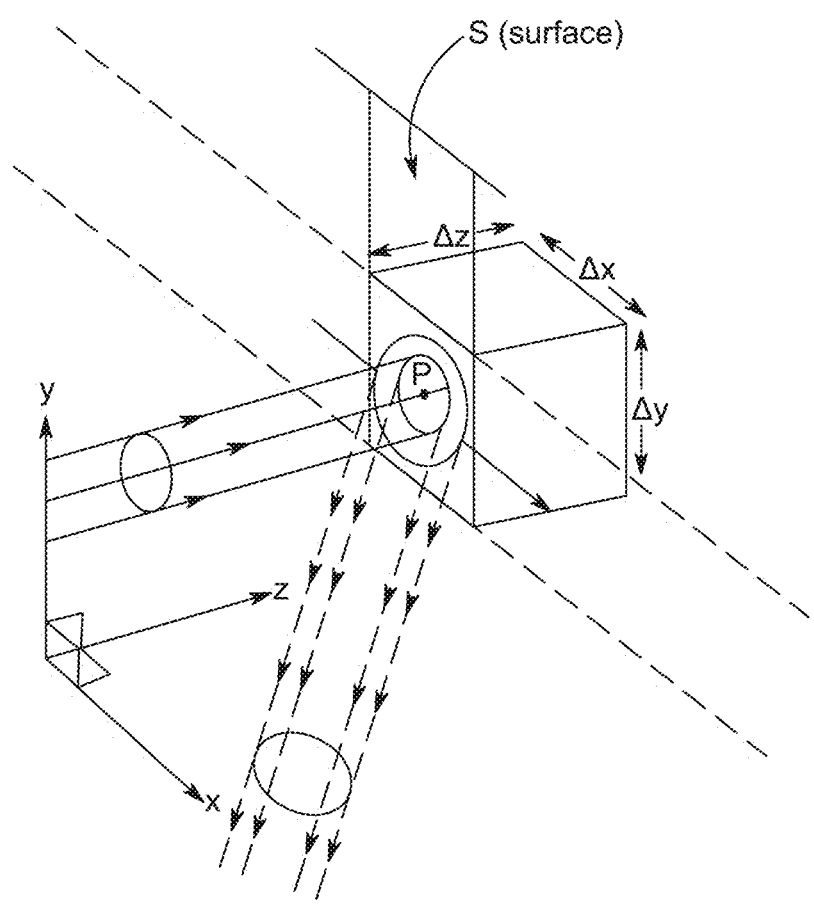
FIG. 24A illustrates an embodiment of a three-dimensional logical ray diagram for an exemplary light beam emitted toward a point P in a surface S and captured from the surface S by one or more cameras that each output a stream of voxel-pixel pairs, each of the voxel-pixel pairs being associated with a time-stamp that corresponds to an individual pixel time to facilitate anchoring each voxel in space with an accuracy based on accuracy of the corresponding pixel time.
Figure 24B:
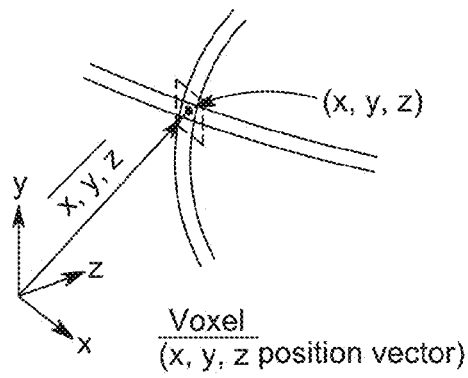
FIG. 24B shows an embodiment of a three-dimensional logical perspective view of an exemplary vector that indicates a location of a voxel as determined based on light captured from a point on a surface by one or more cameras, such as the one or more cameras of FIG. 24A.

Because each of the millions of captured voxels is anchored to within 1 mm in space, the partial 3D perspectives they capture of the surface of the scanned person (or object) are precisely registered in time and space, and therefore they can be seamlessly stitched together. Therefore, any view can be derived later, downstream, remotely, from this synthesized voxel surface description to an entirely new perspective regardless of the motion and structure of the moving surface. See FIGS. 24A-24C. As a result, a "holographic video" can be viewed from any perspective, at any distance and at any time by multiple viewers, in stereo, and in sufficient detail that can include motion perspective changes and naturalistic looking arm, leg, hand shadows, occlusions, and motion parallax effects. Like the Princess, the user will appear "live" in a room: moving, talking, and interacting.

Figure 26:
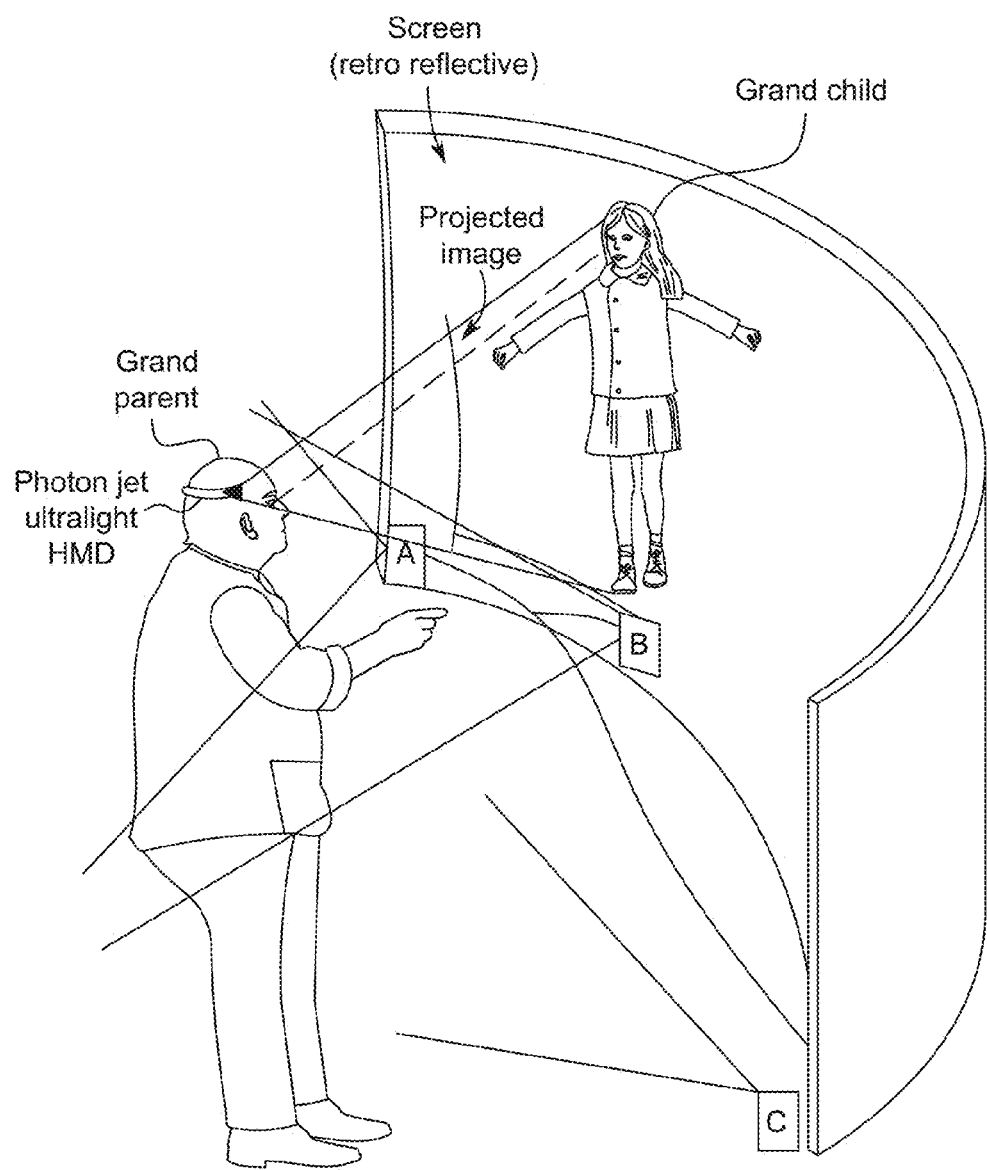
FIG. 26 illustrates an embodiment of a three-dimensional perspective view of an exemplary telepresence system that includes a head-mounted display, a mirrored surface, and three ground-level cameras.
Figure 30:
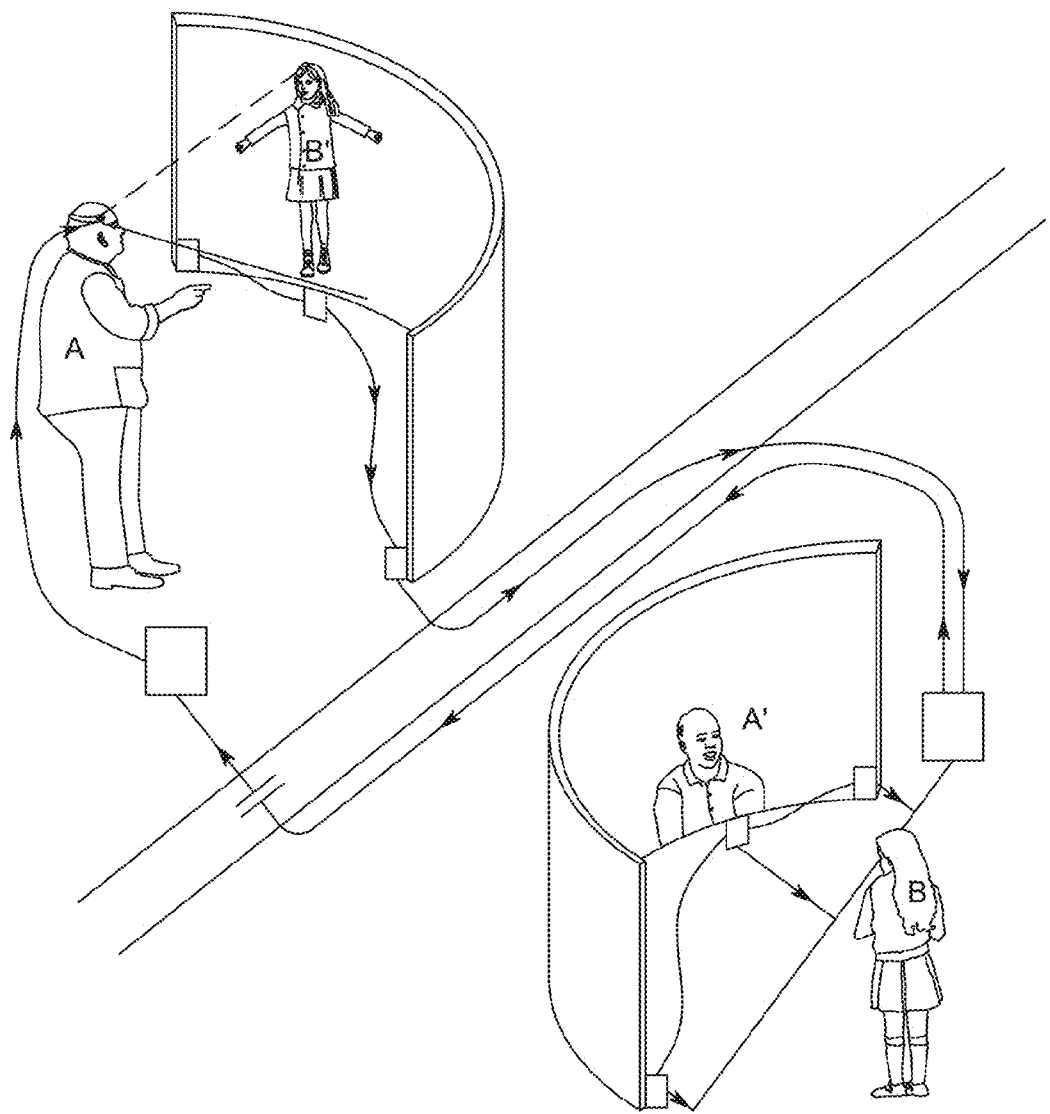
FIG. 30 shows an embodiment of an embodiment of a three-dimensional logical perspective view of exemplary telepresence systems that communicably couple to each other via a peer-to-peer connection.

In FIG. 26, an image is shown of a grandparent interacting with holographic renditions of his grandchild. Wearing head mounted projection display systems such as PhotonJet Ultra-Light™ non-occluding headsets, two or more people can gather "holographically" in each other's spaces or in a joint virtual meeting place, and interact naturally without having to become studio technicians, nor requiring any special training. The system projects a holographic image onto a retro-reflective screen for a three-dimensional capture system at location A, B and C. In FIG. 30, the grandfather transmits synthesized three-dimensional data directly to party B (granddaughter) where her projector display is a motion and perspective adjusted three-dimensional holographic version of grandfather on her screen. Visa-versa her image is transmitted by her system and grandfather sees her holographic image.

Figure 24C:
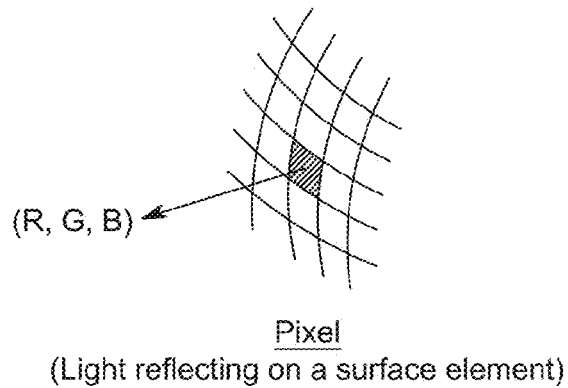
FIG. 24C illustrates an embodiment of a three-dimensional logical perspective view of an exemplary vector that indicates a value of a pixel that represents a color of a voxel as determined based on light captured from a point on a surface by one or more cameras, such as the one or more cameras of FIG. 24A.

As described here, the system can capture each and every voxel on the surface of a person, viewed at 3 mm distance in high definition, with great fidelity. Every 10 milliseconds (100 times per second) it will capture every square mm on a person's surface as a three-dimensionally anchored pixel. The locations of three-dimensional anchored surface elements are referred to as "voxels". The light intensity recorded after reflecting off this surface element is the three-dimensional equivalent of what is conventionally referred to as a "pixel". For clarity, to make the distinction between the location vectors (Voxels) and the light intensity values (Pixels) explicit, we will refer to the combination as a Voxel-Pixel Pair (VPP). Pixels are typically associated only with contrast, e.g. between two adjacent pixels, whereas voxels only define the 3D surface location in space regardless of the light reflected or emitted (or transmitted) from that location. For example, two adjacent points scanned on a surface might have no pixel contrast, but may still have a 3D surface structure, e.g. a diffusely, neutrally painted and diffusely illuminated, shaped stucco wall at corners or edges. See also FIG. 24A which shows how a point P on a surface S can be localized to three-dimensional coordinates (X, Y, Z) with accuracy (Δx, Δy, Δz). Once the location of the surface element is known (FIG. 24B), reflections of primary color illumination (R, G & B) can be observed as traditional pixels values. (FIG. 24C).

An advantage of three-dimensional scanning and other active illuminated systems is that they can detect objects having the same color as their background, e.g. snowballs in a light fog against a snow cover background. In contrast, passive stereo camera arrays do not work well in low contrast situations such as the snow ball in this example, because without pixel contrast, there are no fiducials, no stereo pairs that can be matched, leaving the white snow ball invisible, undetectable against the white background. It is noteworthy that one or more embodiments of the inventive holographic capture system does not require contrast to work, and avoids the computational burdens inherent to passive stereo and other frame sequential systems.

To track a surface as a point cloud, the proposed holographic capture system just requires one or more clear lines of sight between any surface point and one of the three-dimensional capture devices. No pixel or voxel fiducials are required, even a smooth and featureless baby face shape can be accurately tracked as a point cloud. In one or more embodiments, the system may capture and render a viewable surface of at least 4 million such "Voxel-Pixel Pairs" (VPPs) in ten milliseconds or less. To render the VPPs, say at 100 "3D motion frames" ("3DMF") per second requires capturing 400 million such VPPs per second. This capturing task is distributed over 4 or more image capture devices. So, allowing for 20% overlap, each image capture device may see a load less than 120 million VPPs per second, the data acquisition and processing load can be realized with low cost components found in today's mobile phones. (HD video at 60 fps is 120 million pixels per second).

In one or more of the various embodiments, each of the image capture devices captures only a partial surround view of the user. To make one viewable hologram of the perspective views of the shape of the user, the views are stitched together seamlessly by matching three-dimensional coordinate points of overlapping edges. The higher the accuracy of the acquisition, the easier is it for the system to puzzle out how to fit the overlapping pieces together properly in a three-dimensional space. Since the user can often be in motion, dancing, arms flailing etc., microsecond precise timestamps associated with each captured VPP ensures that the motion of the surface is smooth, and that there are no artifacts at the stitched seams: no tearing, rips, folds or wrinkles, no three-dimensional judder.

In one or more of the various embodiments, the image capture devices have the ability to assess the quality of individual VPPs and pass this information along, e.g. as a time space confidence bracket metric. Overlap can be generous in matching each camera's perspective view points. In one or more embodiments, the moving surfaces are matched and stitched together in real-time to fit their forms and exact positions, proceeding point-by-point, and line-by-line. Each VPP may include an exact time stamp that can be matched up with other VPPs in time and in three-dimensional space. Matching requires some understanding of surface motion, and surface continuity which is gained during a scan by one or more scanner light projectors. Using velocity vectors and three-dimensional trajectory prediction, optionally by using a Kalman filtering-like technique, a cycle of predictions followed by measurement, and then measuring prediction error, creates a confidence metric for the quality of the matched points.

In some circumstances, some parts of a user's body may be missed by the system, e.g. because it is temporarily occluded by hair or an arm or a piece of wardrobe, or in case the user's desired perspective is poorly aligned with any one of the image capture devices. When this occurs, the system might create patches by interpolation between adjacent freshly captured (true) VPPs, and the closest, most recent observation of the missing surface, e.g., when the system deems it is missing "instantaneous surface data"—define time bracket for instantaneous—this gap is filled in by using older data to predict the current state and stitching it in to fit the shape to match pixel patterns, three dimensional surface shape, and contour detail (i.e. "surface motion, and shape fitting patching").

Patching missed observations also works for temporary occlusions (i.e. "occlusion patching"). The system might actually fold or bend certain surfaces to match using some kind of physics rules, derived from observation. e.g. textiles may fold a certain way in previous seconds. The system would match the folds and resulting patterns in the occluded areas, and then render this to the right perspective view for the user. FIGS. 28A-28C show stitching three-dimensional perspective drawing of matching "egg shells," (FIG. 28A) two surface tiles I (perspective A) and II (perspective B) stitched seamlessly into one contiguous (closed/whole) 3D object surface (FIG. 28B). The stitching is done by finding surface n points with the same 4 values, n matching voxels $(x_i, y_i, z_i, t_i)$ where i is between 1 and n. In FIG. 28C the two voxels surface points $(x_1, y_1, z_1, t_1)$ and $(x_2, y_2, z_2, t_2)$ overlap exactly in place and time. Therefore, they are a perfect 3d motion "fit" and can be stitched seamlessly. There may be many such points in each overlap. (n is large % of the overlapping voxels). The three-dimensional surface stitching procedure includes: (1) find and match voxel markers, and find and match pixel—image contrast—markers that occur in both views; and (2) adjust two-dimensional surface (elastically) to match the two pieces in three-dimensional space so that all surface markers (pixels) overlap.

In one or more embodiments, during stitching and patching (See FIGS. 28A-28C) both voxel correspondences (three-dimensional surface structures, e.g. ridges, edges, corners), and pixel correspondences (contrast, stripes) may be used as fiducials. Laser signals themselves may create unambiguous (in nanosecond time) correspondences. A laser spot created by neighboring image capture device's laser can be recognized as out-of-synch, e.g. in a non-epipolar detection cycle, alternating between the synchronized epipolar detection of each detection system's (three-dimensional camera, scanning sensor system) own laser annotation. For example, during an image capture device's regular epipolar scan, the device's camera might expose and read only the row or column of the sensor (using rolling shutter camera) that falls within the plane that the laser beam is currently scanning in. But in an alternative non-epipolar detection cycle the same sensor might expose and read many other columns or rows in parallel, and be able to detect scanning spots on the surface generated by neighboring image capture devices. Further, using the same non-epipolar read cycle, the device may also capture ambient light not generated by the system.

Figure 29:
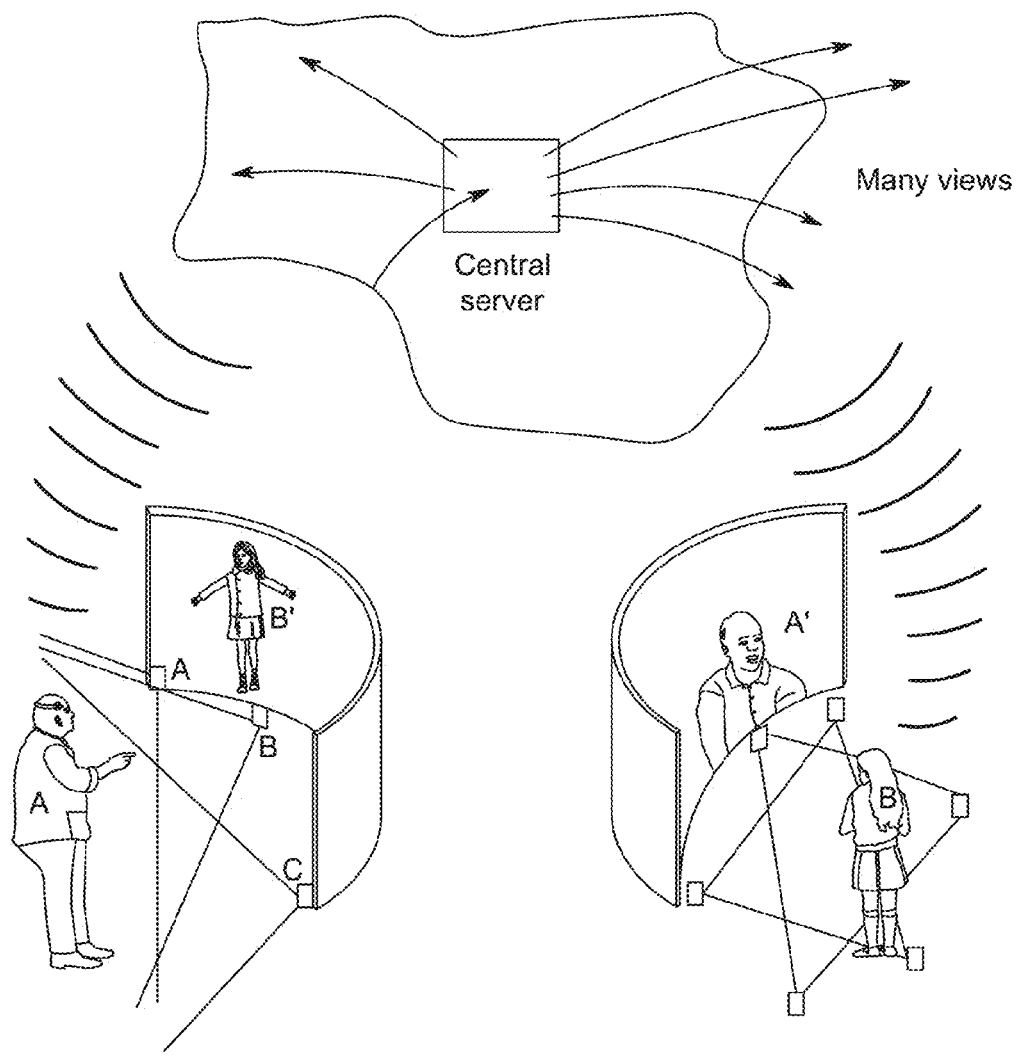
FIG. 29 illustrates an embodiment of a three-dimensional logical perspective view of exemplary telepresence systems that communicably couple to each other via one or more servers.

In a cloud server based system (see FIG. 29), one whole image buffered in the cloud can serve many viewers simultaneously. The three-dimensional motion data "image" is "buffered" in the sense that each new data point, each newly uploaded voxel-pixel pair has a unique time stamp denoting "capture data freshness" so motion and perspective can be made consistent with some sense of local time, perhaps a short computational delay, e.g. a few milliseconds, to ensure that all of the required viewable VPPs are present.

It is noteworthy that for certain perspectives e.g., in a multi-viewer situation, occlusions and parallax requirements differ for each view position. Missing surface perspective, e.g. temporary occlusion of a part of the torso by an arm, can be checked for and "patched" from prior data received, or alternatively the local viewing system may request a priority data request for the missing VPPs. In one or more embodiments, a central host or server computer may direct the scanning system, much like a studio director decides on which view angle is ready to go but on standby. In this case, live would be the highest data processing and transmission priority. Also, the user's system determines which VPP acquisition is prioritized on the other end of the another user's system; so the highest priority and Quality of Service (QoS) between different locations may be reserved for these studio director camera control signals.

In one or more embodiments, one-way communication would be, e.g. a global audience watching a life performance. Cloud servers could scale up and enable local copies so large numbers of users could be served without adding significant latency or creating any real computational bottlenecks. In one or more embodiments, may enable real-time two-way communications which would require tighter latency controls and might involve localized QoS style prioritization. When two groups are already meeting online in a virtual telepresence mode, to then establish a one to one paired conversation between two users would benefit a minimization of the latency between the two users in a conversation, e.g. when an individual at location A initiates a conversation with another individual at location B, then these two individuals would get prioritized data and views of each other, such as an enhanced facial zoom-in capability, facial motion detail, and ensure an exact audio synchronization with facial motions would be prioritized above all. Talkers would see (with highest priority) the facial expressions of listeners they are talking to (addressing). Listeners would see perfectly synchronized lips, and facial expressions of those towards whom their gaze is directed, i.e. whom they are paying attention to.

In one or more embodiments, Peer-to-Peer distribution for one to one meetings, e.g. would still prioritize transporting first the viewable surfaces, and fill in the non-viewable. This would enable a third user to come in to the conversation at any time. It would also enable freeze framing, going back and changing perspective ex-post, by the user. This would be useful if the holographic system was used to capture Action sports, or a rock concert music venue. Further close-ups, would be supported, allowing a user to take a better look, zooming in at will. To support such zooming in more detail, higher resolution of VPPs would be available and forward buffered, that is need be pre-emptively transported, towards the user's location, if system bandwidth allows it. When the system is congested bandwidth becomes a problem, and there might be a slower zooming-in resolution fill in delays. Zooming reduces the FoV, so the total number of viewed voxels would stay approximately the same, but zooming in would require more resolution in a smaller view volume.

During a two-way holographic video communication using a three-dimensional head laser projection and display headset, a retro-reflective surface may be required for each user while being captured, to simultaneously perceive the other user that is remotely located. A surround, or large concave screen or other curved surface might occlude too much of the natural background setting. The occluded background can be added back in with a full three-dimensional scanned image of that background captured during a pre-installation scan of the room, or natural environment. A natural environment may be employed to provide a natural setting, e.g. room walls and any furniture would be separately captured and rendered back in. Optionally a studio generated set, or fantasy background, user or third party generated, optionally modified by the user, could be rendered in. These props, sets, backgrounds could be carefully selected, e.g. grandchildren might have some kind of fairy tale set they can choose, decorate, alter themselves with virtual paint, and objects may be placed, or whole three-dimensional animated special effects might be added to the set (a three-dimensional tele-presence stage). Vistas could be large, sunsets, oceans etc., in a manner somewhat similar to a holodeck as shown in various movies and TV shows. For example, grandkids could capture the REAL backgrounds before they change to ensure a "tidy room look".

In one or more embodiments, the three-dimensional capture system can capture an immersive three-dimensional live scene. Use case examples include: holographic games and experiences. Set in an Abbey and Castle, and live action in them, a Murder Mystery Game, where viewers can walk through the Castle which could have 50 or more bedrooms. And look for clues amid the "live action" three-dimensional scenes around them. Similarly, the users can visit other great Castles, River cruises, the pyramids etc. and experience scenes set in times of the past, the present or the future.

In one or more embodiments, light is projected on to any voxel point (x,y,z) that is reflected by the surface and is used to establish the exact voxel surface location. Knowledge of the position of adjacent points on the surface, subjecting these proximity surface points to reasonable physical constraints due to the need for three-dimensional continuity, elasticity and pliability of the surface (e.g. skin or clothing) make it possible to refine ("hyper resolve") the accuracy of each observation using the process that follows. First, make initial estimates of the surface three-dimensional shape. Second, identify which part, object surface or skin location, it belongs to, surface fit based on surface fiducials both shapes and ridges for voxel defined micro-structures, and coloring, surface image patterns of pixel contrast. Third, use adjacency and known kinetics to correlate with other observations, refine estimation of location coordinates based on this, and then fourth more accurately predict three-dimensional motion flow of the voxel, such as from its observed recent trajectory and then predict its future trajectory.

The process as outlined above would be able to render more accurate predictions for individual surface elements (VPPs), motion of the whole is more predictable by taking the whole into account, then observing individual surface points on their own, individually without a physical model. For example, scanning a muscular arm covered with tattoos being flexed, trying to predict, or interpolate individual surface points positions. Treating this mathematically as a structureless VPP point cloud, is not as accurate as teasing out the underlying ground truths of how a skin stretches over a flexing muscle below. Either careful physics and anatomy, or by brut observational modeling, the flexing and unflexing observed over several seconds will greatly inform the boundaries of any surface motion prediction. (skin only stretches so far, muscles only bulge that much).

A light field is a vector function that describes the amount of light flowing in every direction through every point in space. For a five-dimensional hologram, the direction of each ray can be given by five-dimensional plenoptic function and the magnitude of each ray can be given by the radiance. At any one time, a spot on the surface may be observable by several image capture devices. Therefor any such one surface voxel element can be illuminated from more than one angle, and successive such illuminations can be viewed simultaneously from different perspectives.

Figure 32A:
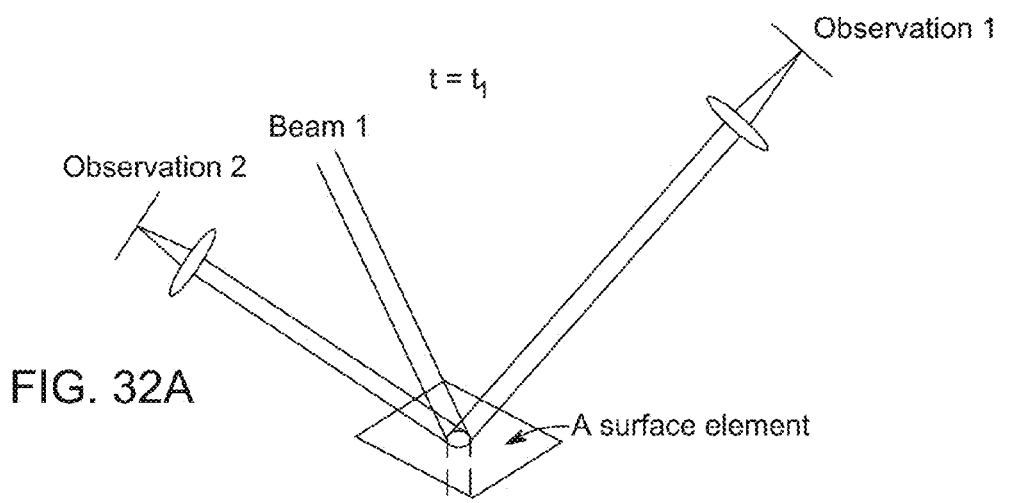
FIG. 32A illustrates an embodiment of a three-dimensional logical ray diagram for two three-dimensional image capture devices that capture four different angular reflections from a surface element illuminated by a beam emitted from a given position to provide an angular reflection function for a voxel-pixel pair associated with the surface element.
Figure 32B:
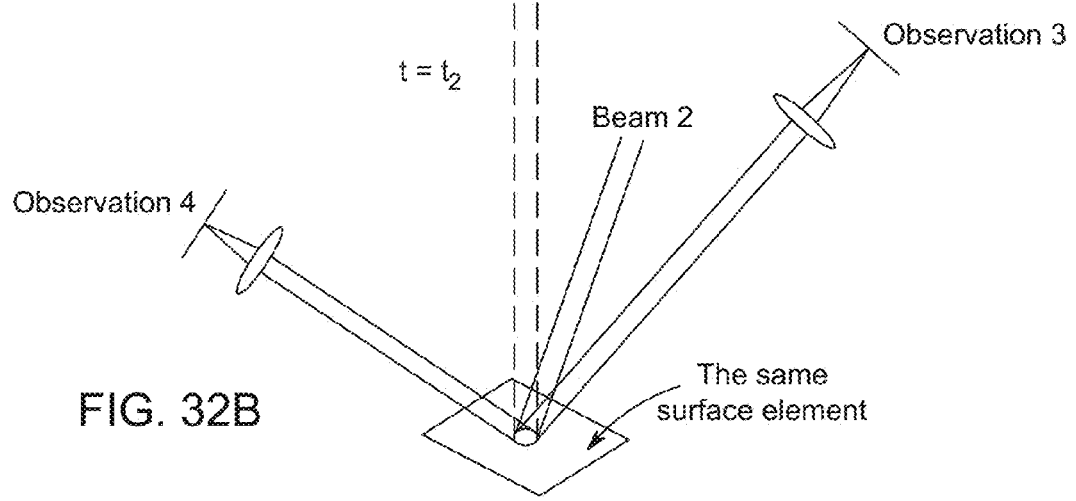
FIG. 32B shows an embodiment of a three-dimensional logical ray diagram for two three-dimensional image capture devices, such as those of FIG. 32A, that capture four different angular reflections from the surface element of FIG. 32A illuminated by a different beam emitted from another position to provide the angular reflection function for the voxel-pixel pair associated with the surface element.

In FIGS. 32A and 32B, one such spot is shown on a surface where at $t=t_1$, beam 1 illuminates the spot and some of the reflected light is recorded from two different perspectives, observation 1 and observation 2. at a later time $t=t_2$ the same spot is illuminated by a second laser beam, beam 2, and two new observations are made. Two beams and two perspectives yields four different observations on how light of certain wavelengths reflects off that particular spot on a subject's or an object's surface. It is noteworthy that in this fashion M×N different reflections on the same surface element can be captured, or VPP (N view points, capturing of the reflections of M illumination beams each coming from another device yields a total of N×M perceptions). Therefore a certain amount of the surface response two-dimensional color contrast function (five-dimensional light field function, or angular color absorption-reflectivity function) for that voxel-pixel pair is being captured with each successive scan traversal.

Figure 32C:
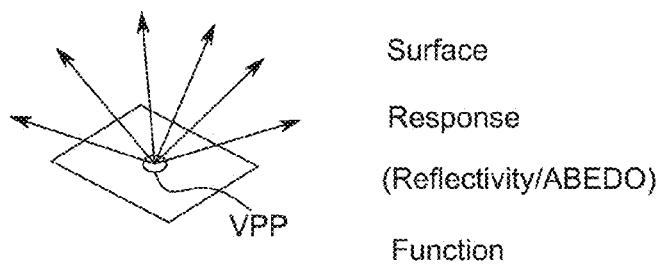
FIG. 32C illustrates an embodiment of a three-dimensional logical ray diagram for an exemplary color and angular response function for a surface element, such as that of FIG. 32A, that represents an expected reflection from the surface element for each angle of illumination by each color of interest.

Also, as noted earlier, ambient light (i.e. ambient natural light not produced by the system's own scan sources or additional illumination (line scanned or flood/strobed illumination) can be captured e.g. during a non-epipolar capture cycle. The physics of our surfaces (skin and clothing) are physically constrained, and so its possible shape and deformation in time and space), and the color, and appearance of clothing or skin are predictable, after being observed over a certain interval of time of three-dimensional surface area. Also, with each additional observation of a certain voxel (e.g. skin point), when it can be compared to every other observation of the same location, the process can build up a "surface normal color angular response function", informing how incoming light for certain wavelengths—the scan primaries—reflects at certain angles with that point (oily or dry skin, matt or glossy textile, leather etc.). In FIG. 32C, two three-dimensional image capture devices illuminate and observe the same surface element, and observe 4 different angular reflections. In some cases, a multiplication of N such illuminations and M perspectives, N×M, over time can yield a fairly complete angular reflection function (Surface Response Function) for every such VPP.

For mixed reality lighting, the receivers' "hex circle" cameras at the display location can detect natural light. The detected natural light fields (e.g. sunlight coming in from a window, or a luminaire overhead can inform an Augmented Reality style special effects lighting, adding virtual light effects such as rays and shadows, adding realism to a holographic image being projected in front of the users' eyes. It helps contextualize the holographic presence, making it appear more real and less ghostly. Computing and rendering these "virtual lighting effects" is realized with known computational three dimensional graphics rendering routines (ray tracing e.g.). For example, a flashlight or light sabre might "illuminate" the surface of the holographically projected person, adding natural looking "shadows" across a face. (Putting on extra brightness where shadows are not, compensating for light, "amplified shadows" by adding extra illumination, adding contrast and/or enhancing existing contrast). Also, when the natural light of the "receiver" location can be captured, then this can be used to add realism to the holographic image, such as make the shadows on a grandchild correspond to the lighting in a grandparents' room, in order to "place" the hologram more concretely in the space.

Additionally, a holographic projecting headset might also function as a pointer for installation, provide annotation on system components during system set-up, and may in fact also serve as a super smart night light to walk around safely in a dark environment.

The system provides for automatic set up and instant self-calibration, with simple automatically generated instructions such as an arrow pointing at or towards a more optimal position on one of the image capture devices. For example, six identical image capture devices come out of the box. A child should be able to place them right on the table or floor. They may have an internal leveling ability (building in a g sensor is cheap, so out of the box all sensors can be guaranteed to be vertically aligned, or at least have an accurate self calibrating horizontal skew detection). Additionally, the image capture devices can see each other, and therefore can help auto calibrate each other. For example, when two cameras see a third camera (with a fiducial marker, passive and active, simple e.g. blinking LED light during set up and auto calibration.) In one or more embodiments, the system optionally may use beaconing with active lasers. Also, each image capture device's elevation with respect to each other can be then established during auto-calibration.

In one or more embodiments, the set up may just decide the distance of each image capture device with respect to the other image capture devices, if there are, for example, six identical image captured devices having sensors (aka "cameras") in a "hex" system. In this configuration, it may be assumed that each of the sensors can see at least three of the other sensors (see FIG. 25B), then the relative azimuthal angle these "opponent" three cameras is observed by each of the six cameras. Also, if the height of the cameras is known ex-ante, a spire with tip, perhaps in the form of a microphone protrusion or special fiducial on top, then both the distances between the observing camera and each of the three observed cameras and the angular disparity between any two of the three other observed cameras will be known. Therefore—by simple geometry—with two sides (distances) and one angle (angular disparity) known, a triangle is fully defined, uniquely in shape and size. Thus, all of the geometry of the hex arrangement can be nearly instantly discovered during this automatic calibration by just taking one snapshot for each camera, six snapshots in total. (for an example a seven step automatic set-up and calibration procedure see FIGS. 25B-25G).

In one or more embodiments, multiple laser beams can be employed to "peel" the pixels off a three-dimensional surface. In a Hex system, six lasers scan rapidly in a vertical direction. In each three-dimensional acquisition system, one binary asynchronous camera records the laser spot from an extension above (below) enabling an instantaneous triangulation that yields the three-dimensional coordinates of the voxel. A second, more conventional camera records the RGB intensities of light directed at the surface location.

In this way, the first camera just records the vertical disparity of the scan spot location when viewed from an offset distance, enabling scanned stereo triangulation, yielding a new three-dimensional surface location (a new voxel)

every 1 to 10 nanoseconds. Also, the second camera can be a simple low cost rolling shutter camera found in most mobile phones. In volume manufacturing each camera can be purchased at about $1 each, and the scanner may be $10. Thus, a total cost of an image capture module could be less than $25. For a hex system, the hardware cost may as low as $200. (6×$25 plus $50 for central system logic and connections, connecting to e.g. a smart phone.). Six beams, each scanning across 60 degrees (see FIGS. 22A-22C), surround the person or object that is being scanned. The beams are coordinated with the cameras' rolling shutter so at all times their laser spot illumination is synchronous with the camera operation and beams do not "blind" (interfere with) opposing cameras. For example, if the voxel probe beam of a an image capture module is not detecting a reflection on the surface (i.e. no signal exceeding threshold is detected by the asynchronous binary camera), then pixel values are recorded by the RGB camera.

A three-dimensional cropping function may be provided by a first asynchronous camera that serves as a precursor, enabling pre-selection of a second image capture device that crops the image. This three-dimensional voxel informed cropping function may vastly reduce the recorded image data flow, the stream of RGB pixels, to just the pixels that belong to—can be matched with—the actual foreground voxels belonging to an object in view. In this manner, any background images are automatically removed, creating an automatic blue screen function. This significantly reduces the data output stream, and obviates the need for compression, and ensures lowest possible system latency.

The system may be packaged as an apple, or other fruit (pear, orange, plum or cherry). Each of the image capture modules fit as "slices" of the selected fruit. The center core of the apple ("apple core") could function as a central server that collects signals from the slices, and serves as the central command unit that orchestrates the scanning and stitching of the signals into one cohesive VPP stream. The camera and lasers scan outward when the apple is assembled.

Figure 31A:
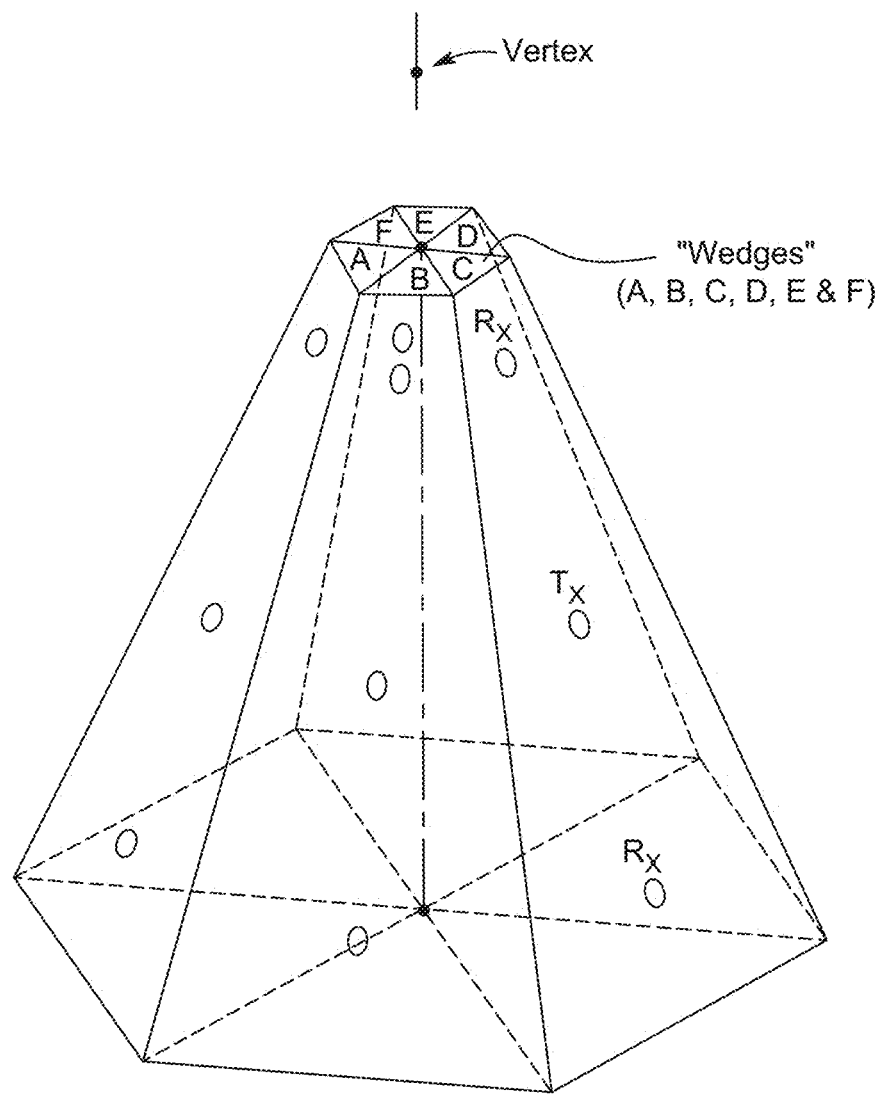
FIG. 31A illustrates an embodiment of a three-dimensional logical perspective view of exemplary wedges that each have one or more cameras and one or more projectors, that are arranged in a hexagonal pyramid configuration with the cameras facing outward from the hexagonal pyramid, and that can be rearranged to define a hexagonal space between the wedges while the cameras face inward toward the center of the hexagonal space.
Figure 31B:
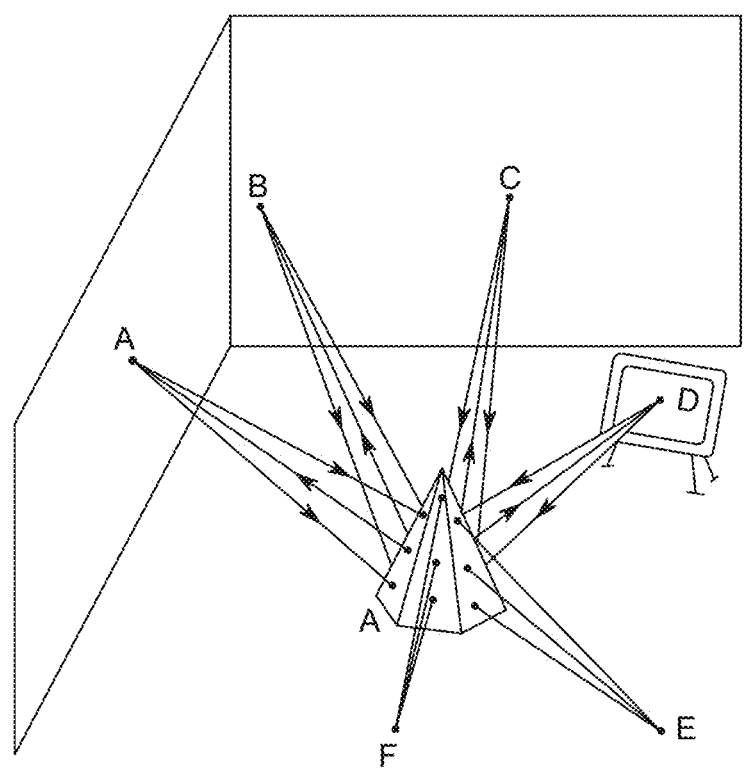
FIG. 31B shows an embodiment of a three-dimensional logical ray diagram for exemplary wedges, such as those of FIG. 31A, positioned in a room, where the exemplary wedges each have one or more cameras and are arranged in a hexagonal pyramid configuration with the cameras facing outward from the hexagonal pyramid to facilitate detecting ambient light fields, detecting one or more objects in the room, or providing a fiducial marker.

FIGS. 31A and 31B show a hexagonal based pyramid configured system. Each of the six "slices" can be placed in a "hex circle" around the person to be holographically recorded and transmitted. Alternatively, when assembled into the pyramid, as shown, in the center of a room system will record 360 degree surroundings in detailed 3D images with one or more cameras that provide a centrally positioned perspective divided in 6 overlapping 3D perspectives. FIG. 31B shows 6 beams emanating from one or more projectors in the pyramid, simultaneously scanning surfaces and objects in a room. Also, the central core or spine might have a fiducial e.g. at the vertex (as indicated) so that the base unit can be used as a fiducial common reference. (See also description of FIGS. 27A-27F).

In human interactions, the importance of being able to correctly read the emotions communicated by facial expressions facial color is undisputed. In a grandparent-grandchild communication system it would be critical to correctly capture laughs, smiles, frowns, and pouts and many more subtle emotions. Having a good three-dimensional facial motion detection and having a way to instantly detect and transmit these facial emotional signals is important for an "insanely great" communication. Young children are extremely reliant on signaling their inner emotional states to their care givers. Mothers are particularly well tuned to detect their baby's facial expressions. One important element in the human empathic perception system is facial coloring, and more particularly local facial color dynamics (e.g. blushing).

Television standards, color cameras and digital sensors were designed for reproducing great looking pictures. Broad spectral sources and three band (RGB) filtering and much white balancing in the signal chain has achieved miracles of imaging found in today's smart phones and SLRs, LCDs and OLED displays. However, filters in the photonic input and output chain are the primary cause of inefficiency as they remove the out-of-band photons. The narrower the bandpass the greater the losses. Although four color systems (R, G, Y & B) have been introduced, the losses in efficiency and increased cost of computation and transmission keep them from becoming a standard.

Capturing, transmitting and reproducing human perceptual signals for empathy was not deemed critical up until now. In fact, ever since the Renaissance the educated elite has been increasingly conditioned to believe in the superiority of communication by letters, printed text, and more recently, by ever shorter emails and 140 character text. Video conferencing as a communication tool to date remains burdened with a host of emotional and human factor shortcomings, such as latency, frame compression delays causing speakers to interrupt each other, or false gaze alignment in video due to incorrect camera angles. Young children perhaps most astute and un-blinded by technology instantly understand that the mommy on Skype is nothing like the real mommy. In today's bulk traffic of modern communication, a great deal of empathetic communication has gotten lost in transmission.

One problem in detecting blushes by another person is that this human perceptual ability depends on reproducing a critical 30 nm M-L cone differential signal. FIG. 34 shows that during facial blushing red blood cells engorge with oxygenated hemoglobin, and a "W" shape in the reflective spectral is accentuated by lowering the skin reflectivity at the M cone perceptual peak of 535 nm and increasing the relative reflectivity at the L (long, red) cones which peak at 562 nm. The differential signal (as indicated in FIG. 34) more than doubles (GREEN curve as indicated is low oxygenation; RED spectral response curve shows high oxygenation). Thus, the M-L cone differential perception in human color vision is particularly sensitive to, and/or optimized for, detecting this relative change, rather than the absolute levels varying by tan, skin tone, or blood concentration levels. Note that as FIGS. 33 AND 34 indicate, these key perceptual clues operate across all states of blushing for various skin tones. Of course, facial make-up can conceal blushes.

Figure 33:
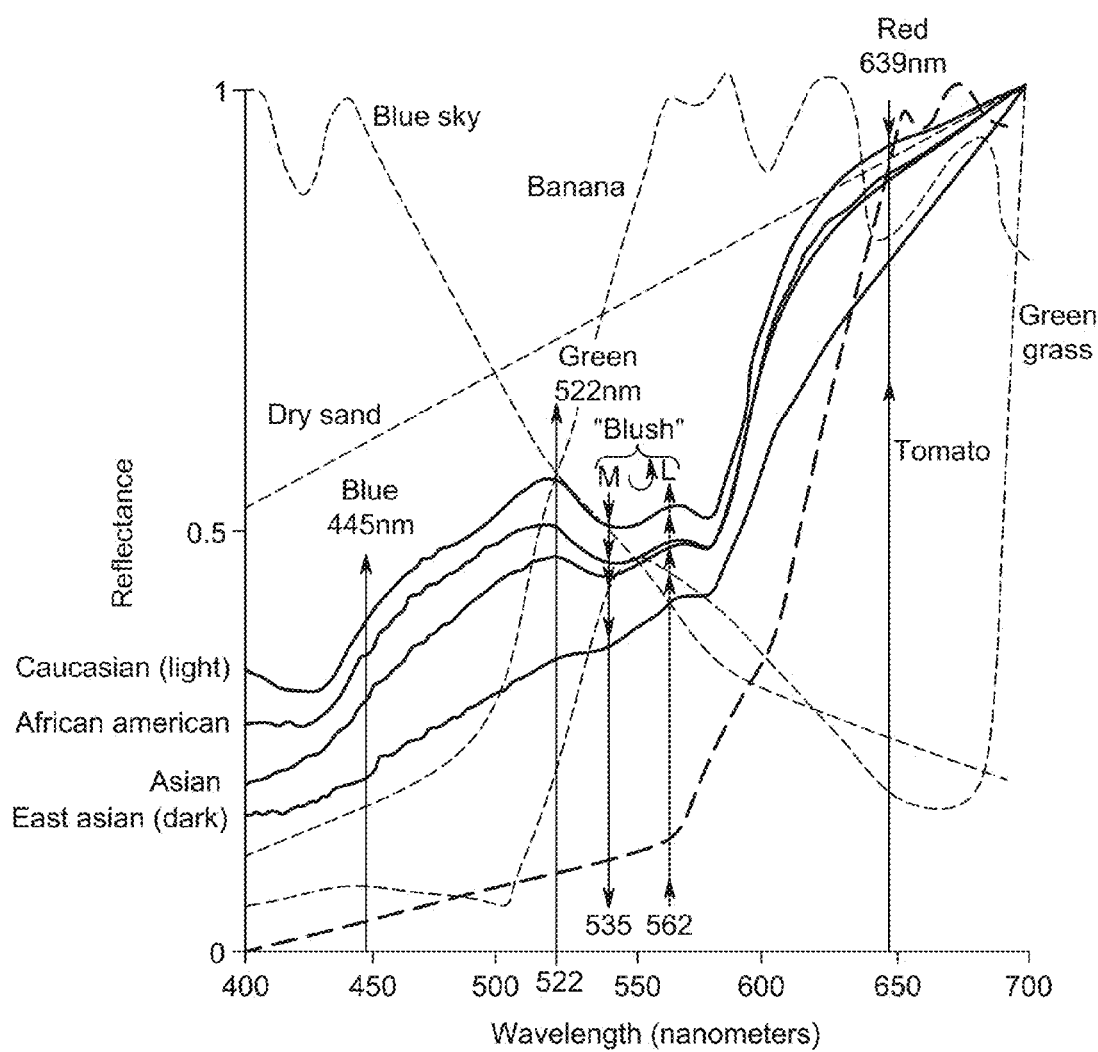
FIG. 33 shows an embodiment of a logical diagram of an exemplary graph that indicates that each of a variety of human skin tones have different reflectance values for light of wavelengths that correspond to long-wavelength human-eye cones (L cones) than for light of wavelengths that correspond to medium-wavelength human-eye cones (M cones), thereby facilitating a human to perceive a difference between amounts of light reflected by human skin at wavelengths that correspond to L cones and M cones for a variety of human skin tones.
Figure 34:
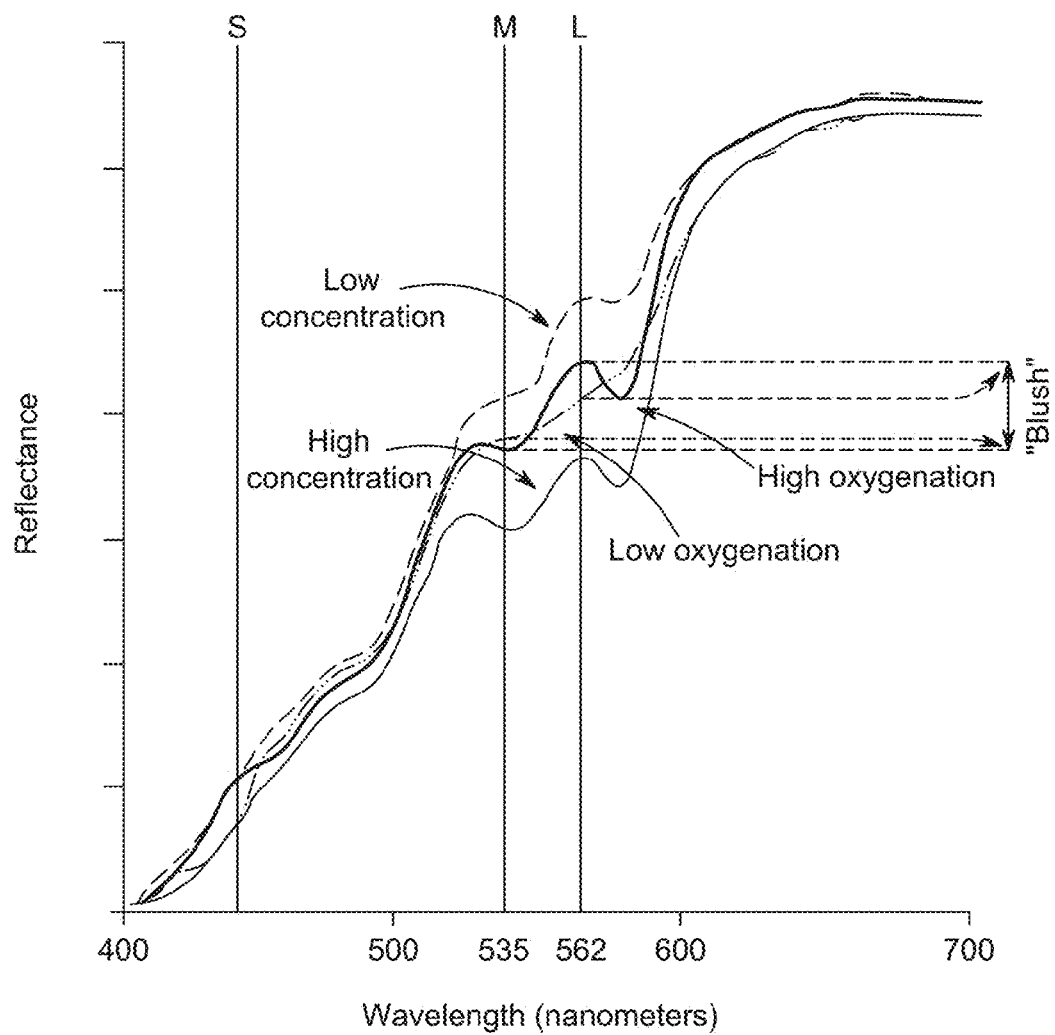
FIG. 34 illustrates an embodiment of a logical diagram of an exemplary graph that indicates that human skin exhibits a greater difference in reflectance values for light of wavelengths that correspond to L cones and M cones when red blood cells are highly oxygenated during blushing than when the red blood cells are less oxygenated during an absence of blushing, thereby facilitating a human to perceive another human's blushing based on a differential between a signal value for the human's L cones and a signal value for the human's M cones.

FIG. 33 shows reflectance spectra from a variety of human skin data, which are similar when compared to a variety of other spectra. Added are the wavelengths of a typical scanning diode laser projector—Blue 445 nm, Green 522 nm, Red 639 nm and the perceptual peak wavelengths 535 nm (M cones) and 562 nm (L cones) the primary two human color vision percepts.

Figure 35:
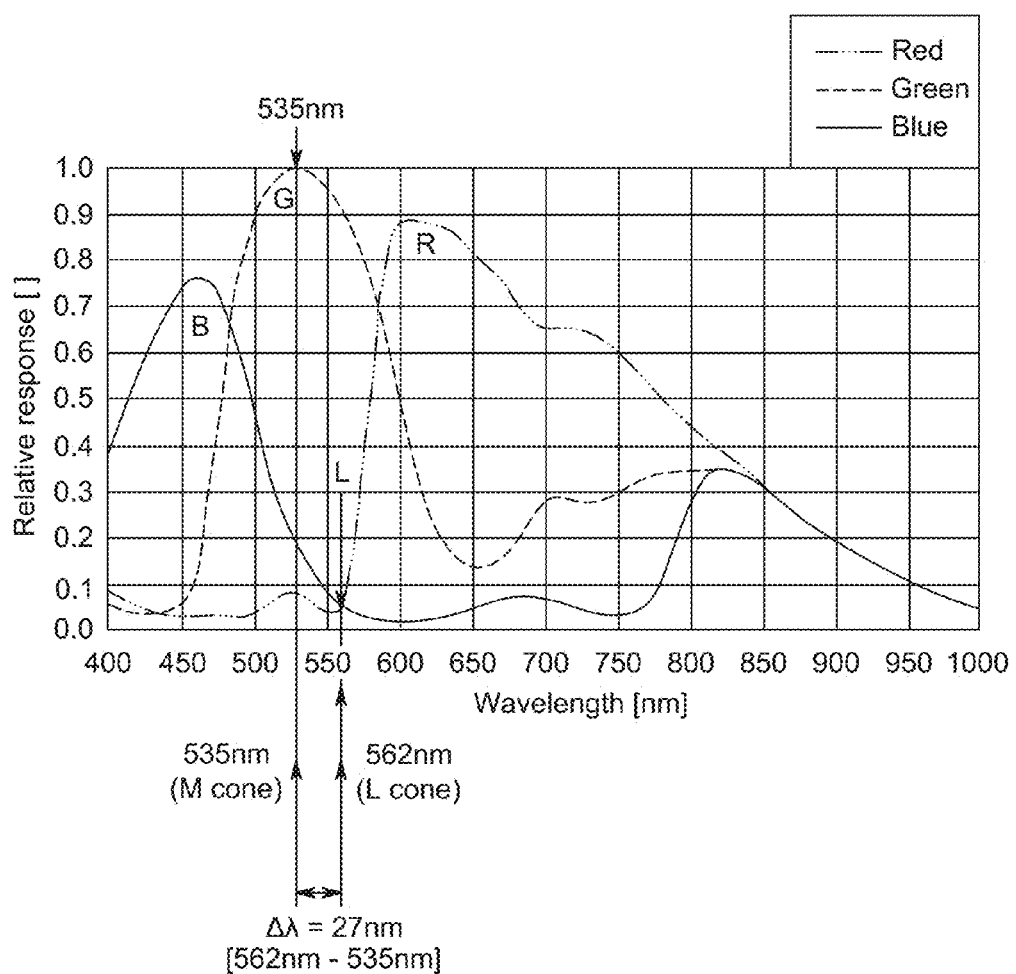
FIG. 35 shows an embodiment of a logical diagram of an exemplary graph that indicates that a typical complementary metal-oxide-semiconductor (CMOS) Bayer-filter camera cannot differentiate light of wavelengths associated with blushing.

Typical CMOS Bayer filter camera bands are shown in FIG. 35. Clearly, the red Bayer filter spectral cutoff is too far towards in the longer wavelength domain to pick up the hemoglobin blush peak reflectivity at 562 nm (yellow). In fact, the sensitivity of this typical camera for this key wavelength is close to the peak of the green pixels, which appears around 535 nm. So this type of camera is particularly color blind to the most important wavelength in human empathetic communications. The RED Bayer filter entirely rejects the hemoglobin blush peak reflectivity at 562 nm (Yellow). In fact, the sensitivity of this typical camera for this key wavelength is too close to the peak of the green pixels, which appears around 535 nm (which happens to be the human eyes M cones' maximum sensitivity point). So this type of commodity cameras are particularly color blind to the most important wavelength in human empathetic communications.

Diode lasers are naturally narrow wavelength emitters. Recently, direct lasing diode lasers 562 nm wavelength have been developed. By adding a 562 nm source primary to the illumination of the scan source we can selectively illuminate faces with this source. EG. Once the location of the person's face has been determined, specific parts of the face may be spot-scanned with a 562 nm wavelength laser scan beam. Note that a CMOS sensor will see this light reflect as any other light. No special narrow band filter is needed. Since the system has ex-ante knowledge that only the 562 nm yellow source is on at this moment (at this pixel) then it knows that the reflected light arriving at a particular pixel must be the reflections from the 562 nm source. As indicated before, ambient light is largely suppressed by other means. Further we may spatially or temporally multiplex (alternate) the two key frequencies 535 nm for M cones and 562 nm for the L cones. Thus by comparing the two scan sources' reflections, an instant pixel by pixel facial blush perception can be detected and transmitted.

If the receiving projection or display system has the ability to transmit the L peak wavelength e.g. by adding an extra 562 nm yellow primary Image Projector with reflected light tracking, and other applications) and if optionally we add a 5th primary color e.g. 535 nm selective green, than such a 4 or more primary scanning projection system will be able to faithfully reproduce a person's blush. Yellow pixels have in fact been added to some manufacturers' OLED displays. Unlike in cameras, this addition of a fourth color need not cause an efficiency loss since in OLED displays the organic emission colors are additive like lasers, not subtractive. The next generation OLED screens may be able to also recreate the blush; they might have a specific 532 nm and 562 nm narrow band emitter for this purpose.

Figure 36:
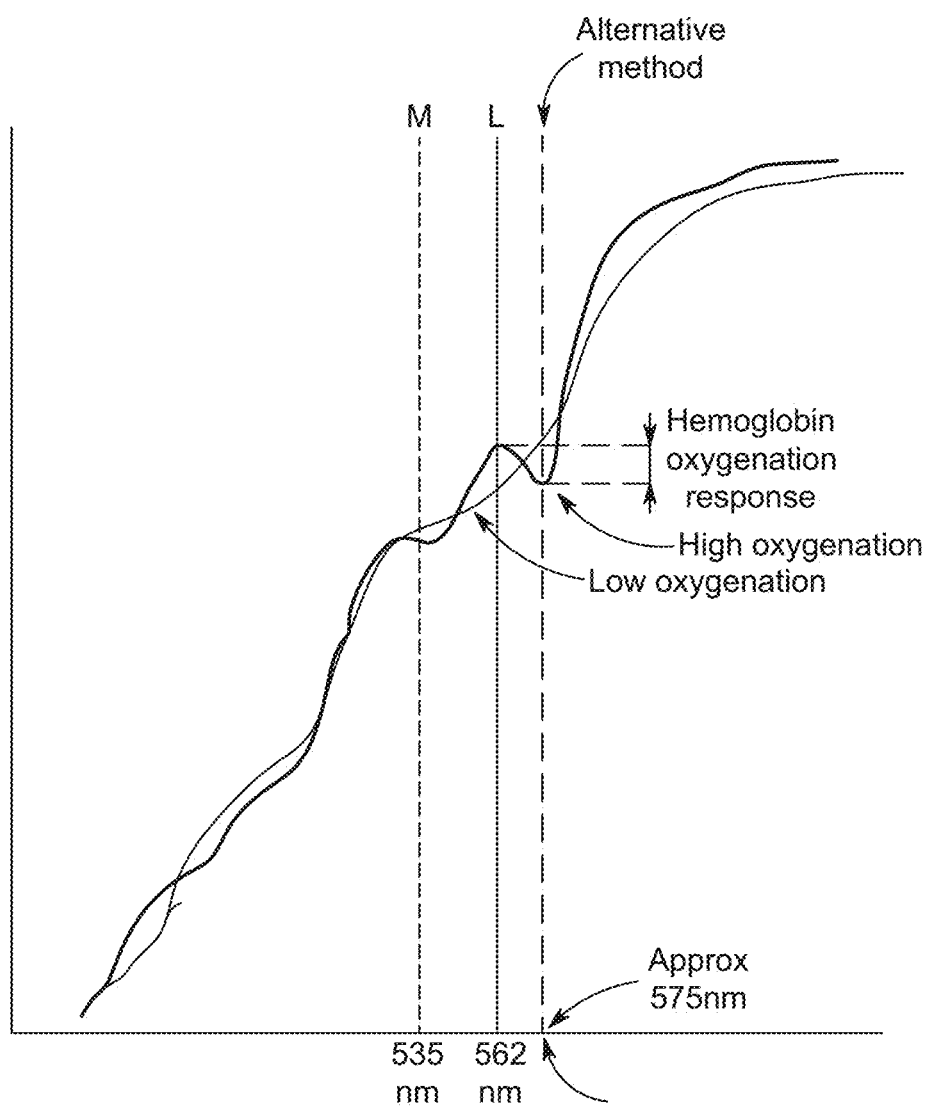
FIG. 36 illustrates an embodiment of a logical diagram of an exemplary graph that indicates that human skin exhibits lower reflectance values for light of wavelengths of approximately 575 nm when red blood cells are highly oxygenated during blushing than when the red blood cells are less oxygenated during an absence of blushing, thereby facilitating an additional or alternative process for detecting whether a human is blushing.

An alternative detection of Oxygenated Hemoglobin in the skin is indicated in FIG. 36. Using a selective illumination (scanned or flood) at around 575 nm will capture the second trough of the "W" spectral response of oxygenated blood e.g. detected by a facial scan during blushing. It may equally serve medical applications. In the "W", the peak reflectivity in the center of the W (at 562 nm, also the peak sensitivity of the human L cone) is compared with the drop of reflectivity towards the full yellow spectrum at approx. 575 nm. Illuminations at this three-dimensional wavelength can add or be an alternative for capturing the reflective minimum at 535 nm (the peak sensitivity of the human M cone).

Additionally, since it is anticipated that an animated Avatar, and/or augmented appearance options might enter into mainstream communications soon, having an accurate perception of a human facial color creates a host of options on the rendering side, and may even be a part of human-machine interactions. Machines may never "understand" human emotions, but they may at least register some of our emotional states.

We have seen that blush detection works on the input side by scanning the face of a person with a special 562 nm laser and comparing this deep yellow reflectivity to the skin yellow-green reflectivity at 535 nm. This comparison allows the system to instantly detect that tell-tale empathic signal at any one facial skin pixel location. On the receiving side the blush can be faithfully reproduced, as we discussed before, using identical primaries. Unfortunately the faithful reproduction would be as undetectable to the color blind parent (missing the M-L cone differential perception), as the real blush of the child. Alternatively, the signal can be shifted to the luminance domain, or to a color signal that is perceivable to the perceptually impaired parent.

Grandparents may need some help too. With age, vision degrades significantly. Aging eyes see skin colors quite differently from younger ones. By making facial features easier to see, by increasing contrast, or zooming into that smile and accentuating certain key perceptual markers, like a blush, might help the aging parent reconnect with her grandchildren. It will in some degree help humanity to reconnect empathetically.

What is claimed as new and desired to be protected by Letters Patent of the United States is:

1. A system for displaying an image to one or more users, comprising:
    a display surface that is non-flat;
    an apparatus that includes:
        a chassis that is adapted to attach to a portion of a head of a user; and
        two or more modules that are attached to the chassis and separately located adjacent to one of a left eye or a right eye of the user, wherein each module includes one or more sensors that are arranged to detect non-visible light that is reflected from the display surface; and
    one or more processors that execute instructions to perform actions, including:
        employing detected reflections of the non-visible light to provide a plurality of real time perspective views of at least a face of the user; and
        generating the image of at least the face of the user based on the plurality of perspective views, wherein the image is provided for display by one or more remotely located users.

2. The system of claim 1, further comprising one or more light scanners that are attached to the chassis and arranged to direct non-visible light onto the display surface.

3. The system of claim 1, further comprising one or more light scanners that are attached to the chassis and arranged to direct visible light onto the display surface.

4. The system of claim 1, further comprising one or more other sensors that are attached to the chassis and arranged to detect visible light reflected from the display surface.

5. The system of claim 1, wherein the non-flat display surface further comprises a shape that is concave, folded, parabolic, triptych, cylindrical, curved, elliptical, toroid, or elliptical parabolic.

6. The system of claim 1, wherein the display surface further comprises one of:
    a transparent screen positioned for total internal reflection at a back surface exposed to air;
    a translucent screen arranged to reflect near infrared light with a retro-reflective coating; or
    a window of a vehicle.

7. The system of claim 1, wherein the image further comprises a real time three-dimensional (3D) video image.

8. An apparatus for capturing images of a user, that includes:
    a chassis that is adapted to attach to a portion of a head of a user; and
    two or more modules that are attached to the chassis and separately located adjacent to one of a left eye or a right eye of the user, wherein each module includes one or more sensors that are arranged to detect non-visible light that is reflected from a display surface; and one or more processors that execute instructions to perform actions, including:
employing detected reflections of the non-visible light to provide a plurality of real time perspective views of at least a face of the user; and
generating an image of at least the face of the user based on the plurality of perspective views, wherein the image is provided for display by one or more remotely located users.

9. The apparatus of claim 8, further comprising one or more light scanners that are attached to the chassis and arranged to direct non-visible light onto the display surface.

10. The apparatus of claim 8, further comprising one or more light scanners that are attached to the chassis and arranged to direct visible light onto the display surface.

11. The apparatus of claim 8, further comprising one or more other sensors that are attached to the chassis and arranged to detect visible light reflected from the display surface.

12. The apparatus of claim 8, wherein the non-flat display surface further comprises a shape that is concave, folded, parabolic, triptych, cylindrical, curved, elliptical, toroid, or elliptical parabolic.

13. The apparatus of claim 8, wherein the display surface further comprises one of:
a transparent screen positioned for total internal reflection at a back surface exposed to air;
a translucent screen arranged to reflect near infrared light with a retro-reflective coating; or
a window of a vehicle.

14. The apparatus of claim 8, wherein the image further comprises a real time three-dimensional (3D) video image.

15. A method for capturing images, comprising:
employing an apparatus to capture the images, wherein the apparatus includes
a chassis that is adapted to attach to a portion of a head of a user; and
two or more modules that are attached to the chassis and separately located adjacent to one of a left eye or a right eye of the user, wherein each module includes one or more sensors that are arranged to detect non-visible light that is reflected from the display surface; and
employing detected reflections of the non-visible light to provide a plurality of real time perspective views of at least a face of the user; and
generating an image of at least the face of the user based on the plurality of perspective views, wherein the image is provided for display by one or more remotely located users.

16. The method of claim 15, further comprising one or more light scanners that are attached to the chassis and arranged to direct non-visible light onto the display surface.

17. The method of claim 15, further comprising one or more light scanners that are attached to the chassis and arranged to direct visible light onto the display surface.

18. The method of claim 15, further comprising one or more other sensors that are attached to the chassis and arranged to detect visible light reflected from the display surface.

19. The method of claim 15, wherein the non-flat display surface further comprises a shape that is concave, folded, parabolic, triptych, cylindrical, curved, elliptical, toroid, or elliptical parabolic.

20. The method of claim 15, wherein the display surface further comprises one of:
a transparent screen positioned for total internal reflection at a back surface exposed to air;
a translucent screen arranged to reflect near infrared light with a retro-reflective coating; or
a window of a vehicle.

\* \* \* \* \*